US012657952B1

(12) United States Patent
Smyth

(10) Patent No.: US 12,657,952 B1
(45) Date of Patent: Jun. 16, 2026

(54) METHOD FOR DETERMINING FACE-POSE FROM FACIAL FEATURES AND PHYSICAL STRUCTURE

(71) Applicant: Christopher Charles Smyth, Parkville, MD (US)

(72) Inventor: Christopher Charles Smyth, Parkville, MD (US)

( * ) Notice: Subject to any disclaimer, the term of this patent is extended or adjusted under 35 U.S.C. 154(b) by 0 days.

(21) Appl. No.: 19/197,999

(22) Filed: May 3, 2025

(51) Int. Cl.
　　*G06V 40/16*　　(2022.01)
　　*G06T 7/73*　　(2017.01)

(52) U.S. Cl.
　　CPC .............. *G06V 40/165* (2022.01); *G06T 7/75* (2017.01); *G06V 40/166* (2022.01); *G06T 2207/30201* (2013.01)

(58) Field of Classification Search
　　CPC ...... G06V 40/165; G06V 40/166; G06T 7/75; G06T 2207/30201
　　See application file for complete search history.

(56) References Cited

U.S. PATENT DOCUMENTS

| | | | | |
|---|---|---|---|---|
| 8,824,779 | B1 * | 9/2014 | Smyth ....................... | G06T 7/73 |
| | | | | 382/117 |
| 11,195,301 | B1 * | 12/2021 | Lev ....................... | G06V 40/171 |
| 12,548,369 | B2 * | 2/2026 | Ota ........................ | G06V 20/58 |
| 2016/0077344 | A1 * | 3/2016 | Burns ..................... | G06F 3/012 |
| | | | | 345/419 |
| 2017/0068843 | A1 * | 3/2017 | Tian ........................ | G06T 7/136 |
| 2018/0005021 | A1 * | 1/2018 | Young ................... | G06V 40/165 |
| 2018/0032825 | A1 * | 2/2018 | Fung ..................... | G06V 40/171 |
| 2019/0266388 | A1 * | 8/2019 | Kolagunda .......... | G06V 10/764 |
| 2020/0098178 | A1 * | 3/2020 | Ni ......................... | G06V 40/168 |
| 2020/0160037 | A1 * | 5/2020 | Shi ........................ | G06V 10/421 |
| 2020/0285834 | A1 * | 9/2020 | Ishii ..................... | G06V 40/165 |
| 2020/0394392 | A1 * | 12/2020 | Wang .................... | G06V 40/40 |
| 2022/0292878 | A1 * | 9/2022 | Wang ................. | G06V 10/7715 |
| 2023/0102682 | A1 * | 3/2023 | Chang ...................... | G06T 7/75 |
| | | | | 382/118 |

(Continued)

OTHER PUBLICATIONS

Bekerman, I, Gottlieb, P. & Vaiman M. (2014). "Variations in Eyeball Diameters of the Healthy Adults." J. Ophthalmology, vol. 2014, Article ID 503645. Hindawi Publishing Corp.

(Continued)

*Primary Examiner* — John B Strege

(57) ABSTRACT

An invention is here disclosed for a method of determining human face-pose in visual images using a mathematical model composed of equations for the mechanics of the physics relating the orientation and position of the facial pose to the facial features in the image, wherein the mechanics are a function of the face physical structure. In particular, the orientation is computed from facial feature images with equations based on the physical offset between the face and eye-orbit margins considered as separate anatomically located facial planes, where the offset is a fixed quantity set by the physical structure. The pose position is computed from the facial structure; a fixed-point iteration process is used to improve the computation to correct for facial front offset. The method may be readily used for real-time determination of face-pose in benign webcam applications such as locating work-areas that the user is physically facing in a workspace.

20 Claims, 42 Drawing Sheets

(56)         References Cited

U.S. PATENT DOCUMENTS

2024/0386748 A1 * 11/2024 Nishi ................... G06V 40/174
2025/0037305 A1 * 1/2025 Yang ........................ G06N 3/08

OTHER PUBLICATIONS

Blanz V. & Vetter T. (1999). "A morphable model for the synthesis of 3D faces.", SIGGRAPH 99, p. 187-194. In ACM Transactions on Graphics, Los Angeles, CA.
Dodgson, N. (2004). "Variations and extrema of human interpupillary distance." In Proc. SPIE vol. 5291, p. 3686, San Jose, CA.
Furuta, M. (2001). "Measurement of Orbital Volume by Computed Tomography: Especially on the Growth of the Orbit." Japanese Journal of Ophthalmology, 2001:45: p. 600-606.
Grujičić, R. (2023). Human Face, Human face: anatomy, structure and function | Kenhub (web site).
Guyomarc'H, P., Dutailly, B., Charton, J., Santos, F., Desbarats, P. & Coqeugniot, H. (2014). "Anthropological Facial Approximation in Three Dimensions", J. Forensic Sci., 59.
Zaidi A.A., Mattern B.C., Claes P., Mcecoy B., Hughes C. & Shriver M.D. (2017) "Investigating the case of human nose shape and climate adaptation." PLOS Genetics 13(3).

* cited by examiner $N_o = [-cos(\phi p)*sin(\phi y), -sin(\phi p), -cos(\phi p)*cos(\phi y)]$ Mapping orbit from orbit-view space to camera space $y = rz*sin(\beta)$ $x = rz*cos(\beta)*sin(\alpha)$ $z = rz*cos(\beta)*cos(\alpha)$ $(x, y, z)$  221

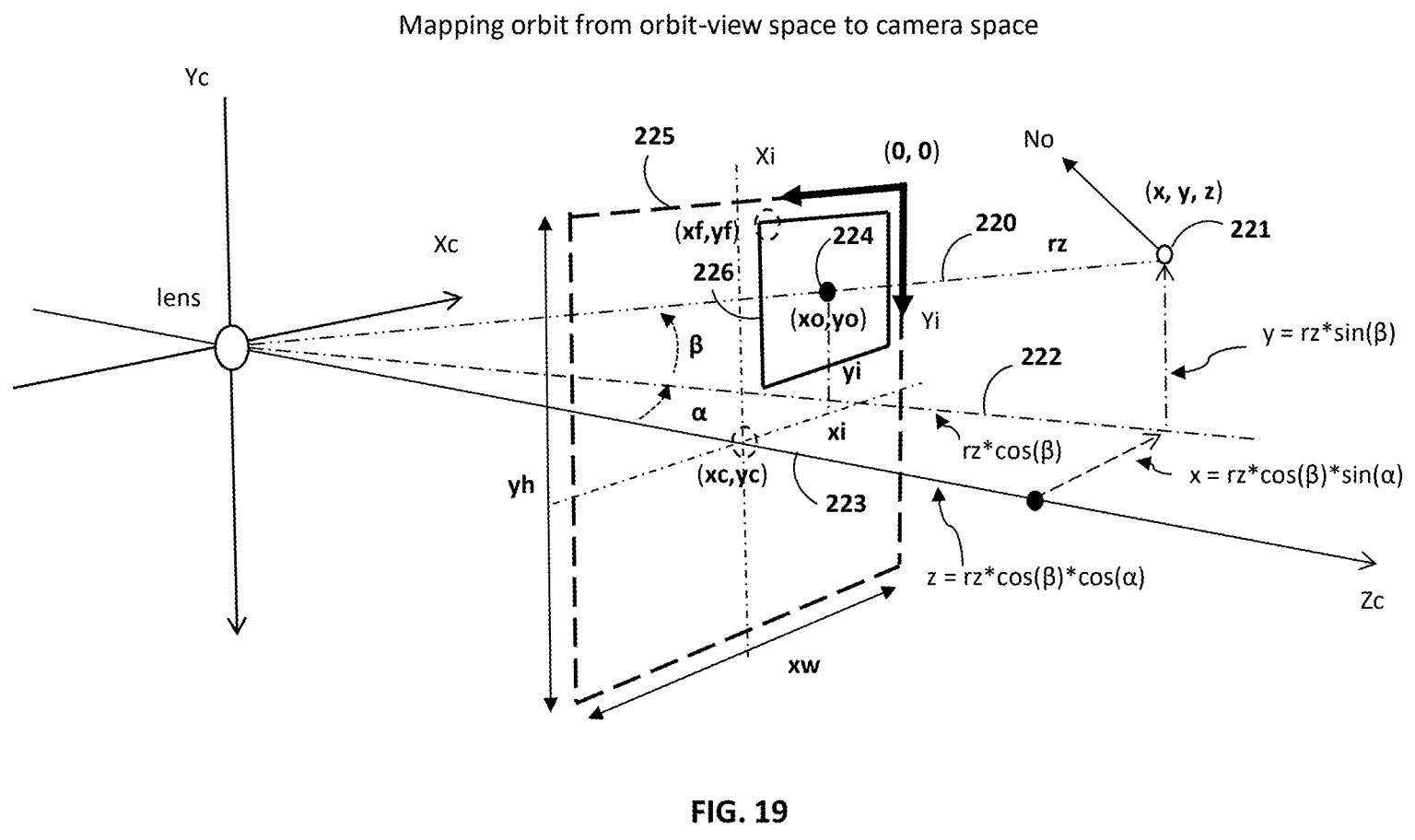

$rz*cos(\beta)$

222

No $rz$  220

Zc $(0, 0)$

Yi $(xo, yo)$

224 yi

Xi xi

223 xw $(xf, yf)$  226

$(xc, yc)$

225

$\beta$ $\alpha$ yh

Xc

Yc lens

FIG. 19

Camera space rotation angles
Manikin: Central triangular box to orbit box centers Face pose offset directional cosines in work space
*Manikin: Central triangular box to orbit box centers*

Horizontal offset from screen surface normal (degrees)

Directional cosine value

Face pose projection onto workspace surface
*Manikin: Central triangular box to orbit box centers* face projection points camera

Display monitor

Display x-axis coordinates (inches)

Display y-axis coordinates (inches)

1

METHOD FOR DETERMINING FACE-POSE FROM FACIAL FEATURES AND PHYSICAL STRUCTURE

BACKGROUND OF THE INVENTION

Technical Field of the Invention

The invention disclosed here applies to the field of image analysis, especially that of human faces in video images, in particular to the determination of face-pose orientation and position.

DESCRIPTION OF THE PRIOR ART

Face-pose refers to the orientation and position of a face with respect to a reference coordinate system. The orientation is typically represented by three angles: yaw (rotation around the vertical axis), pitch (rotation around the horizontal axis), and roll (rotation around the depth axis). A n elementary approach to estimating pose in video images relies on the detection of facial features and applying geometric transformations. These methods often involved detecting facial landmarks, such as eyes, nose, and mouth, in the image and using their spatial relationships to infer pose angles. Algorithms like the iterative closest point (ICP) and the 3D morphable model (3D M M) have been commonly used for this purpose. While these traditional methods are computationally efficient, they often struggle with pose variations, occlusions, and lighting changes.

Feature-based approaches utilize machine learning techniques to extract discriminative features from face images for pose estimation. These features may include edges, textures, or local descriptors. Methods like the Scale-Invariant Feature Transform (SIFT), Speeded-Up Robust Features (SURF), and Histogram of Oriented Gradients (HOG) have been employed to detect and describe facial features invariant to scale, rotation, and illumination changes. Feature-based approaches offer improved robustness compared to traditional methods but may still struggle with extreme poses and complex backgrounds.

Advancements in deep learning have been applied to estimating face-pose. Convolutional Neural Networks (CNNs) have been used for learning hierarchical representations directly from raw pixel data. Architectures like AlexNet, VGG, ResNet, and MobileNet have been adapted for pose estimation. Recent advancements in deep learning, particularly with architectures like Region-based Convolutional Neural Networks (R-CNNs) and landmark detection networks such as Face Alignment Networks (FAN), have significantly improved the accuracy and robustness of pose estimations. These models are trained end-to-end on large-scale datasets and can automatically learn complex patterns and features. Deep learning-based methods outperform traditional approaches in terms of accuracy and generalization but require substantial amounts of annotated data and computational resources for training.

Hybrid approaches combine the strengths of traditional and deep learning-based methods. They often leverage pre-trained deep learning models for feature extraction and combine them with geometric algorithms for pose estimation. For example, a Convolutional Neural Network may be used to extract facial features, which are then fed into a geometric solver to compute pose angles. Hybrid approaches aim to achieve a balance between accuracy and efficiency while overcoming the limitations of individual techniques.

The methods for face-pose estimation often involve geometric transformations and feature extraction techniques. OpenCV and Glib libraries provide functionalities for image processing, feature detection, and geometric transformations, making them suitable for implementing traditional approaches. Techniques such as facial landmark detection combined with geometric calculations are commonly used for pose estimation by software programs based on these libraries. Feature-based methods utilize machine learning techniques for extracting discriminative features from face images. OpenCV and Glib provide support for feature extraction algorithms such as Scale-Invariant Feature Transform (SIFT), Speeded-U p Robust Features (SU RF), and Histogram of Oriented Gradients (HOG). These features can be employed for pose estimation by combining them with geometric transformations. Deep learning has shown remarkable success. OpenCV and Glib offer interfaces for integrating deep learning frameworks such as TensorFlow and PyTorch. Convolutional Neural Networks (CNNs) trained on large-scale datasets can be implemented using these libraries for accurate estimation. Techniques like transfer learning allow leveraging pre-trained models.

Facial features commonly used in determining face-pose are the face and eye boxes extracted from a video image by routines of the OpenCV and Glib libraries. Face and eye boxes are bounding boxes or regions of interest (ROIs) that encapsulate facial features, particularly the eyes and the entire face, respectively. These boxes are identified through various techniques such as object detection algorithms like Haar cascades, deep learning-based approaches such as Convolutional Neural Networks (CNNs), or feature-based methods like the Viola-J ones algorithm. Once detected, these boxes serve as foundational elements for analysis. The orientation of a face can be described in terms of its yaw, pitch, and roll angles, which respectively represent its horizontal, vertical, and rotational deviations from a reference position. Face-pose estimation involves the computation of these angles based on the spatial relationships between facial landmarks and the face and eye boxes. By analyzing the positions of eyes, nose, and mouth within the face box, coupled with the relative positions of the eye boxes, algorithms can infer the pose of the face.

In review, the methods of deep learning with a large data base of facial images have led to improvements for a generalized estimation of face-pose orientation; however, the accuracy depends on how well the individual is represented in the data base. Further, the techniques described above are limited to the analysis of the image contents alone, without the additional accuracy provided by physical modeling of the face for determining pose.

SUMMARY OF THE INVENTION

The invention disclosed here as a method for determining human face-pose in visual images has the advantage of being based on a mathematical model of the relation of the orientation and position to facial features, with the model set by the underlying physical structure of the viscerocranium comprising the facial skeleton. In particular, the orientation is computed from the geometrical centers of feature image frames with equations modeling the mechanical physics of the orientation to the frame centers, where the features are those of the face and the eye-orbit margins, and the mechanics are determined from the physical structure. Here, the model is based on the physical offset between the face and eye-orbit margins as separate anatomically located facial planes imaged by the feature frames, where the offset is a fixed quantity set by the physical structure. The frames bound facial features in the image such as the eye lids, eye-brows, nose, and chin, with the frame centers computed directly from the feature image coordinates. The method needs only a limited number of such readily located facial-marking features in the bounding frame construction. Multiple bounding frames may be constructed for different parts of the facial anatomy such as a full-face frame from the superior forehead and inferior face and a central face frame from the middle face, as well as the orbit frame from the superior orbital region, affording different approaches as a check on determination depending upon the pose. The method does not need to be calibrated for use since the model uses the eye-orbit margin physical size for computing the pose position and the margin size is consistent across adult humans. A fixed-point iteration process is used to refine the computations to correct for facial front offset. The results may be used in estimation of the face orientation and location relative to a reference coordinate system mapped to the image space. Because of the simplicity, the method may be readily used for real-time determination of face-pose in benign webcam applications, such as locating work-areas that the user is physically facing in a workspace. In this application, the facial image bounding frames are readily computed by the use of the well-established OpenCV and Dlib library routines among others, for determining the facial landmark features. Further, the method may be incorporated with morphable models of the face for corrections of illumination and facial texture offsets when such preclude derivation of facial landmarks from the original image.

BRIEF DESCRIPTION OF DRAWINGS

So that the manner in which the features of the present invention can be understood in detail, a more particular description of the method may be had by reference to embodiments, some of which are illustrated in the appended drawings described as follows.

4

Figure 16:
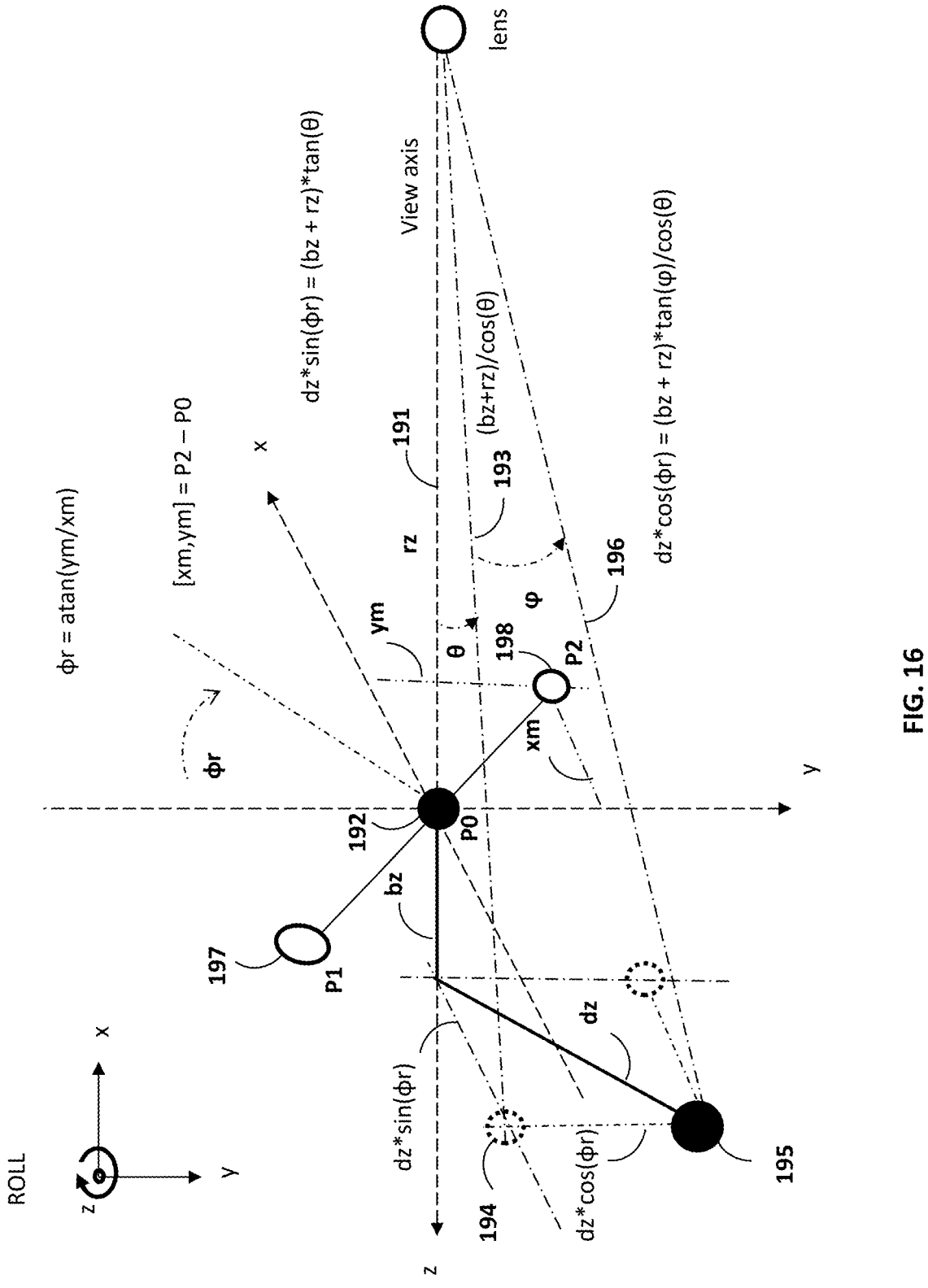

FIG. 16 is a Diagram of face roll with mark offset.

Figure 17:
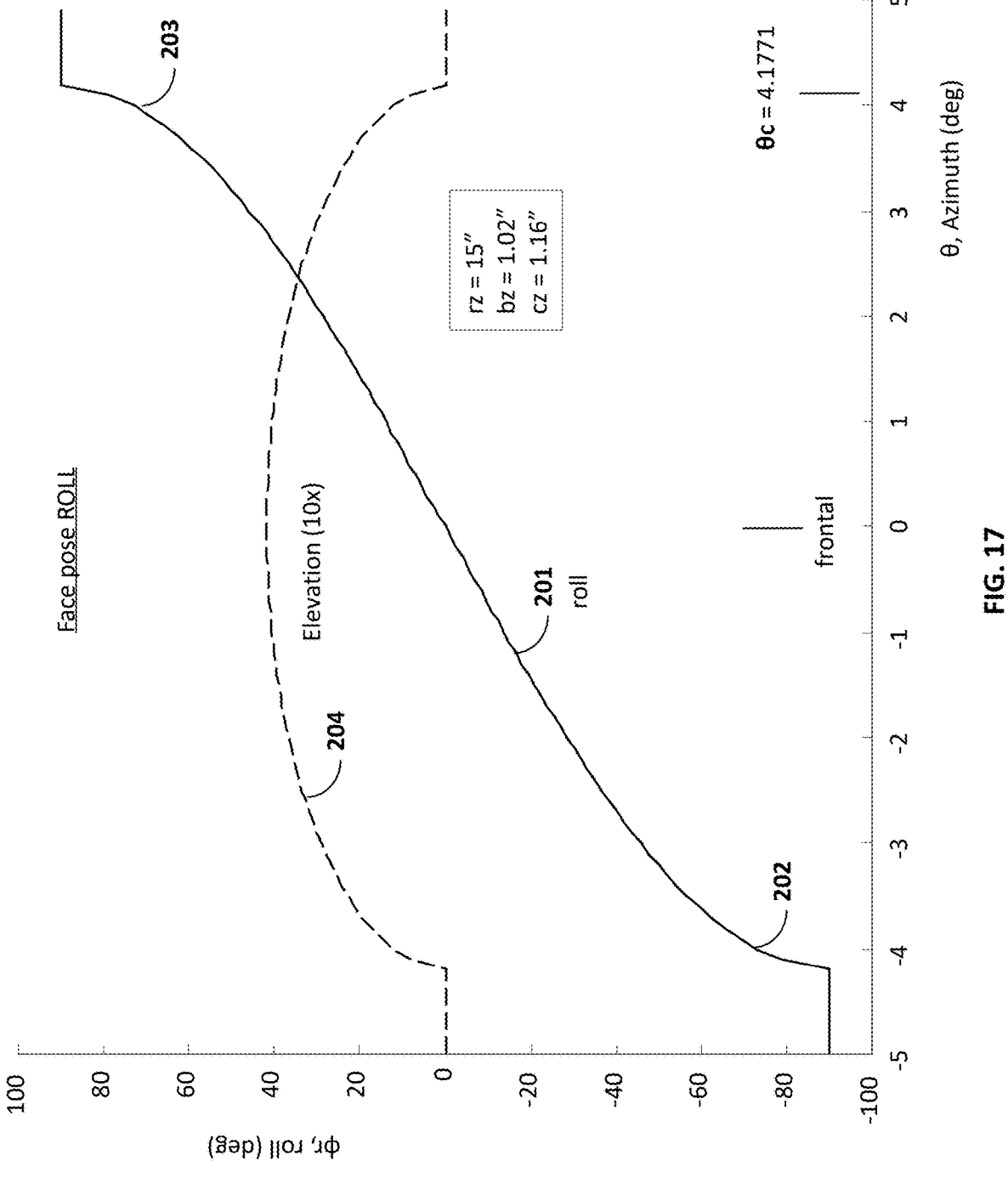

FIG. 17 is a Plot of face roll by mark offset.

Figure 18:
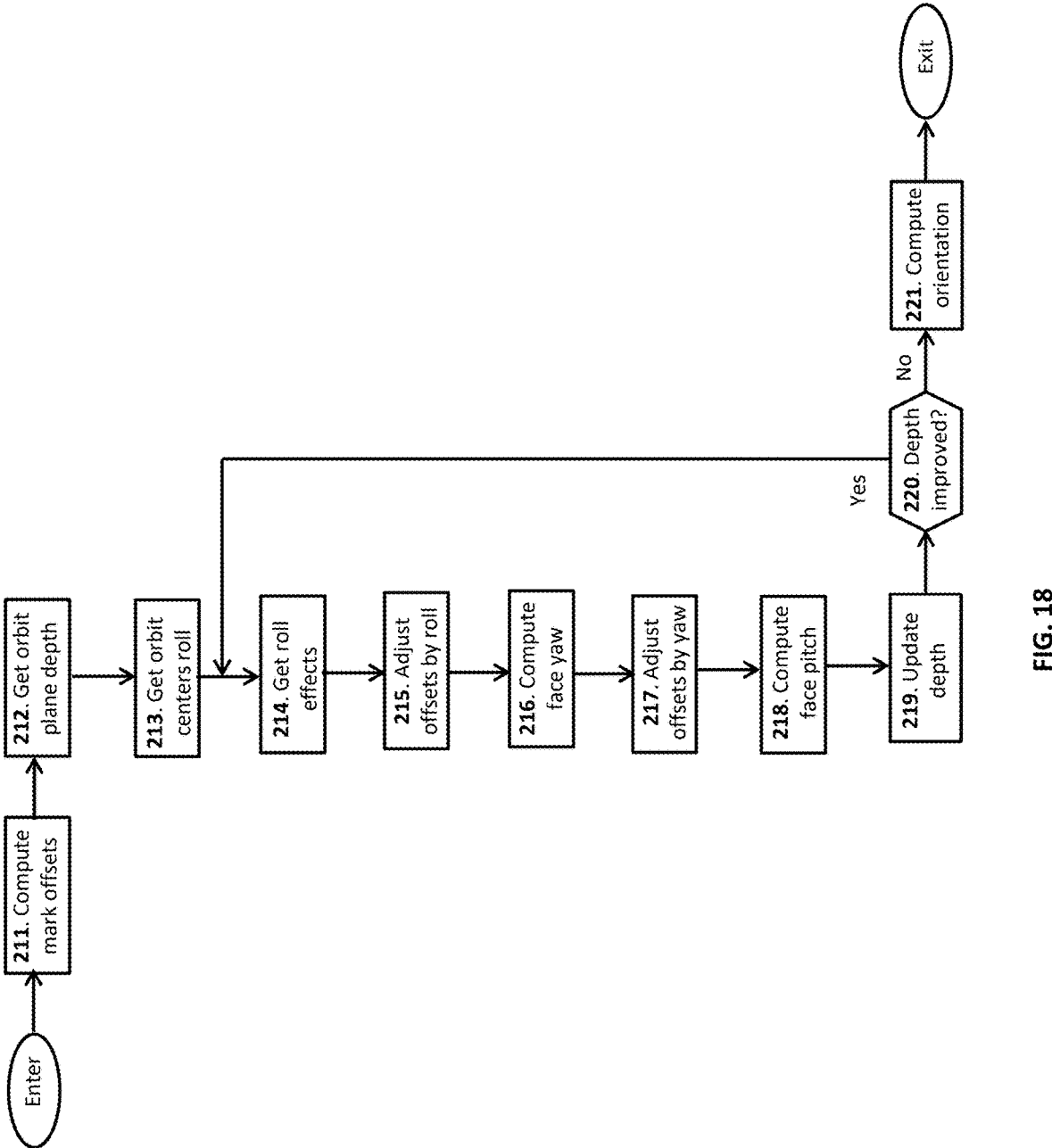

FIG. 18 is a Flowchart of method for determining face-pose orientation from mark offsets.

FIG. 19 is a Diagram showing mapping from orbit-view space to camera space.

Figure 20:
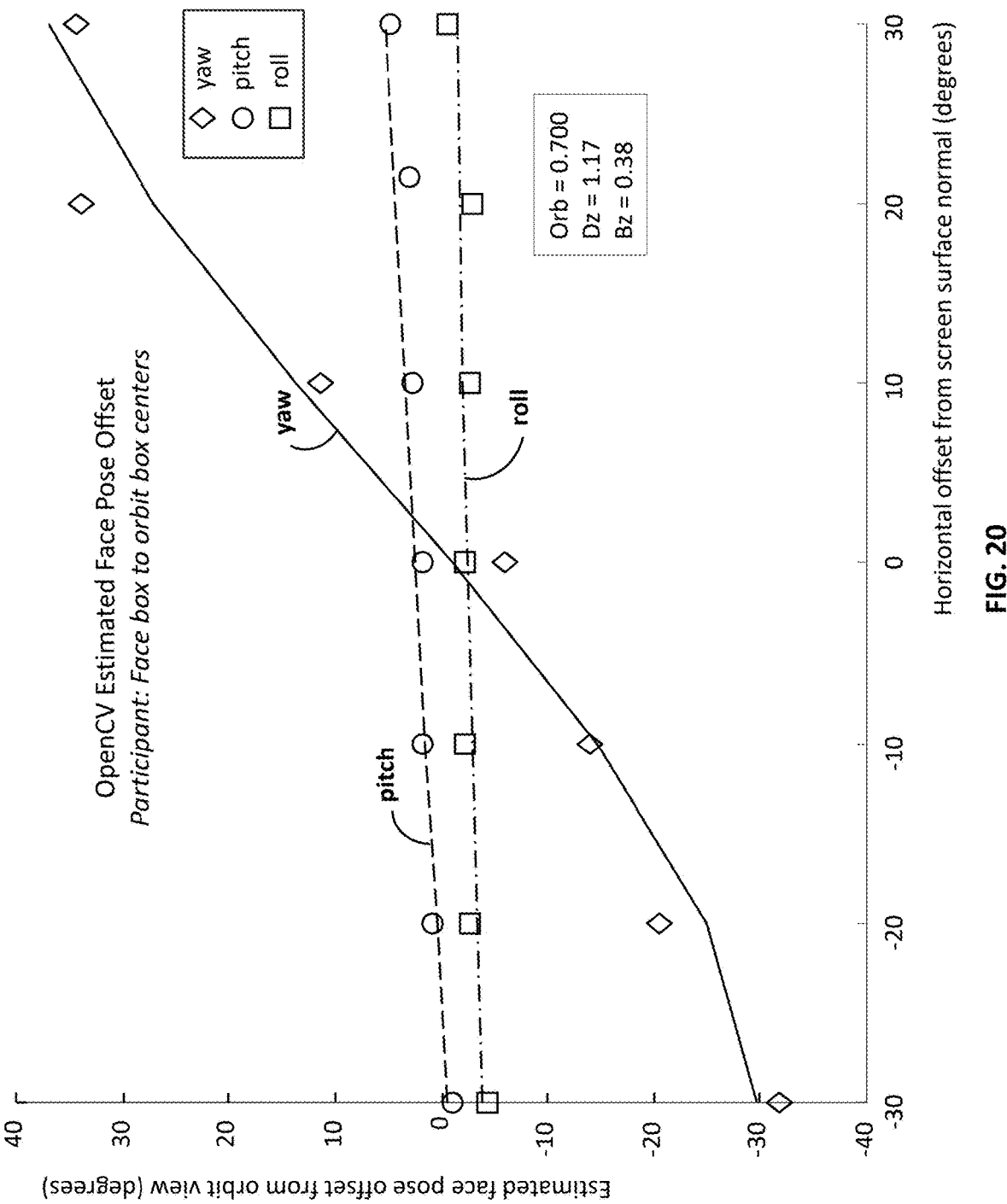

FIG. 20 is a Plot of participant's face-pose offset of face-box to orbit centers in orbit space derived with OpenCV image processing routines.

Figure 21:
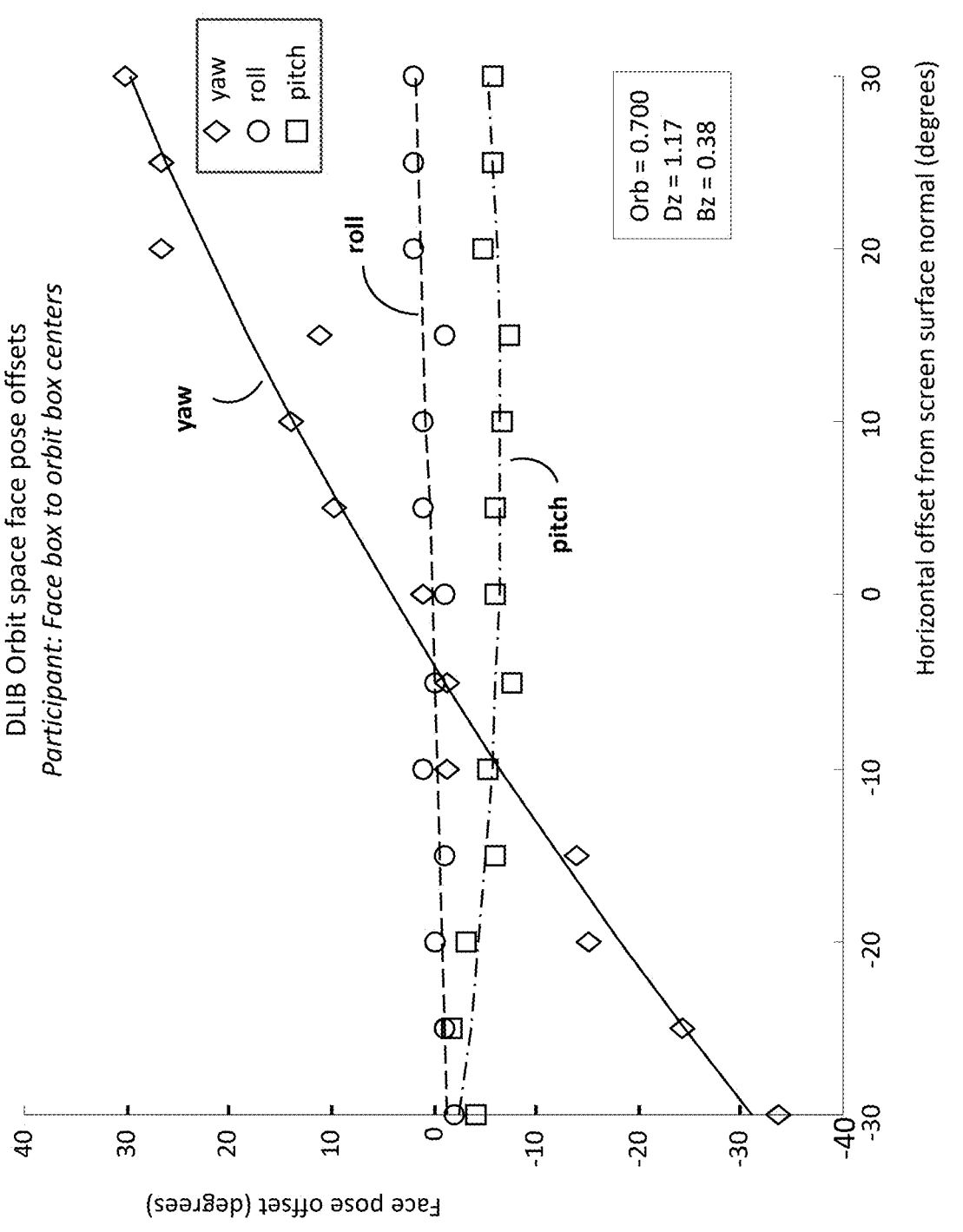

FIG. 21 is a Plot of a participant's face-pose offset of face-box to orbit centers in orbit space derived with DLIB routine image processing routines.

Figure 22:
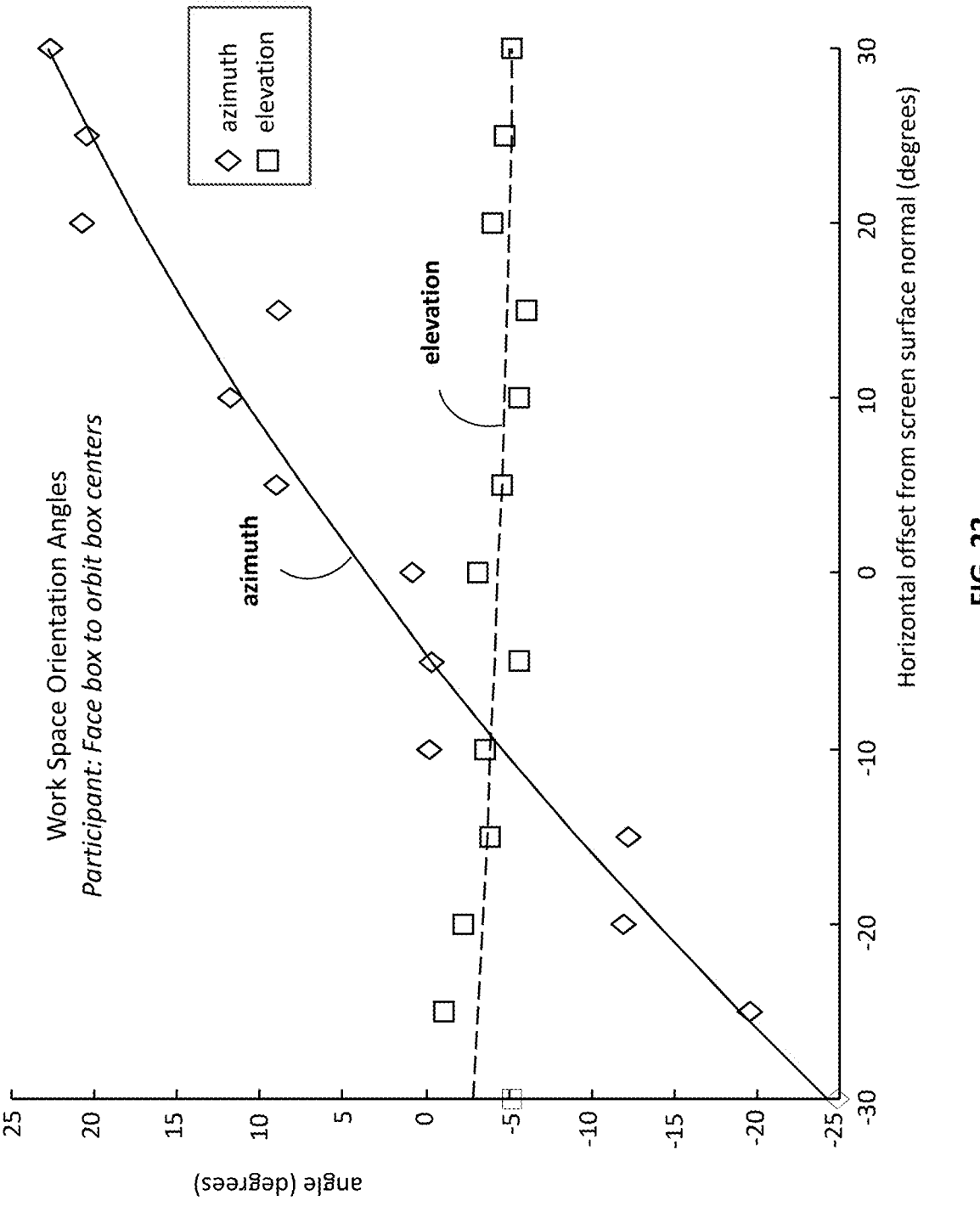

FIG. 22 is a Plot of orientation angles in workspace.

Figure 23:
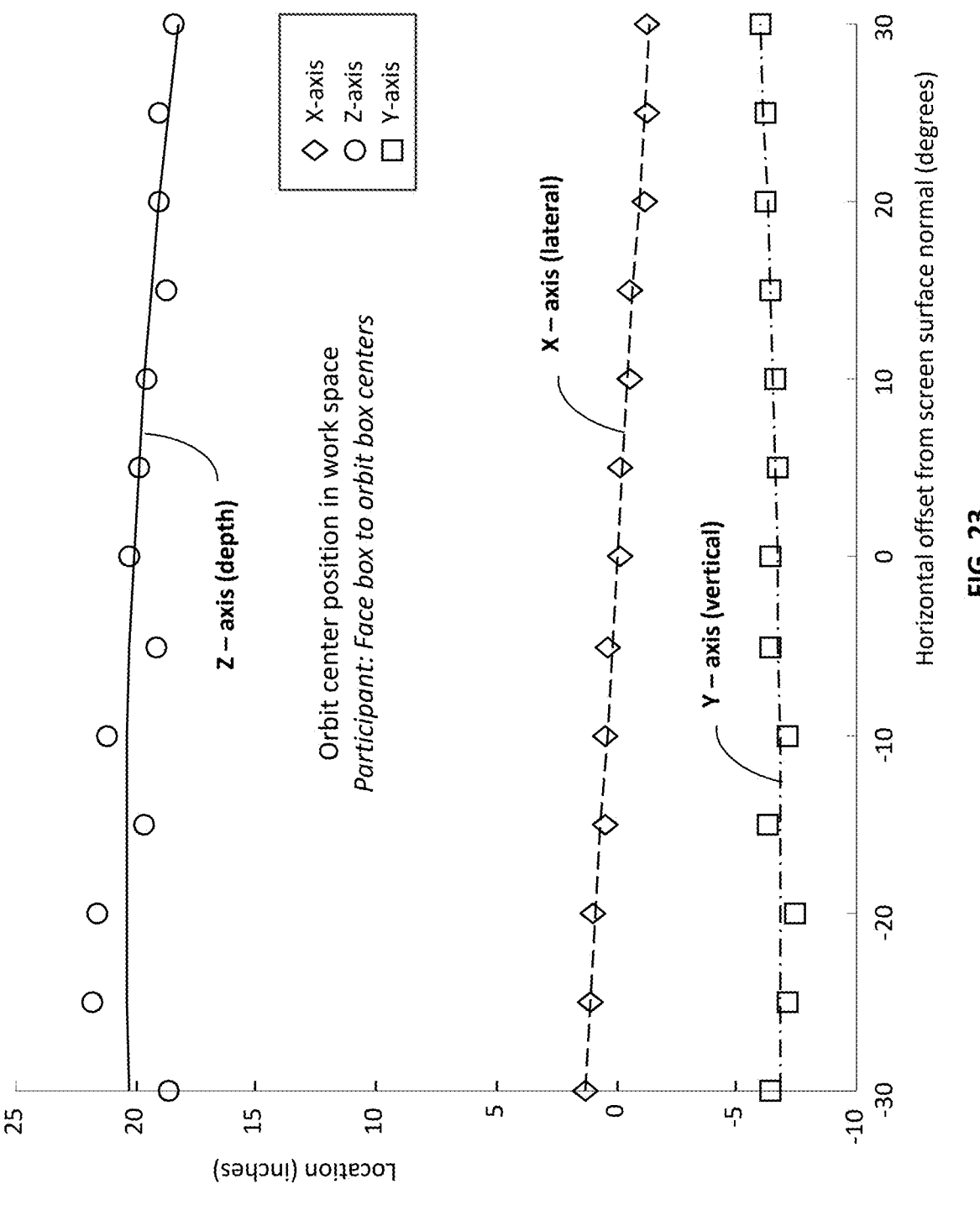

FIG. 23 is a Plot of orbit margin center position in workspace.

Figure 24:
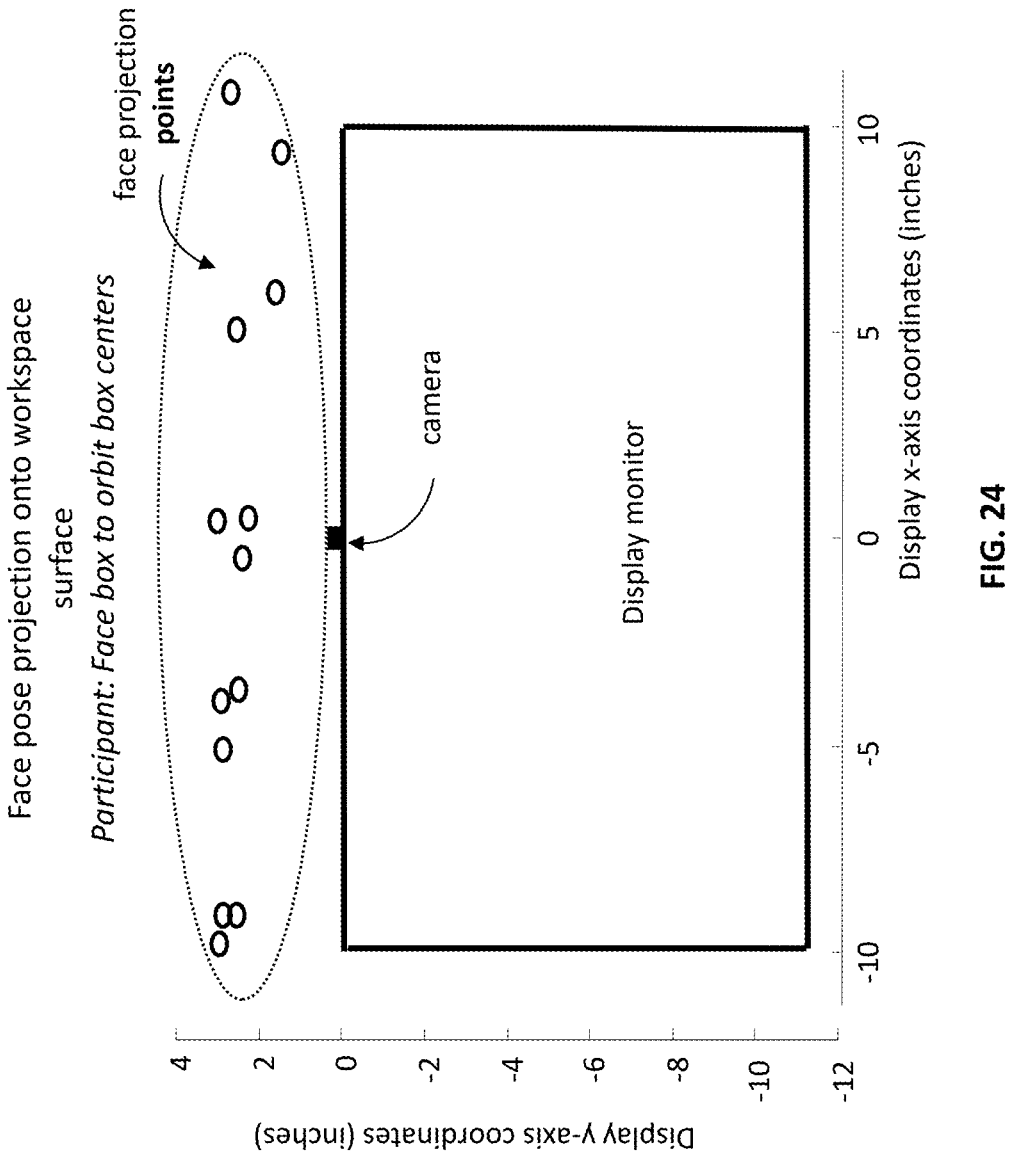

FIG. 24 is a Figure showing the projection of face heading onto workspace surface.

Figure 25:
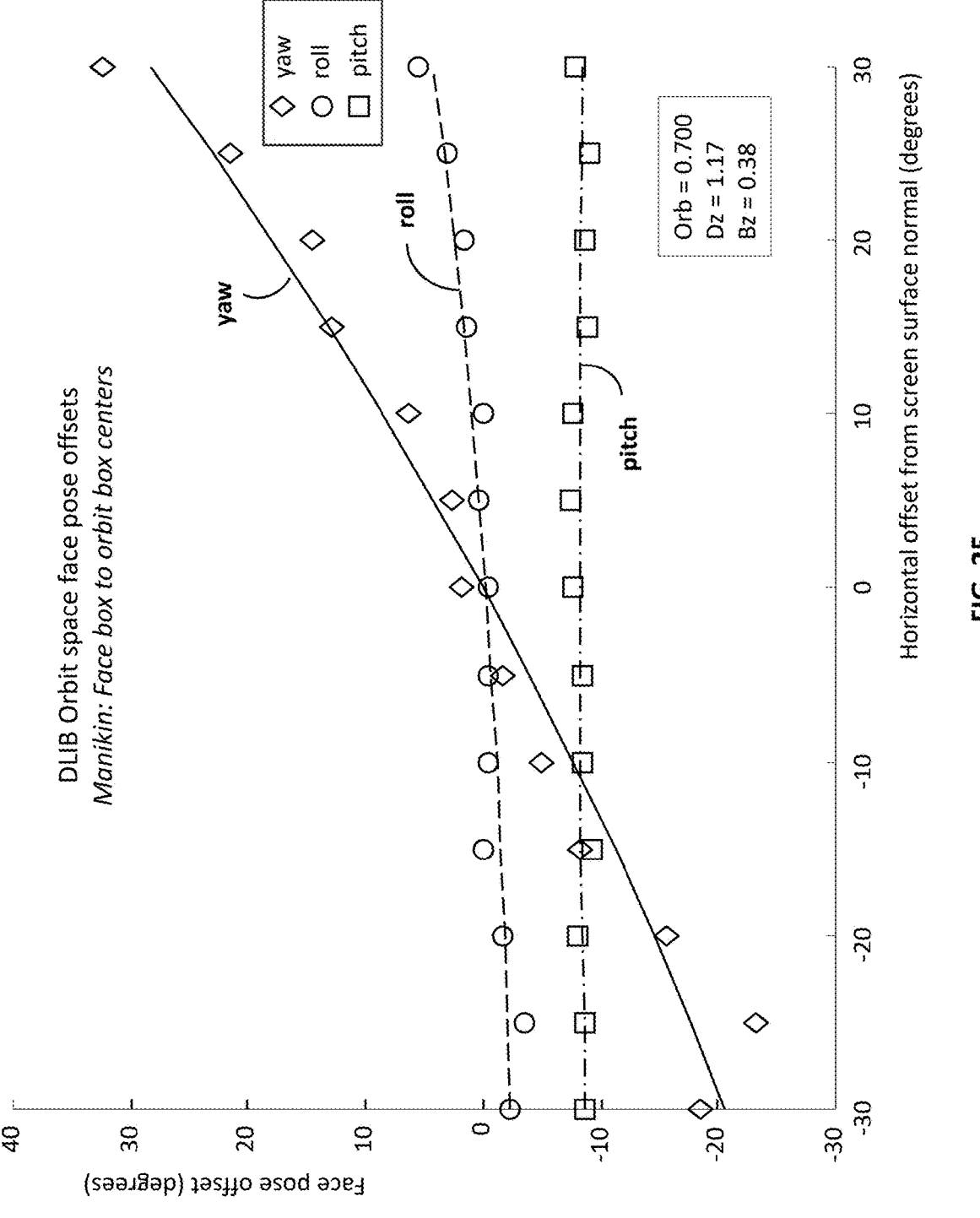

FIG. 25 is a Plot of manikin's face-pose offset of the full-face box to orbit centers in orbit space. derived with DLIB routine image processing routines.

Figure 26:
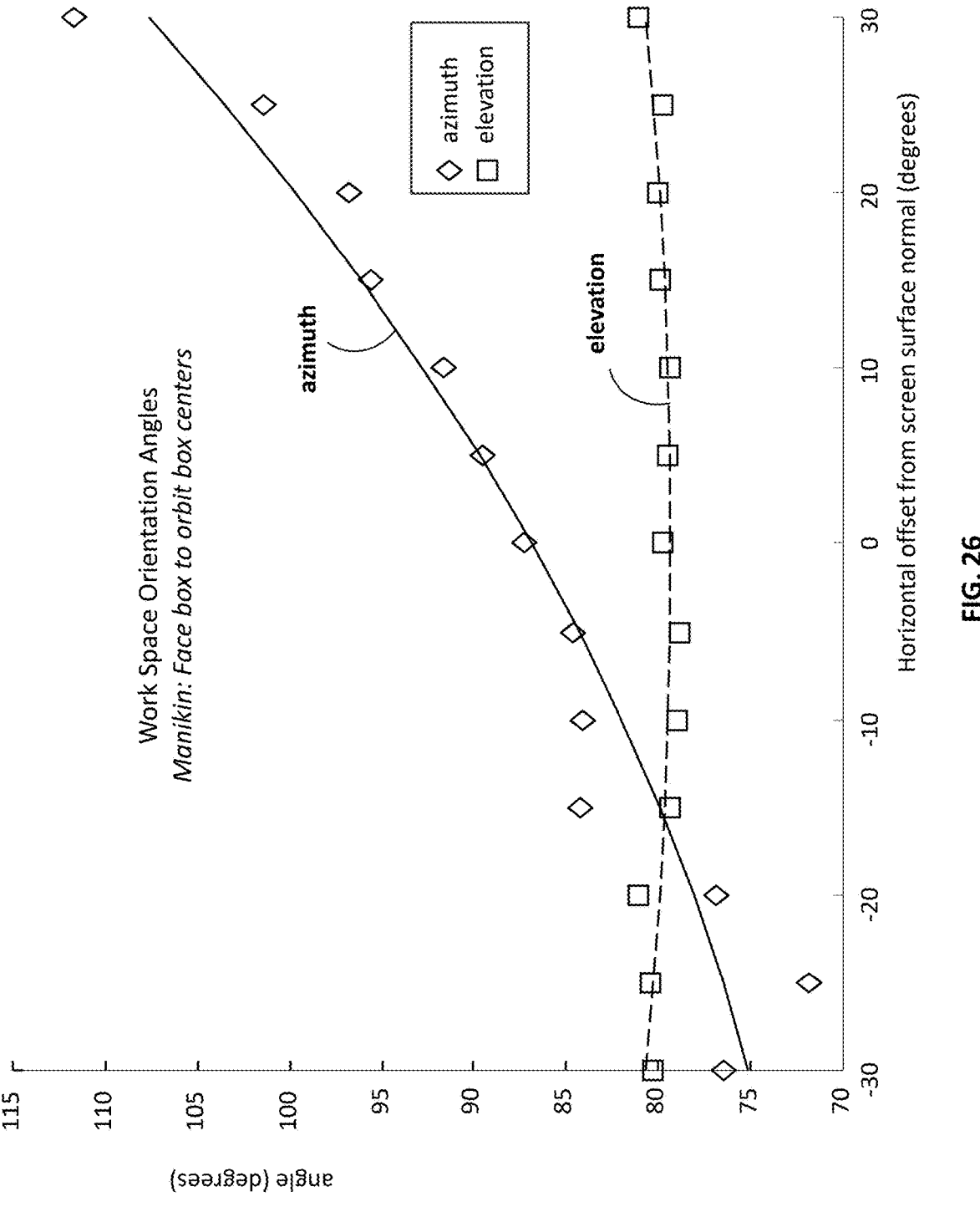

FIG. 26 is a Plot of orientation angles in workspace.

Figure 27:
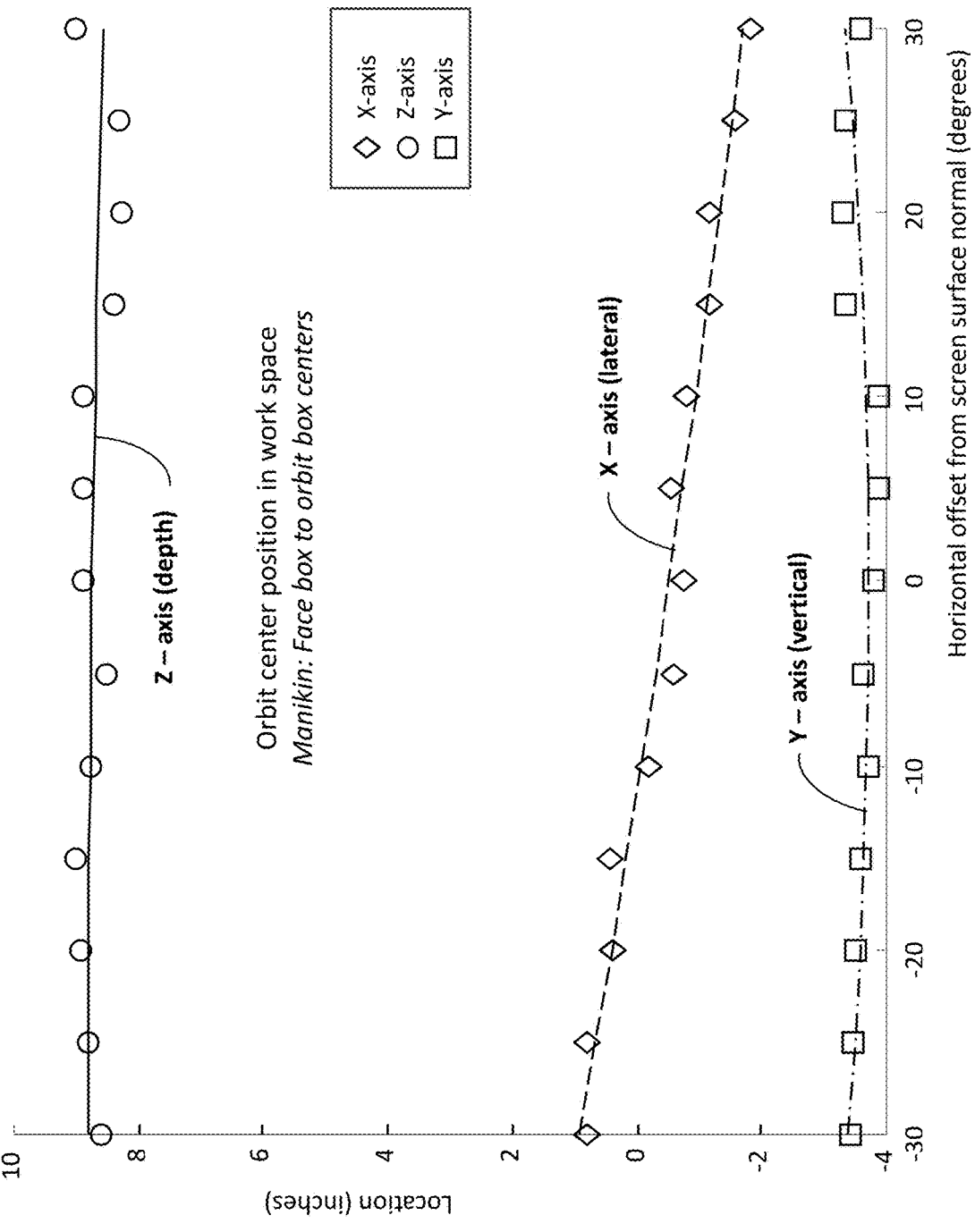

FIG. 27 is a Plot of orbit margin center position in workspace.

Figure 28:
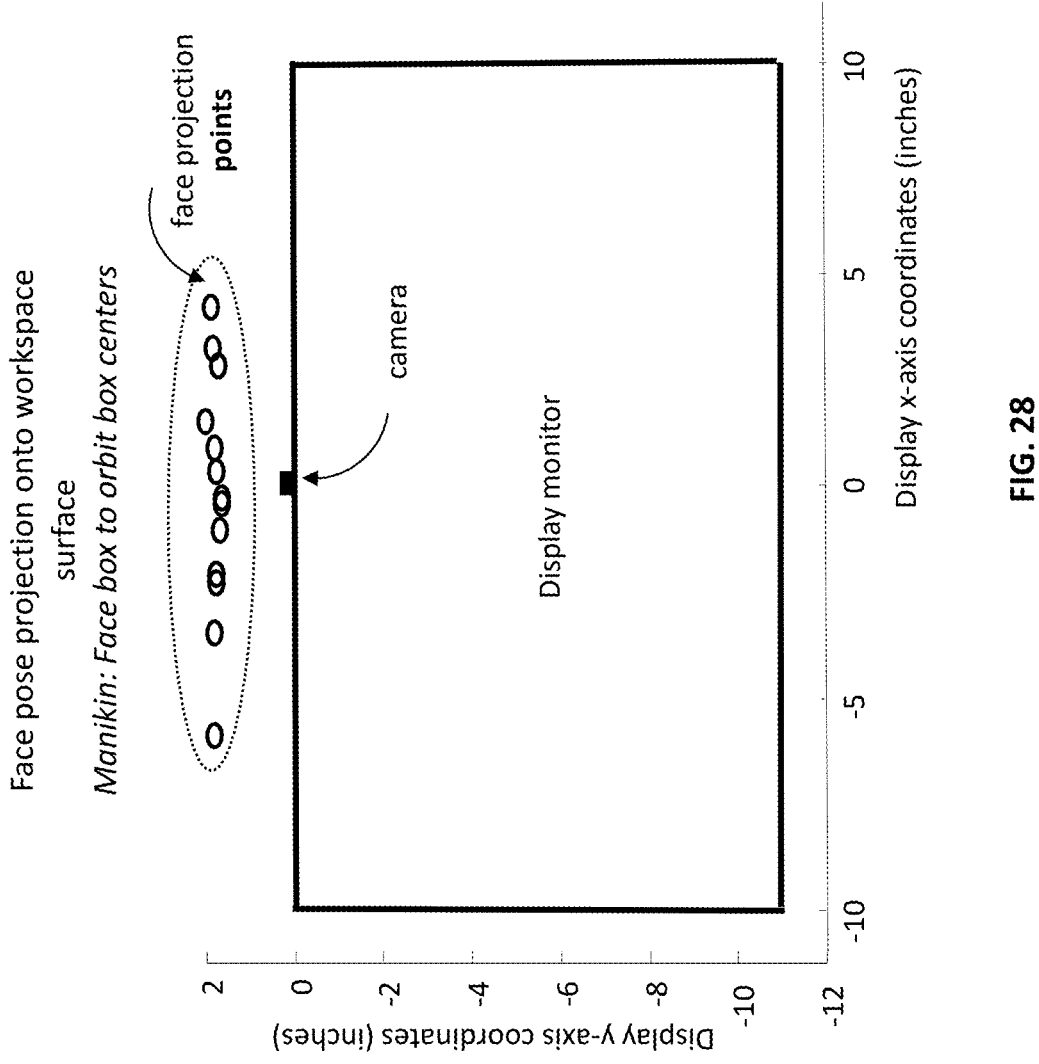

FIG. 28 is a Figure showing the projection of face heading onto workspace surface.

Figure 29:
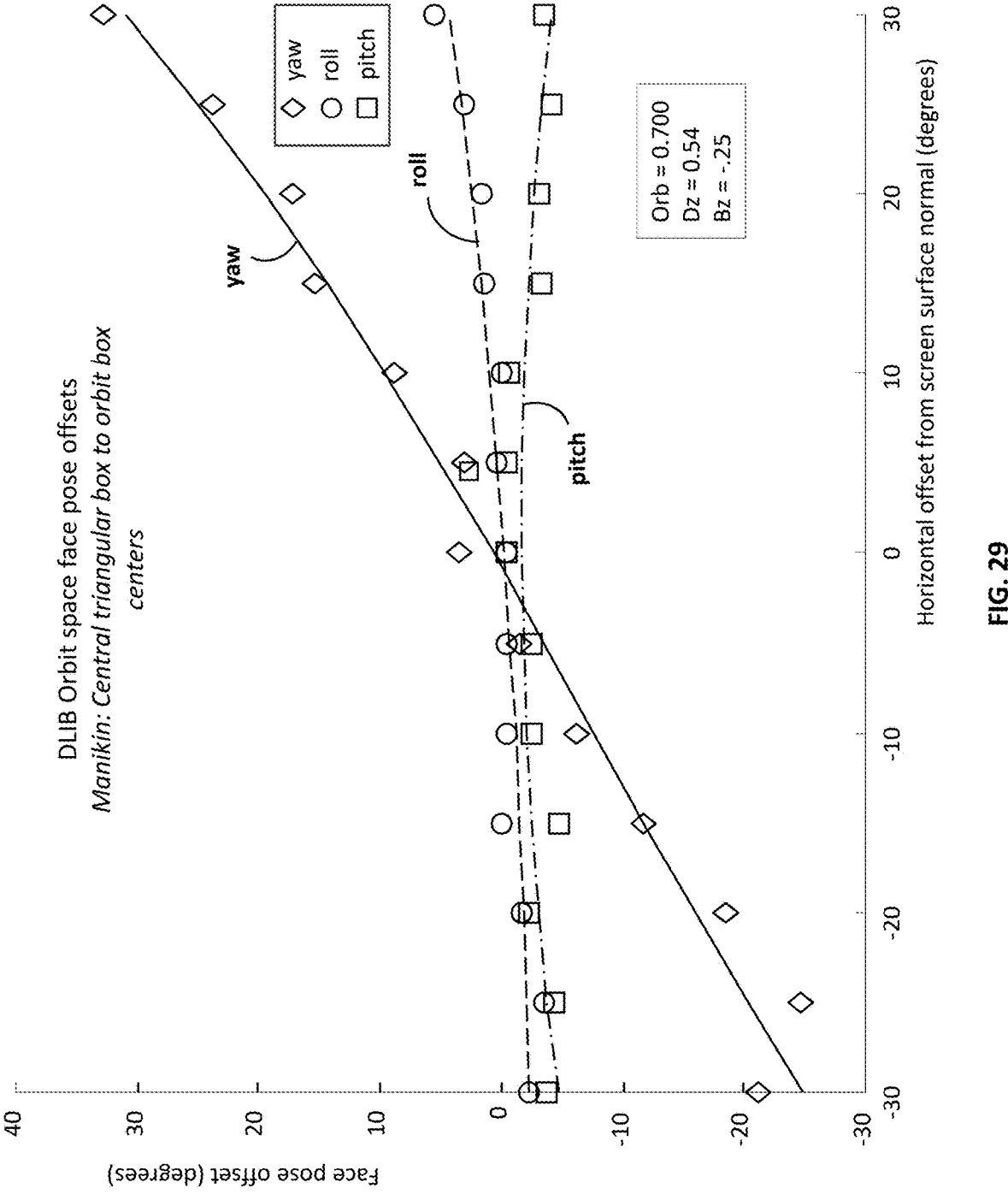

FIG. 29 is a Plot of manikin's face-pose offset of the central face triangle to orbit centers in orbit space.

Figure 30:
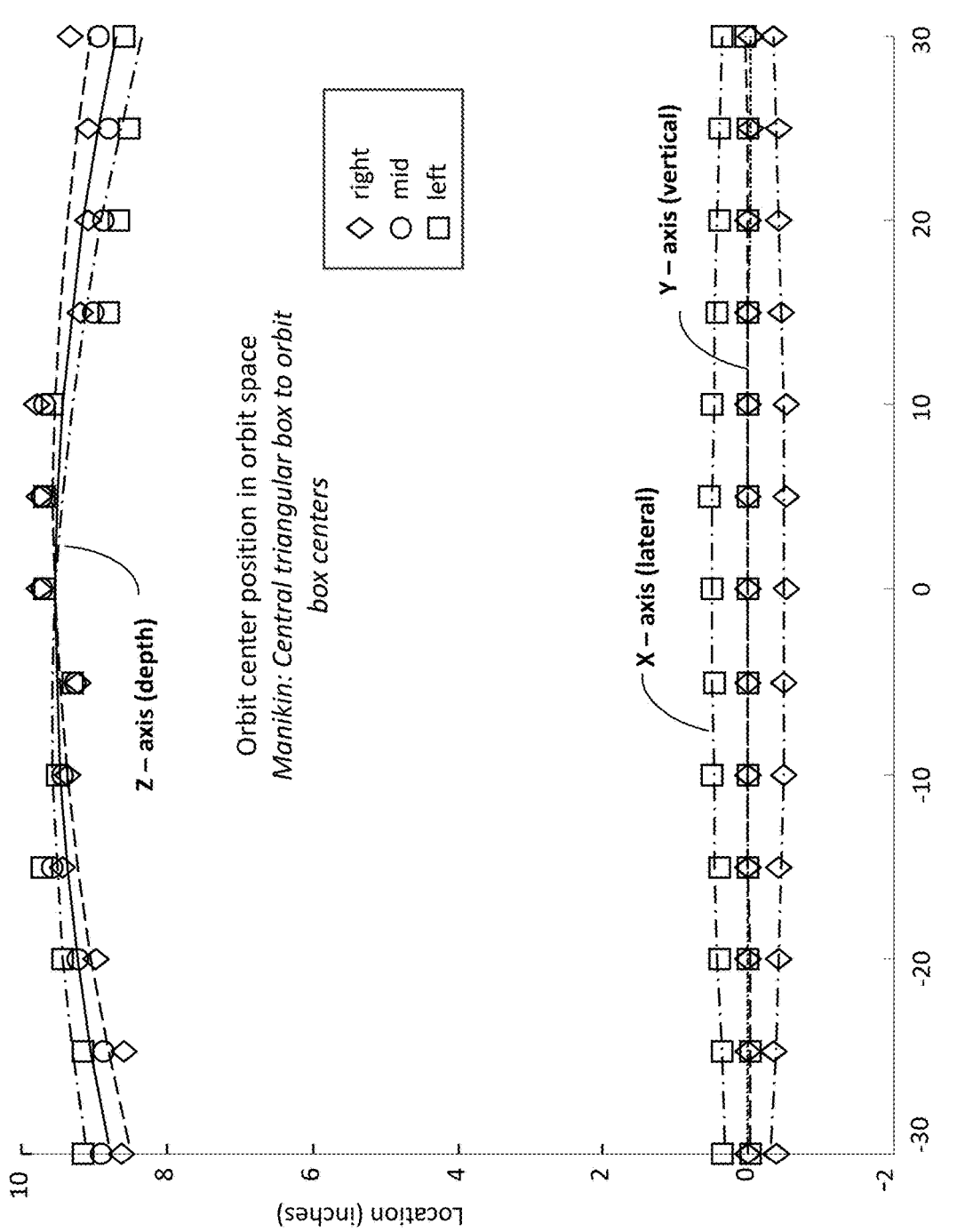

FIG. 30 is a Plot of orbit margin center position in orbit space.

Figure 31:
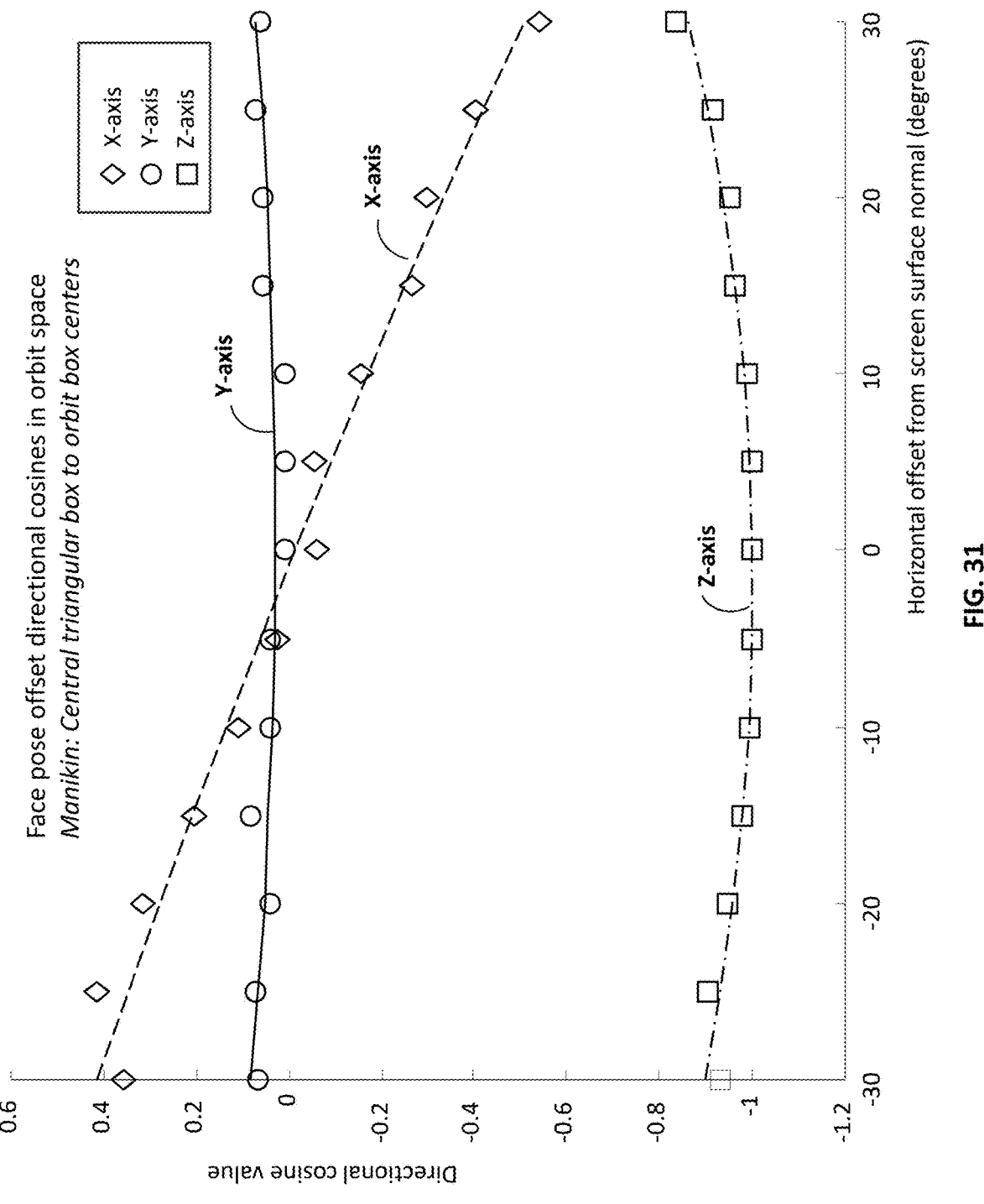

FIG. 31 is a Plot of directional cosines for face-pose offset in orbit space.

Figure 32:
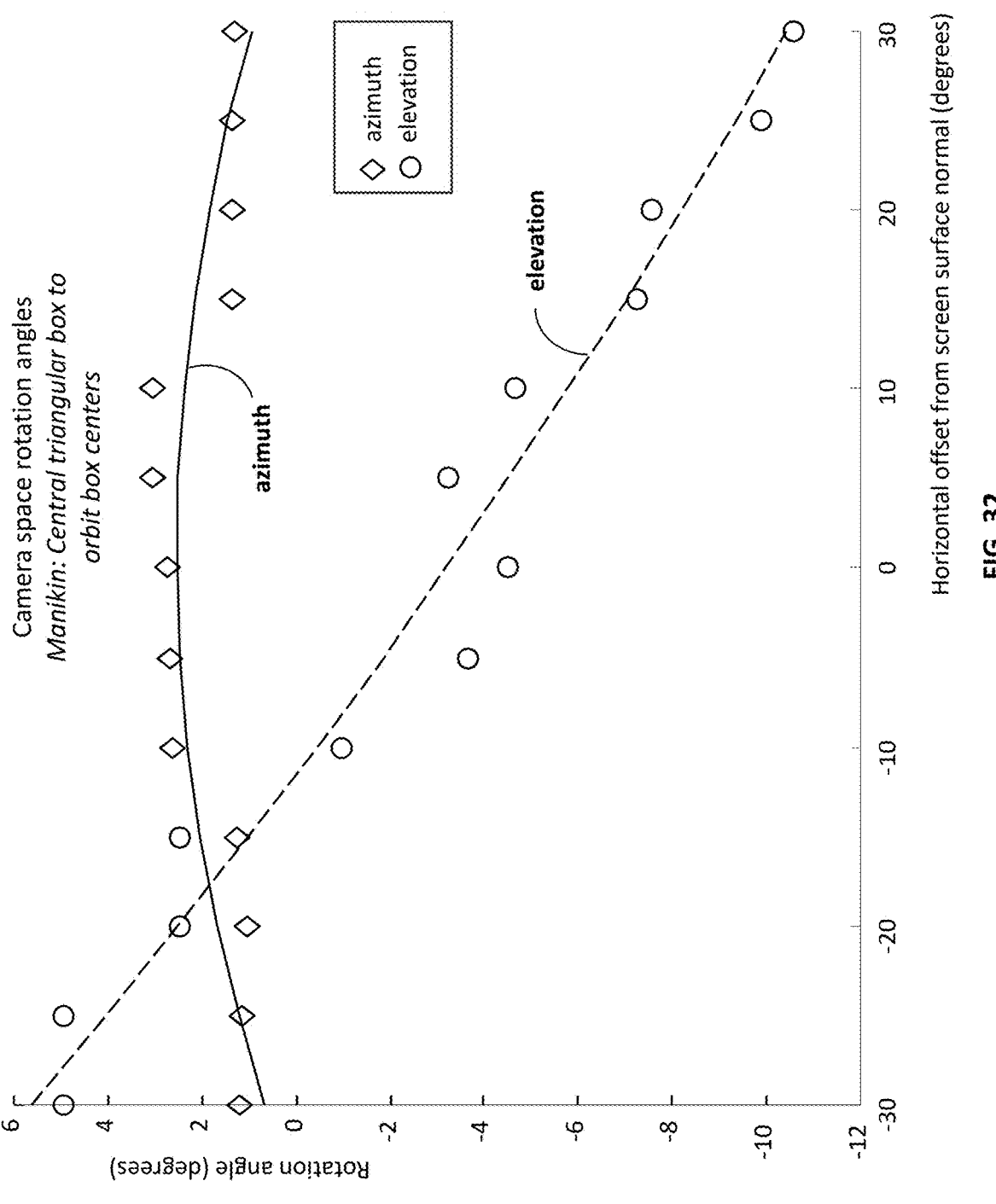

FIG. 32 is a Plot of azimuth and elevation rotation angles mapping orbit space to camera space.

Figure 33:
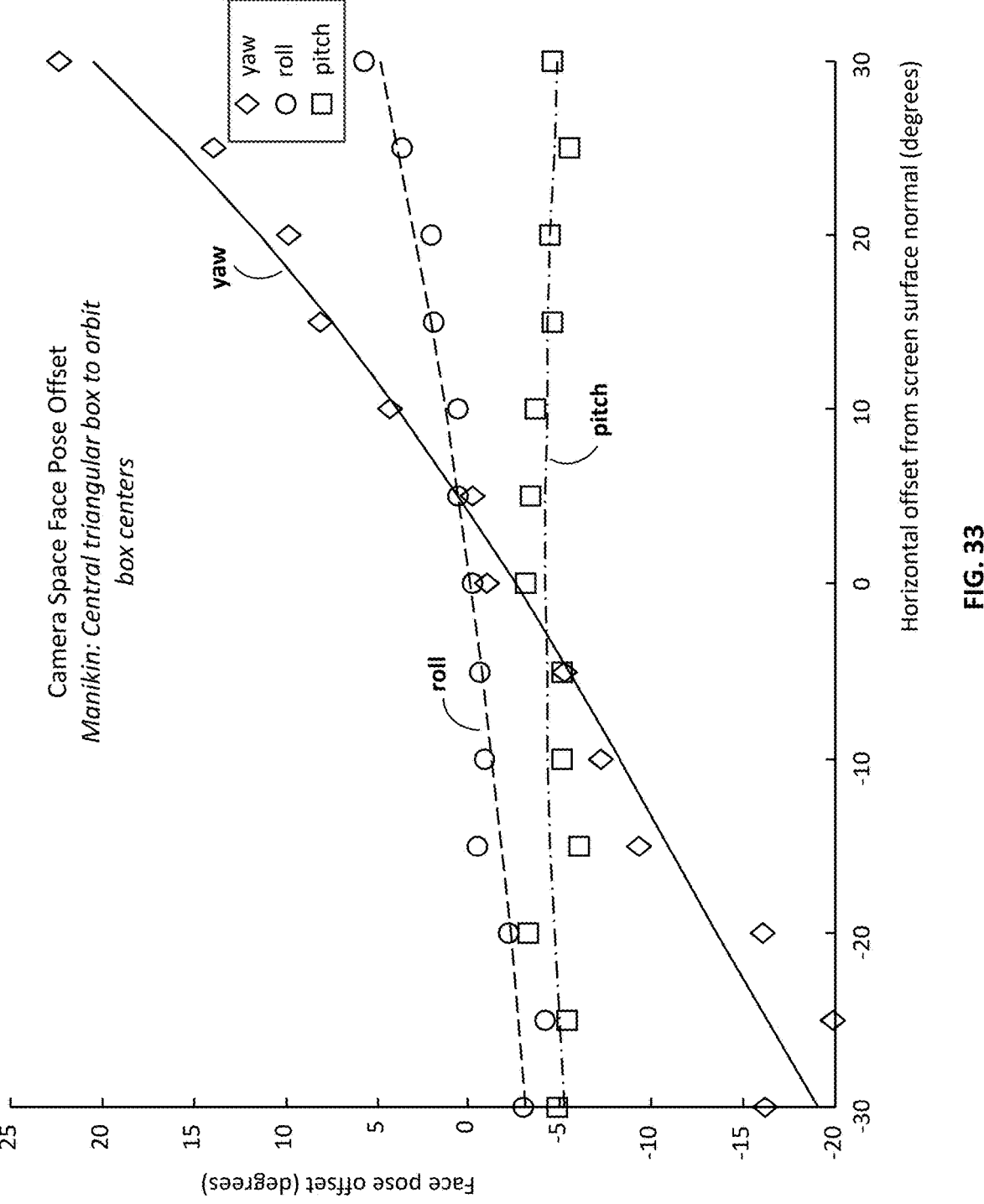

FIG. 33 is a Plot of face-pose offset in camera space.

Figure 34:
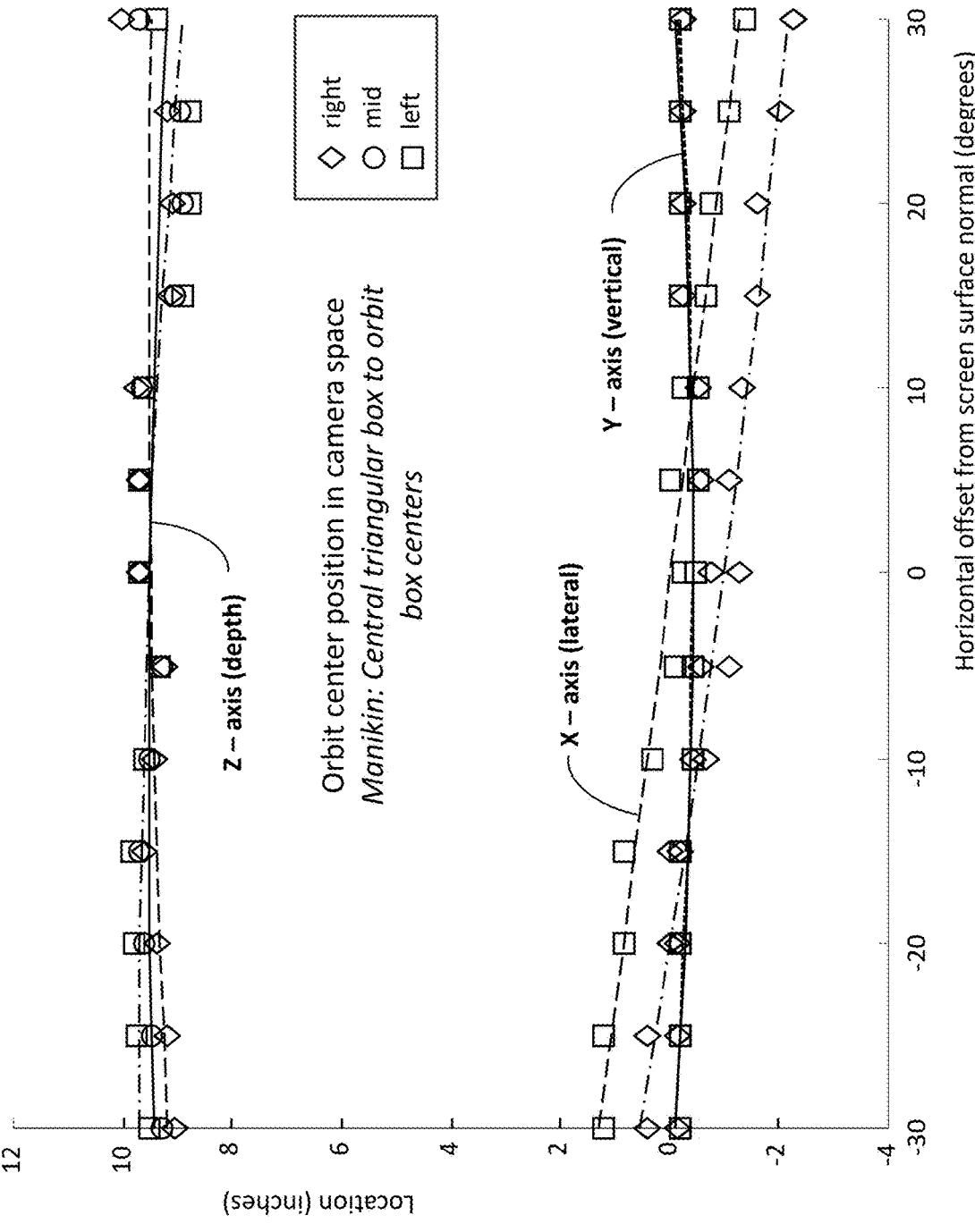

FIG. 34 is a Plot of orbit margin center position in camera space.

Figure 35:
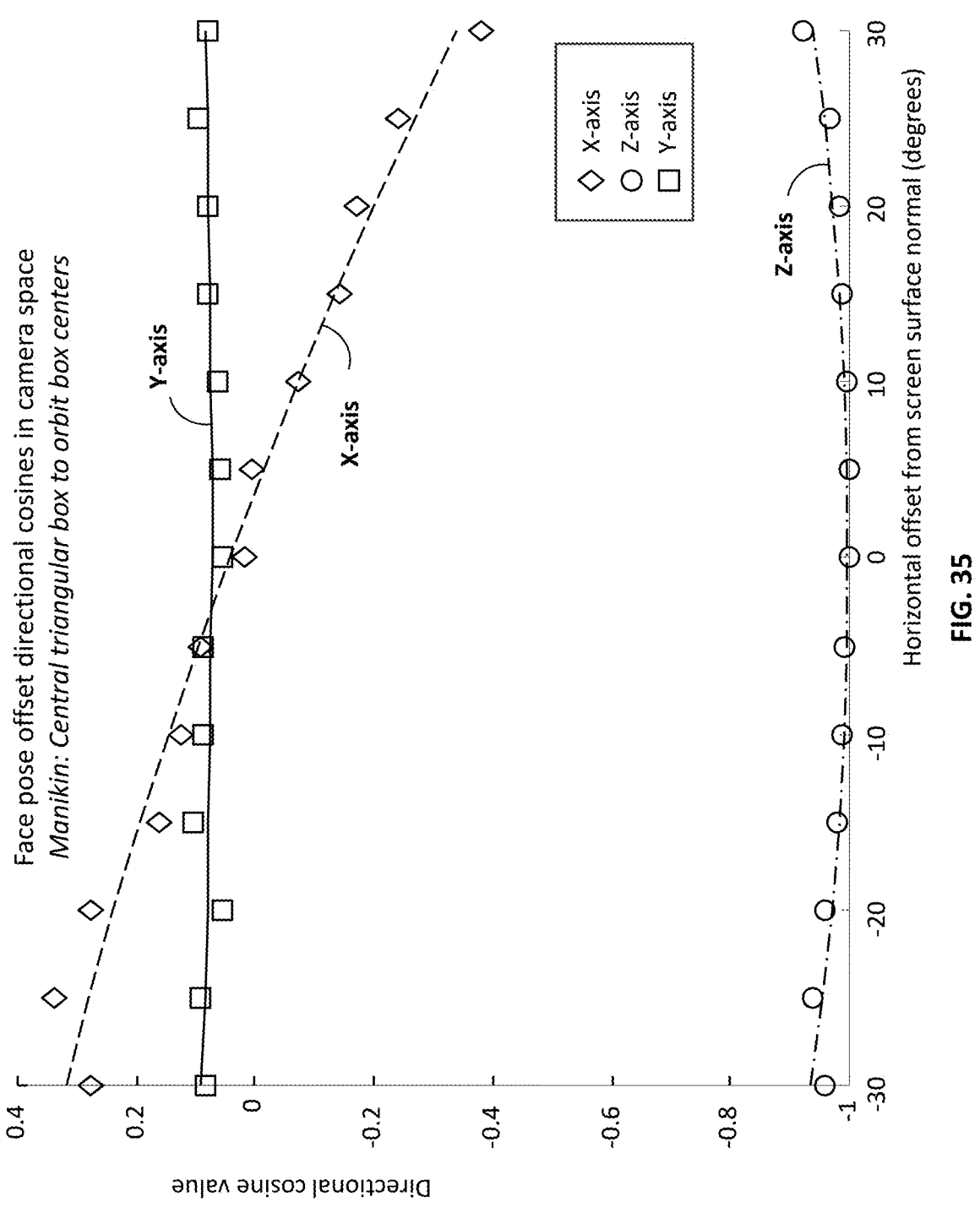

FIG. 35 is a Plot of directional cosines for face-pose offset in camera space.

Figure 36:
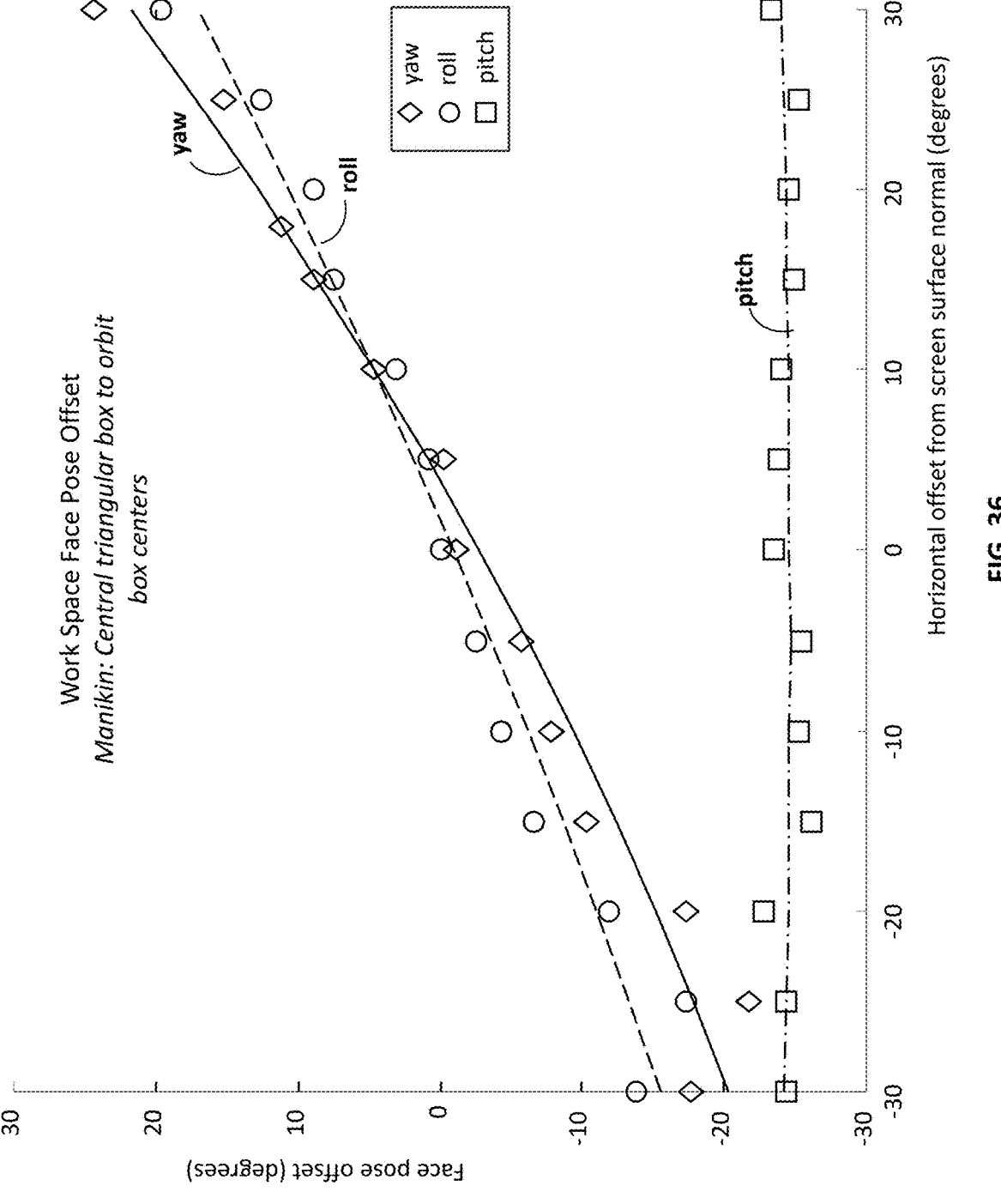

FIG. 36 is a Plot of face-pose offset in workspace.

Figure 37:
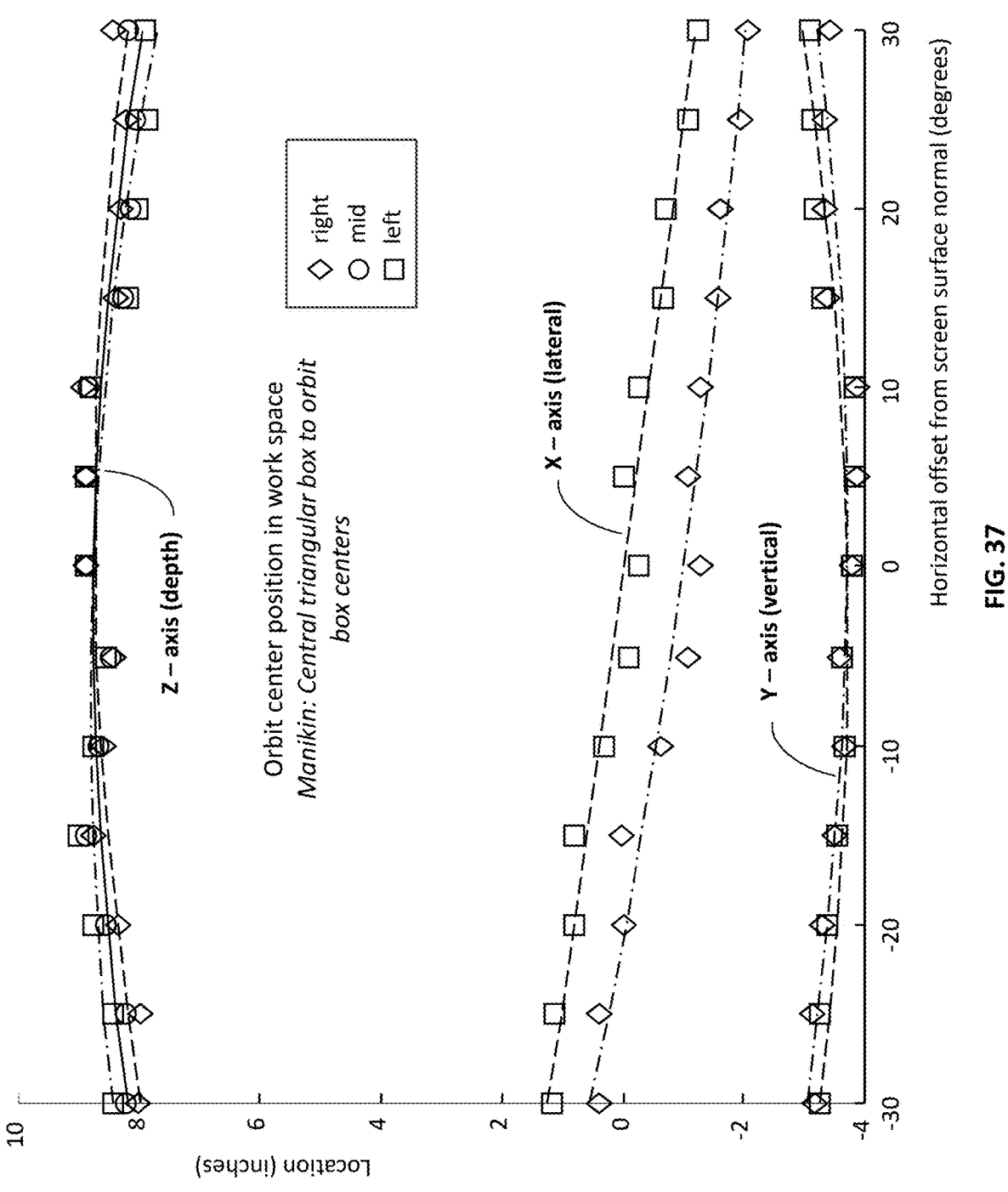

FIG. 37 is a Plot of orbit margin center position in workspace.

Figure 38:
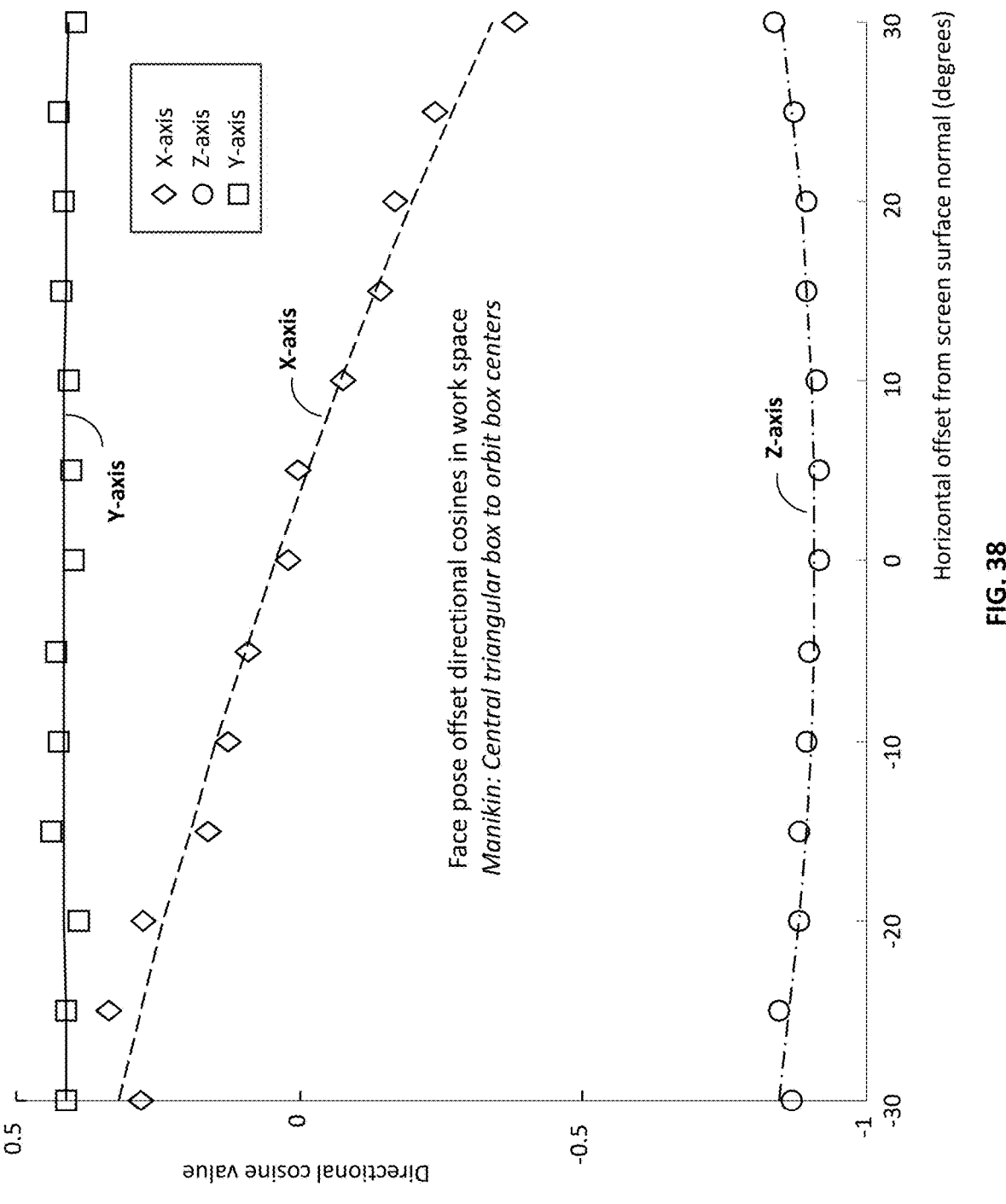

FIG. 38 is a Plot of directional cosines for face-pose offset in workspace.

Figure 39:
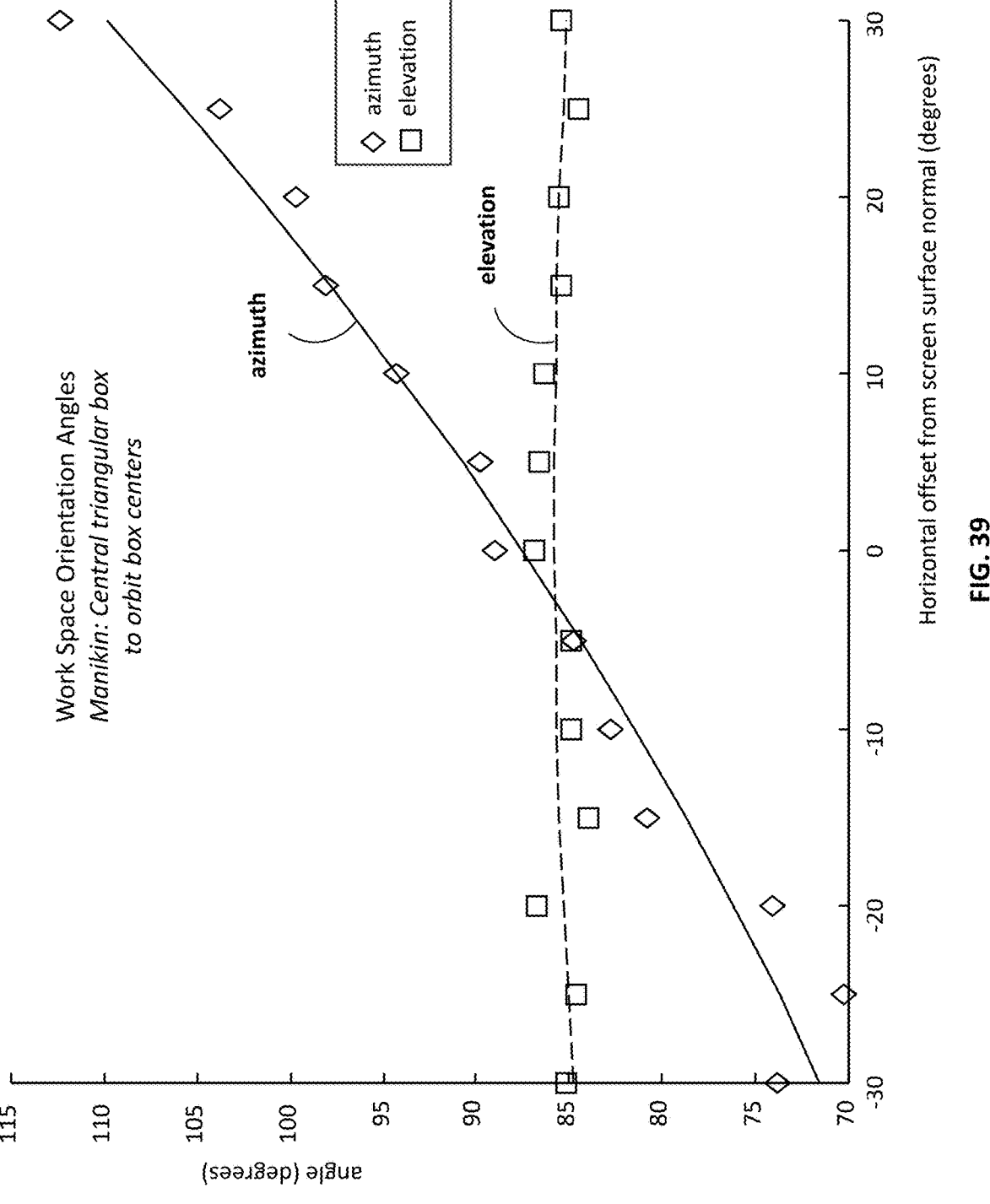

FIG. 39 is a Plot of orientation angles in workspace.

Figure 40:
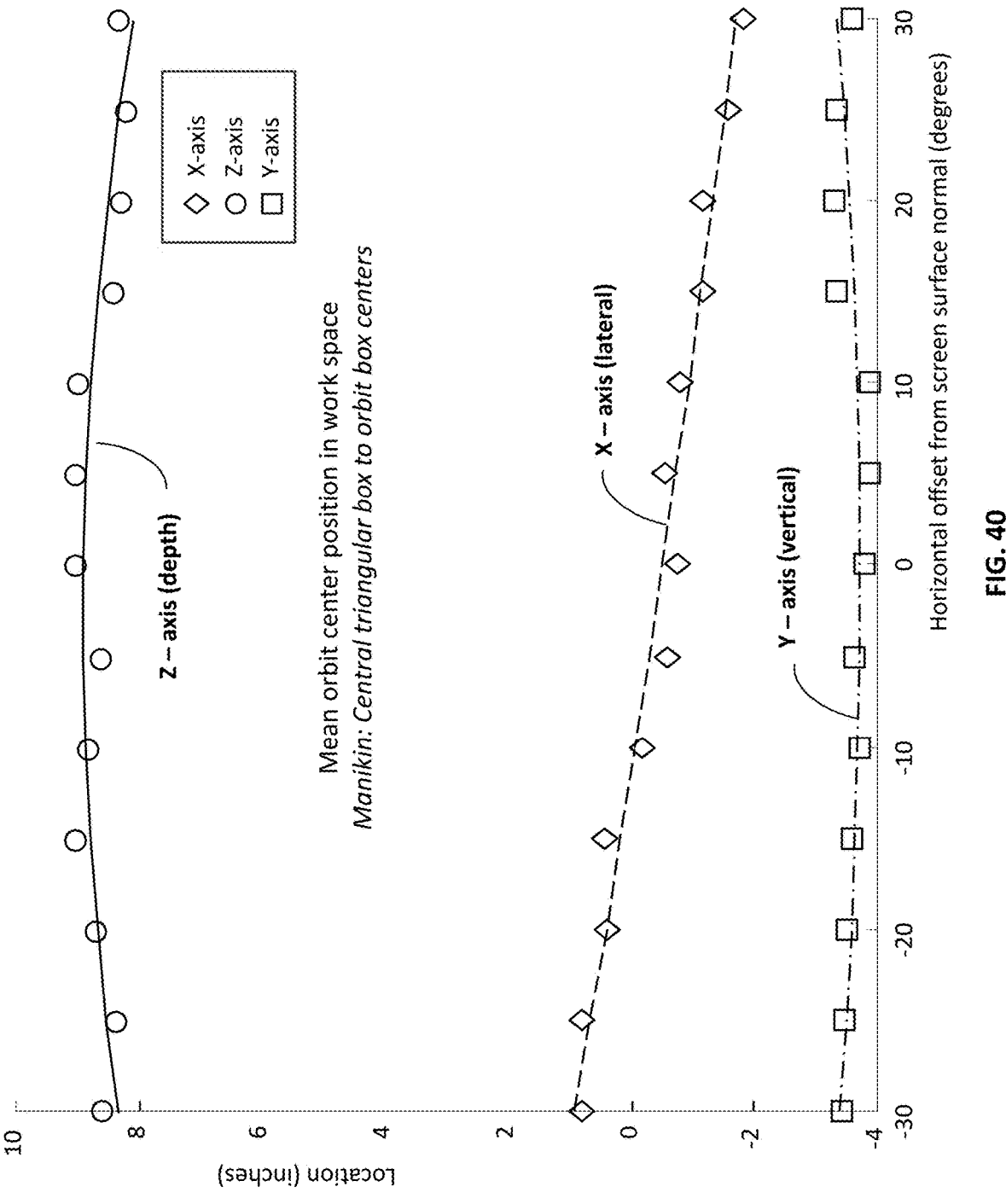

FIG. 40 is a Plot of mean orbit margin center position in workspace.

Figure 41:
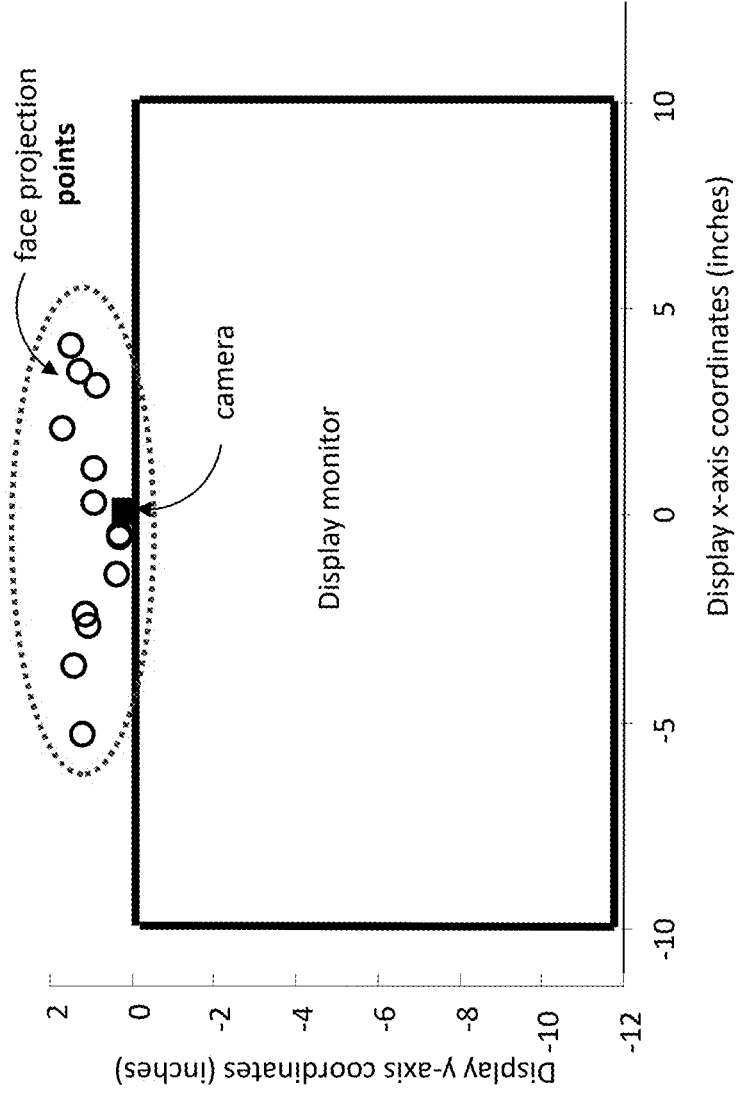

FIG. 41 is a Figure showing the projection of face heading onto workspace surface.

DETAILED DESCRIPTION OF THE PREFERRED EMBODIMENTS

Embodiments comprising an invention as a method for determining face-pose orientation and position for a visual image are described here in detail with reference to the appended drawings. In an exemplary embodiment with further application to video images, described in detail are the method elements and apparatus therefor, relevant facial features and physical structure, the feature imaging, ensuing mathematical equations for the orientation, in particular for the Euler angles of yaw, pitch, and roll, and those for the pose position, implementation of these equations in the method as a process determining face-pose, as shown by a demonstrative application, and the incorporation of the method with morphable models of the face for corrections of illumination and facial texture offsets when such preclude derivation of face marks from the original image.

Method Elements and Apparatus

Figure 1:
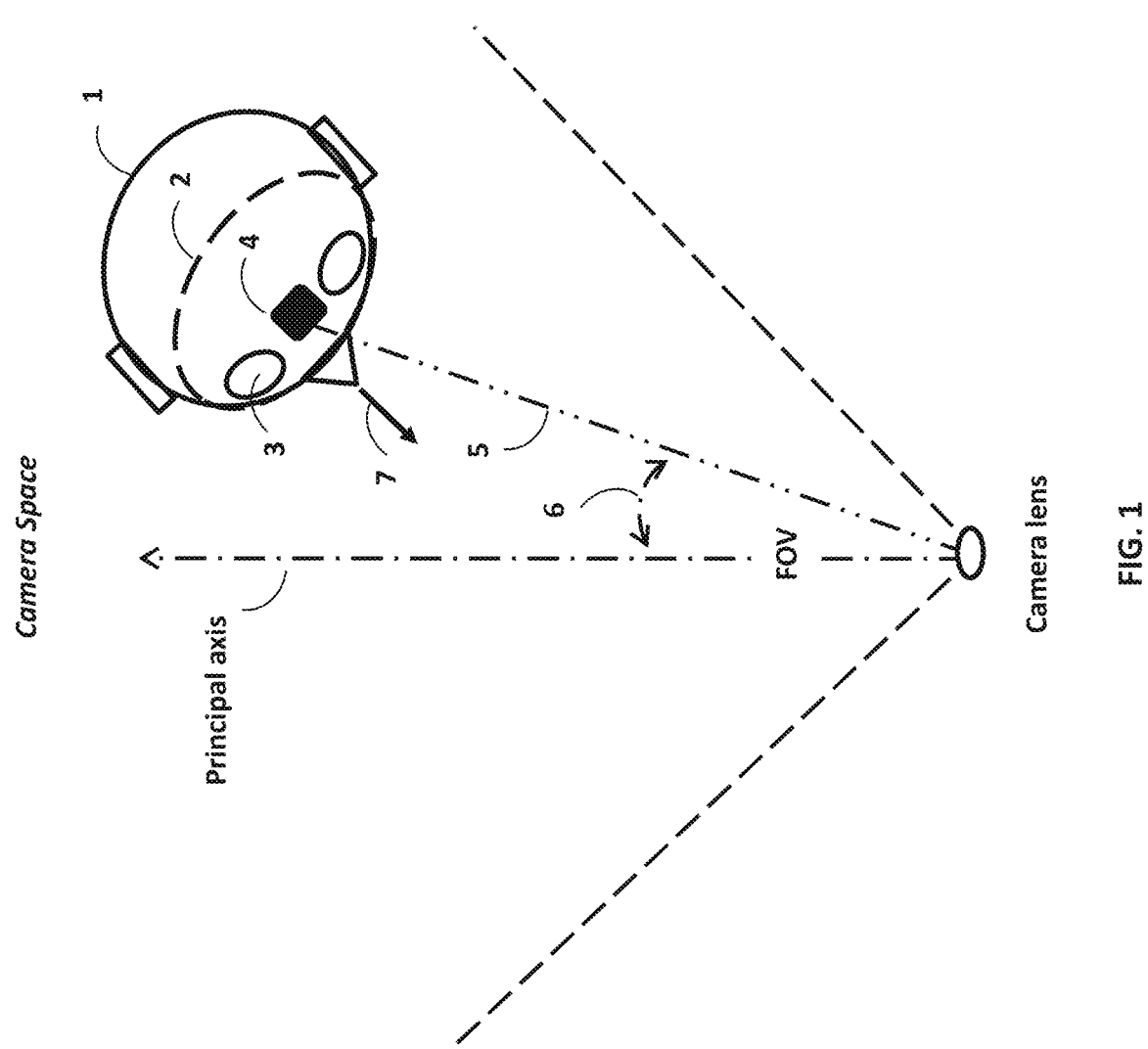
FIG. 1 is a Diagram showing conceptualization of the method.

FIG. 1 is a sketch showing a conceptualization of the method here using an imaging device composed of camera lens, principal viewing axis, and field of view (FOV), for imaging a (top view) human head 1, having a face 2, with superimposed eye-orbits 3, and a set of face related marks 4. Here, the face marks are located in the camera space by the angular offsets 6 and radial distance 5 to the marks, and in turn, the orientation 7 of the head pose from the offsets among the face marks. The unique contributions of the method are to the specification of particular face related marks and method for determining the head pose orientation and position from these marks.

Figure 2:
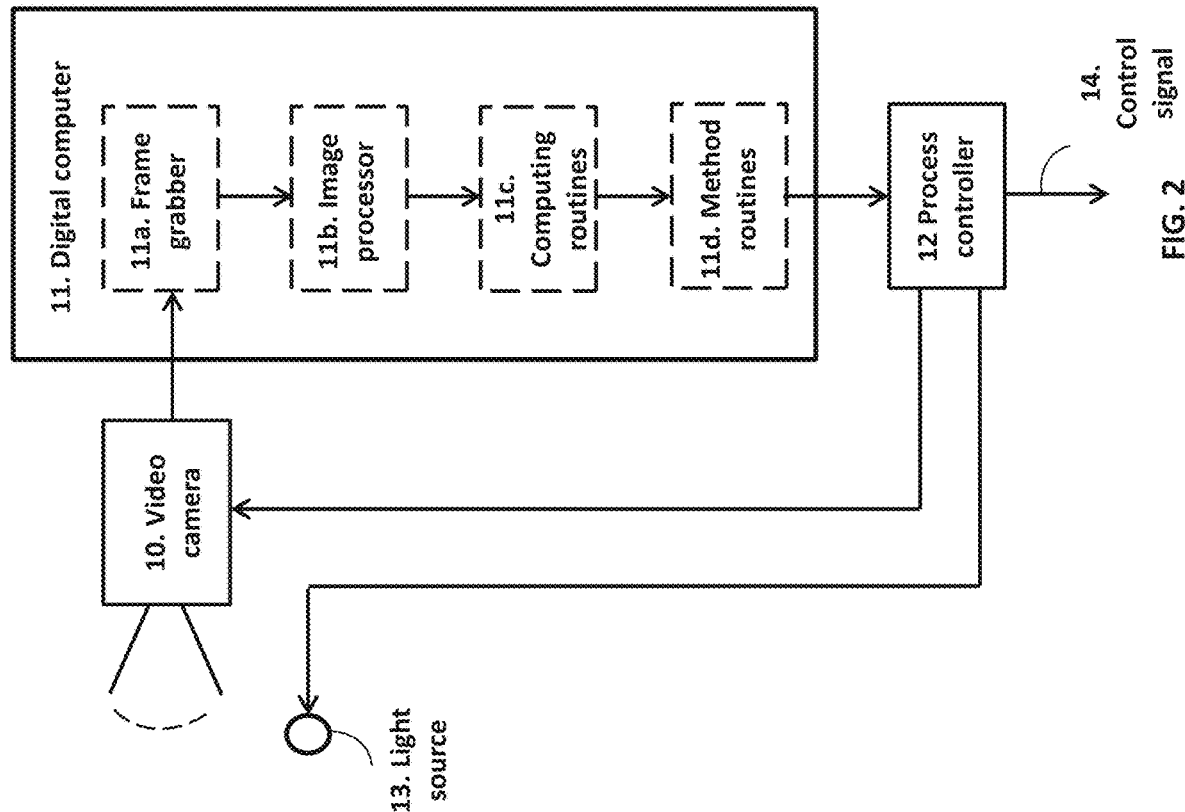
FIG. 2 is a Diagram showing an apparatus for the method.

FIG. 2 is a sketch of an apparatus for utilization of the method for determining face-pose, with a video camera 10 collecting a scene image, with output possibly to a digital computer 11 having routines for an image frame grabber 11*a*, image processing 11*b*, computation of pertinent image elements 11*c*, and method processing 11*d* for determining face orientation and location, with output to a process controller 12. The latter has outputs controlling the camera and a light source 13 for illuminating the camera viewed scene, and output of a control signal 14 for interaction with an application, possibly a workspace such as a user's display. The control of the camera may be of such parameter setting as light filter selection, field-of-view, focus length, aperture, resolution, viewing placement and orientation, as well as others such as camera selection for multiple cameras. The control of the light source may be of such parameter settings as luminous flux and intensity, radiant spectrum, nature of light such as visual or infrared, visual light color hue, saturation, and lightness, as well as others such as light source selection for multiple light sources. The apparatus may include a photometer for measuring ambient lighting for use in the light source settings.

The process controller may be a routine within the digital computer or a separate device with input from the computer. The computer system may be programmed with one or more operating systems (generally referred to as operating system (OS)), which may include OS/2, Java Virtual Machine, Linux, Solaris, Unix, HPUX, AIX, Windows, Windows95, Windows98, Windows NT, and Windows 2000, Windows ME, Windows XP, Windows Server, Windows 10, Windows 11, among other known platforms. At least a portion of the operating system may be disposed in the memory. In an exemplary embodiment, the memory may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

The memory may store non-transient processor-executable instructions and/or data that may be executed by and/or used by the processor. These processor-executable instructions may comprise firmware, software, and the like, or some combination thereof. Modules using processor-executable instructions that are stored in the memory may comprise those for camera and lighting control, frame grabber, image processing, method processing with application, and with output control for a process controller. The processor-executable instructions may be coded in any of the computer programming languages such as FORTRAN, C, C++, and Python, among other known languages. The image processing may be with routines of the OpenCV and Dlib reference libraries, among others.

Figure 3:
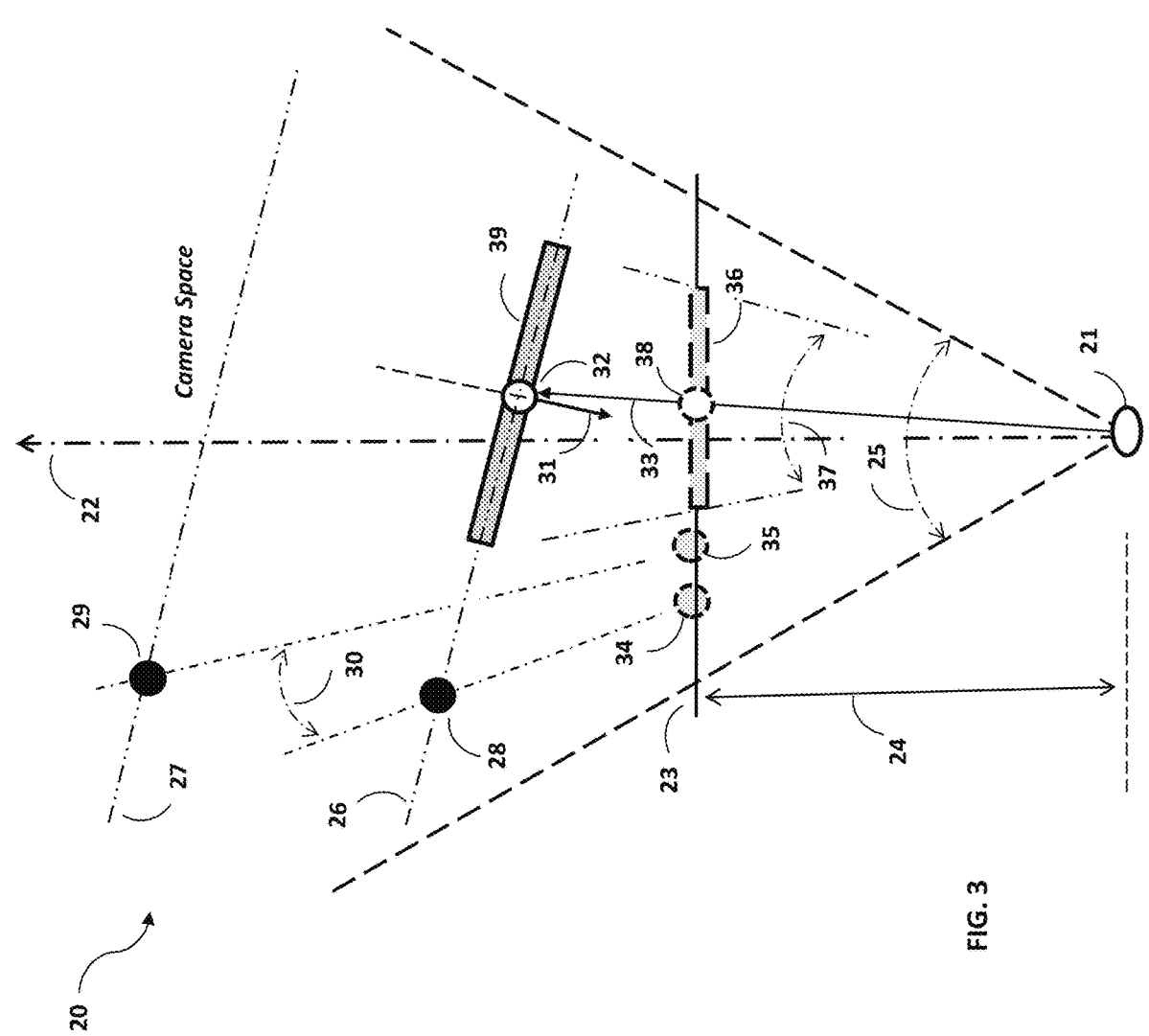
FIG. 3 is a Diagram of method elements.

FIG. 3 is a sketch of the essential elements 20 pertinent to the method here using an imaging device composed of camera lens 21, principal viewing axis 22, field of view (FOV) 25, and projection image plane 23 for the lens positioned at the focal length 24. The device is shown imaging a user's face the physical front aspect of which is delineated by a representative face-plane 27, with an eye-orbit 39 on the face in turn delineated by a representative orbit plane 26. Projected to the image plane 23 are marks on the face plane 29 as images 35, marks on the orbit plane 28 as images 34, the orbit margin 39 as image 36, and the orbit center 32 as image 38. The orbital margin or rim refers to the anterior circular margin of the orbit, and is relatively constant in size with no significant difference between sexes, age groups, or ethnicities for the adult human. With knowledge of the physical size of the orbit, the projection ray length 33 to the orbit center from the camera lens is calculated with the orbit angular span 37 as determined from the image plane. With judicial selection of the face and orbit plane marks, the orientation of the user may be determined as the offset of the facial normal 31 to the projection ray 33, from the offset between the marks 30. Further, the location and orientation of the eye orbit margin may be determined in the camera physical space from the angular offset of the projection ray 33 from the principal axis 22, and from the length of the ray 33. While the above is an overview, further description of the method, functionality, and advantages will be elaborated upon in what follows.

Figure 4:
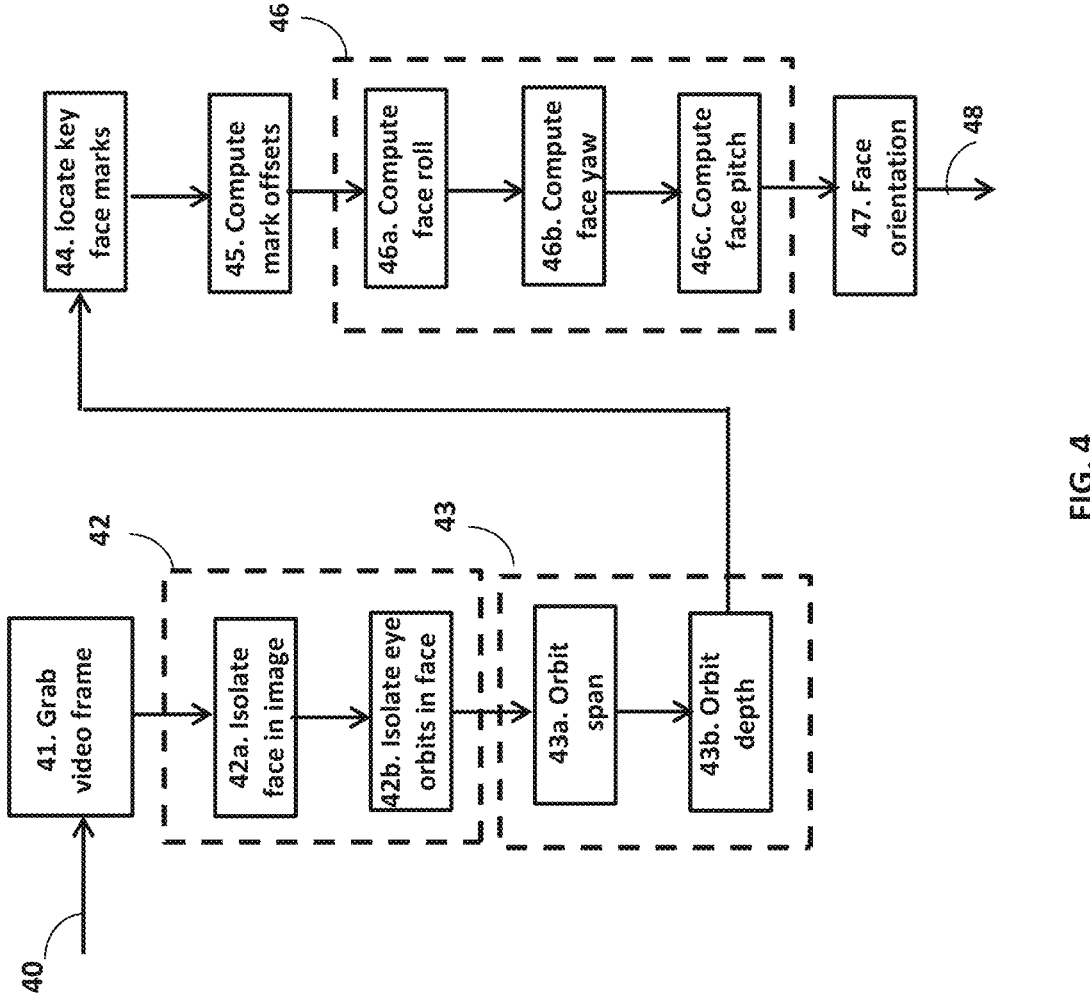
FIG. 4 is a Flowchart of method process.

FIG. 4 is a flowchart of a process for the method computing the user's face-pose orientation. Here, the method with the grabbing 41 of a video frame from the camera output 40, proceeds with isolating 42 an image of the user's face 42*a* in the video frame, and that of the eye-orbits 42*b* in the face image, computing 43 the orbit camera depth 43*b* from the orbit image angular span 43*a* given the orbit physical size, locating key face marks 44 in the face and orbit plane images, and computing offsets between the marks 45. The face-pose is computed 46 as the pose roll 46*a*, pitch 46*b*, and yaw 46*c* from the mark offsets and the orbit depth, and the face orientation is computed 47 in turn from the pose offsets, with output 48.

In this embodiment of the method, image processing techniques are used to isolate the user's face in the video frame and the eye-orbits in the face image; key face-marks used to determine the face-pose orientation are computed from the face and orbit locations. In this disclosure, the method is demonstrated using both the OpenCV Haar cascade classifier routines for face and eye-orbit detection, and the Dlib face-pose routines for face detection and face landmark shape detection from the Dlib Library. The OpenCV Haar classifier uses a statistical boosted rejection tree cascading method based on local binary diagonal and rotated pattern image features composed of edges, lines, and center surround elements. The Dlib classifier uses HOG (Histogram of Oriented Gradients) and linear SV M (Support Vector Machine) methods applied to a template of such image features. Both routines use machine learning techniques for training the classifiers from a large set of face images in different poses and settings for generalized application.

Facial Features and Physical Structure

Figure 5A:
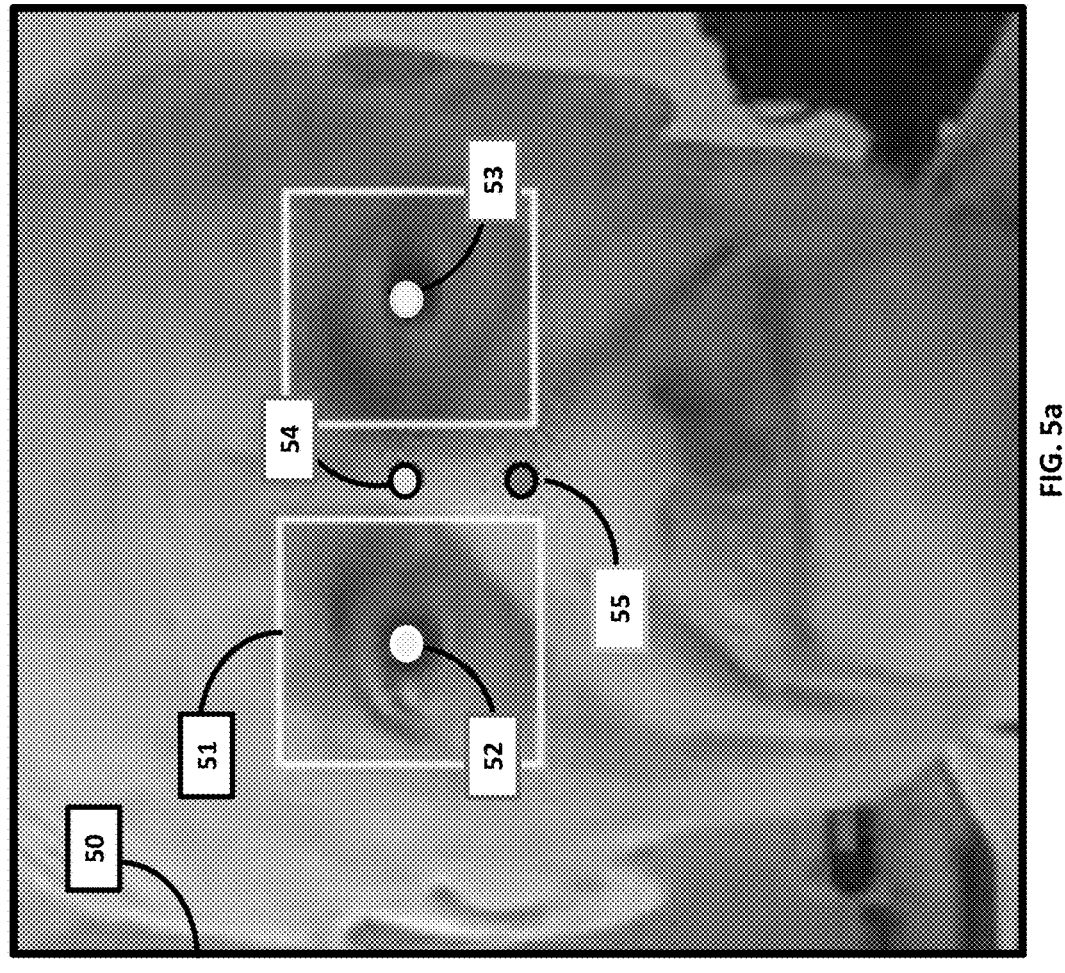
FIG. 5a is a Picture of visual image showing isolated face with graphic overlays of face box, eye-orbits boxes and key face-marks derived with method using OpenCV image processing routines.

FIG. 5*a* shows a user with face in a gray-scaled image, isolated by OpenCV image processing routines (OpenCV Library: http://opencv.org) in a frontal face-pose, where the face image is framed by a bounding square shaped face-box 50 and the eye-orbit margins bounded by extended square eye-boxes 51. Added as image overlays are key face-marks here composed of the face-box center 55, the eye-orbit margin centers 52 and 53, and the average of the eye-orbit margin centers 54. In this application, the face and eye-orbits were isolated using the Haar cascade classifiers of: 'haarcascade_frontalface_alt2.xml' for the face, and 'haar-cascade_eye.xml' for the eye-orbits. The key face-marks are computed from the image processing results and added to the image.

Figure 5B:
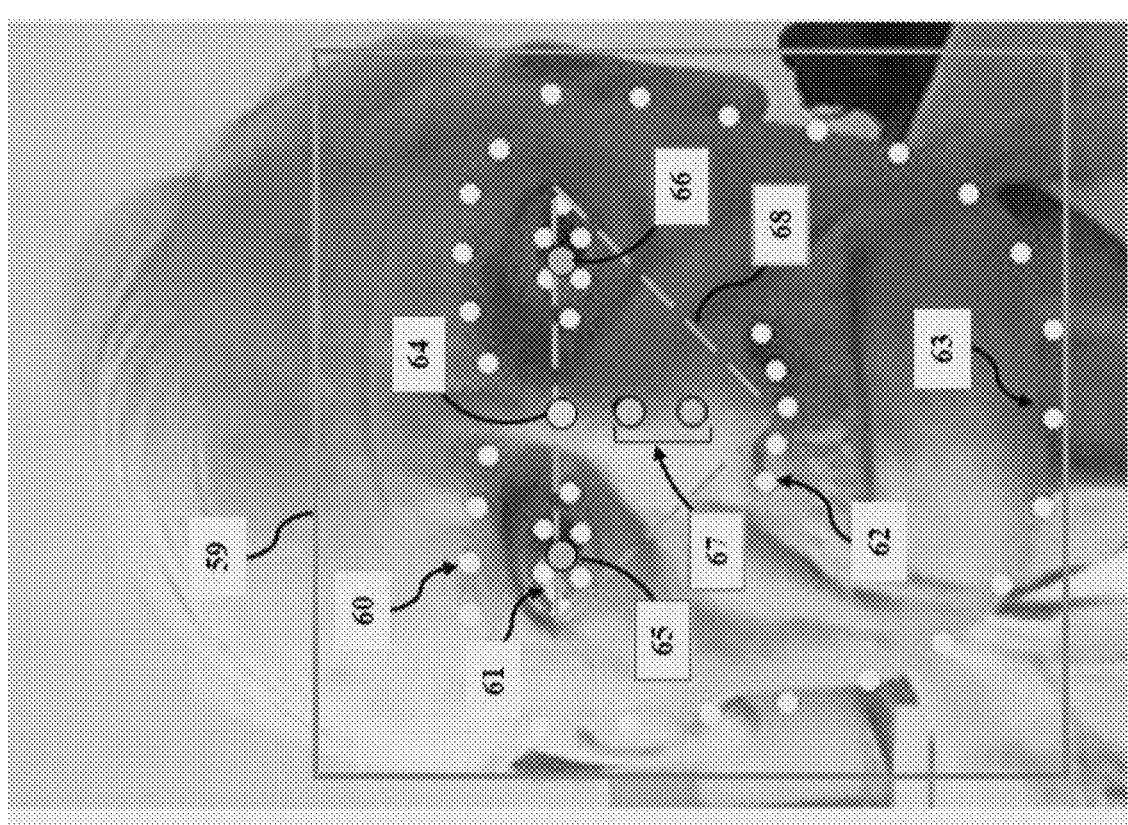
FIG. 5b is a Picture of visual image showing isolated face with graphic overlays of face box, eye feature tic marks, and other key face-marks derived with method using Dlib image processing routines.

FIG. 5*b* shows a user with face in a color image (grayed for publication), isolated by Dlib image processing routines (Dlib C++ Library: http://dlib.net) in a frontal face-pose, with face shape tic-marks of eye-brows 60, eye-lids 61, nostril 62, and face edge including the chin 63. The face may be detected using the pre-trained 'dlib.get_frontal_face_de-tector' routine, which returns a bounding rectangular frame for the face image. The face shape tic marks are isolated using the Dlib classifier: 'shape_predictor_68_face_landmarks.dat'. The full face is shown framed by a bounding rectangular face-box 59 over-laid on the image; equivalent framing orbit-boxes may be derived from the eye-brow and eye-lid shape tic marks. Added are key face-marks composed of the eye-orbit margin centers 65 and 66, and the average of the eye-orbit margin centers 64, with the difference between the eye-margin centers as the interocular distance. The key face-marks are computed from the image processing results and overlaid on the image. Further added is a central-face framed by a bounding triangle 68 for the central area of the middle face extending from the outer canthus of the eyes to the nares of the nose inferiorly on the upper lip, with the frame center 67 computed as the average of the bounding vertices; these are reasonably stable facial features. This area incorporates the inferior margin region, nasal dorsum region, infraorbital region overlying the maxilla, and the zygomatic regions overlying the zygomatic bone structure. The frame center for the face box is shown inferior to the triangle center. A still additional bounding frame is composed by the line (not shown) connecting the average superior orbit margin rim to the nasal nares; the center point of this frame is located inferiorly to that for the triangle, but not shown on the image. The central-face bounding triangle is considered to be a central 'face-box' for the Dlib portion of the analysis presented below.

Figure 6:
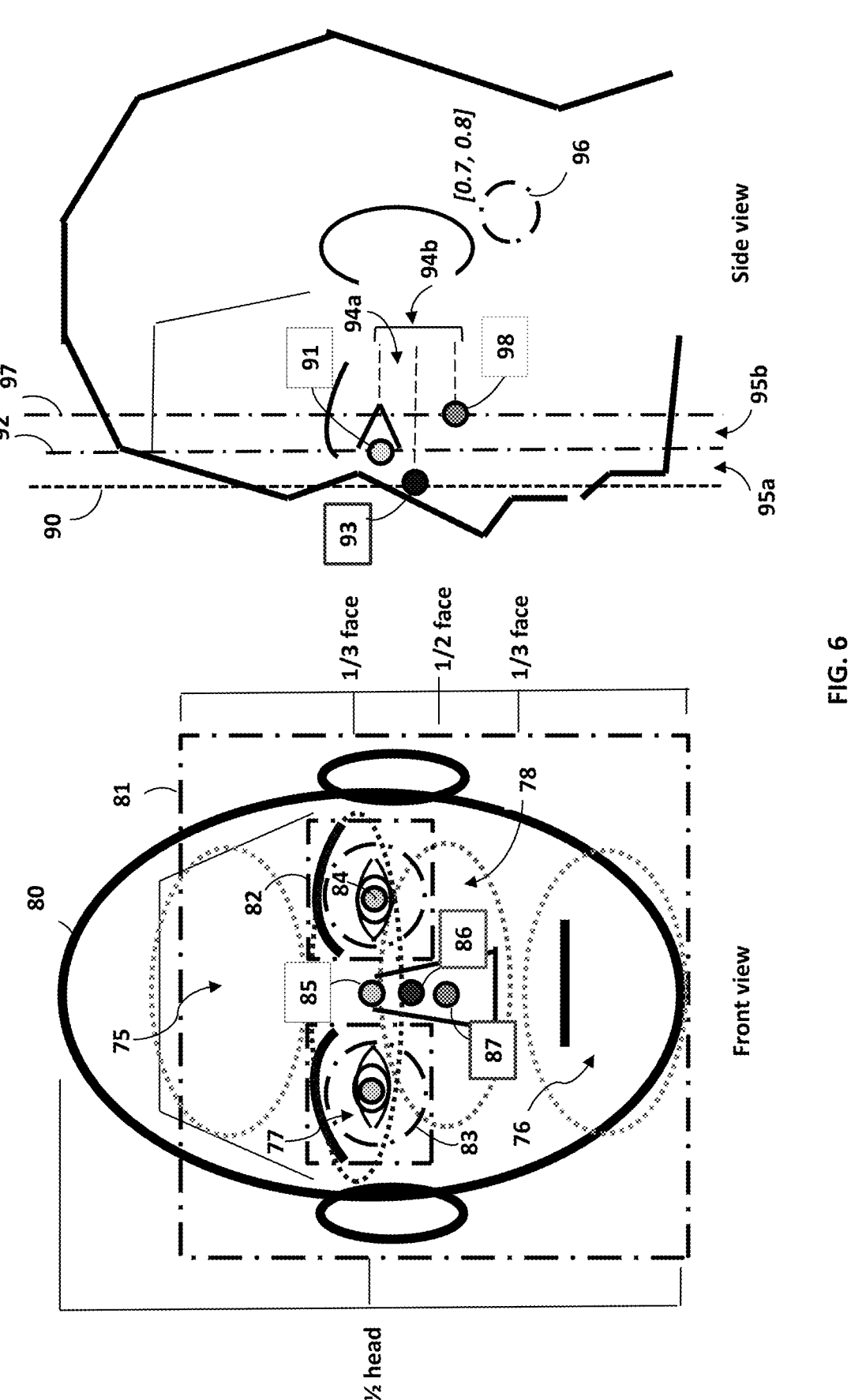
FIG. 6 is a Sketch showing key face marks located in physical structure of the front and side face views, with mark offsets for feature planes.

FIG. 6 shows front and side view sketches of a human head with key face-marks on anatomically located planar surfaces visualized for the face, eye-orbit and central face, as set by the facial physical structure. The sketches are anno-tated with head and face size dimensions for reference. The front view shows the face plane 81 superimposed on the head 80, and in turn the orbit plane 82 enclosing the eye orbit 83, superimposed over the face plane. Here, the face marks are the face-plane center 87, the center 86 of the central face plane, and the orbit mark 85, the latter as the average of the corresponding orbit centers 84; the difference between the orbit centers as the interocular distance. The center 86 of the central face plane for the bounding triangle is shown verti-cally between the orbit mark and the face box center. Note that the orbit center marks are nominally at one half of the head height, and of course the face center at one-half the face height. Considering the facial structure anchoring the planes, the face plane is set physically by the superior frontal region 75 of the forehead and the inferior region 76 consisting of the oral and mental regions, with the oral region the struc-tures of the oral cavity and the mental region demarcating the chin. The orbit plane is set by the superior orbital region 77 and the orbital cavity as set by the orbital margin. The central face plane is set by the middle part 78 of face region composed of the nasal, infraorbital, and inferior zygomatic regions, and buccal region, with the infraorbital region overlying the maxilla and the zygomatic region the zygomatic bone; the buccal region refers to the cheeks comprised by the buccinator muscles (Grujicic, 2023).

The side view shows the face plane 97 displaced a lateral distance 95*b* behind the orbit plane 92 as determined by the face physical structure set by the viscerocranium comprising the facial skeleton. In addition, a plane 90 for the inner face triangle is shown displaced a lateral distance 95*a* in front of the orbit plane. The face plane center 98 is displaced a vertical distance 94*b* below the orbit mark 91, while the inner face center 93 is displaced a vertical distance 94*a* below the orbit mark. Note that the lateral distance for the inner face is roughly equal to the vertical distance from the orbit mid-point multiplied by the sinusoidal of the nasal protrusion from the facial plane, here about 27-degrees. The separation is determined by the locations of the zygomatic bone of the lateral orbital margin and the superior frontal margin of the eye-orbit in the anterior face physical structure (Guyomarc'h et. al., 2014). As an aside, the figure shows the cervical spine atlas as located 96 (dorsal vertebrae C1). Here, the displacement offsets are in the physical dimensions of the face (i.e., inches, centimeters).

Feature Imaging

Figure 7:
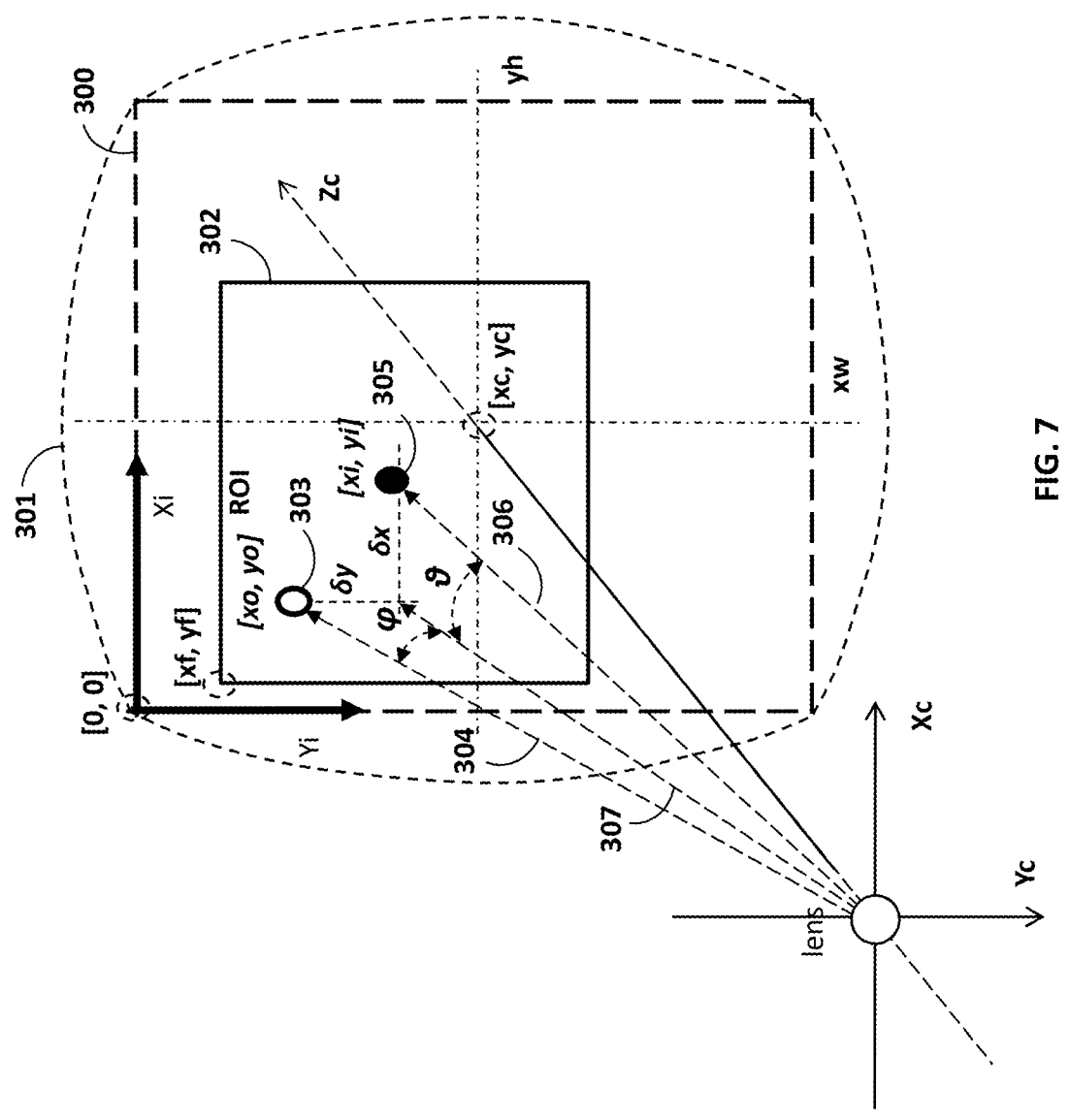
FIG. 7 is a Diagram showing camera coordinate system for visual image of key face-marks.

FIG. 7 shows a camera coordinate system for a video image view of a face box with reference face marks, where the system is composed of cartesian axes Xc, Yc, and Zc, with Zc as the principal viewing axis. Here, the projection image plane 300 with coordinate axes Xi and Yi, is embed-ded in a camera centered spherical coordinate system 301, with the plane origin in the upper left corner. A face box 302 is shown isolated as a region of interest (ROI) located at [xf, yf], within the image plane. Located within the ROI are marks 303 and 305 with coordinates referenced to the origin of the ROI, with mark 303 as a reference mark at [xo, yo] and 305 as of interest at [xi, yi]. The projection ray 304 to the reference mark 303 is here the image view axis from which image offsets are referenced. The interest mark 305 with projection ray 306 is located relative to the reference mark by the vertical δy=yi−yo and horizontal δx=xi−xo, offsets normal to the view axis in image raster units, as located by the ray 307. The linear offsets are converted to the corresponding angular offsets from the view axis as the horizontal azimuth θ, and vertical elevation φ, by the camera FOV and image plane vertical, yh, and horizontal, xw, widths.

Here, the reference mark may be the orbit plane center and the mark of interest the face plane center in the image. A s shall be shown in the following, the offsets of the orbit plane marks from the face plane marks may be used to determine the head pose orientation. For the OpenCV rou-tines, the face plane center may be determined from the height of the face-box; the orbit plane center from the location of the eye-box in the face box and the eye-box width. For the Dlib routines, the face plane center may be again determined from the height of the face-box; the orbit plane centers from the location of the eye-lids tic marks in the face box. The marks are further located in the angular coordinates of the camera spherical coordinate system, as say, elevation and azimuth from the reference view axis.

Figure 8:
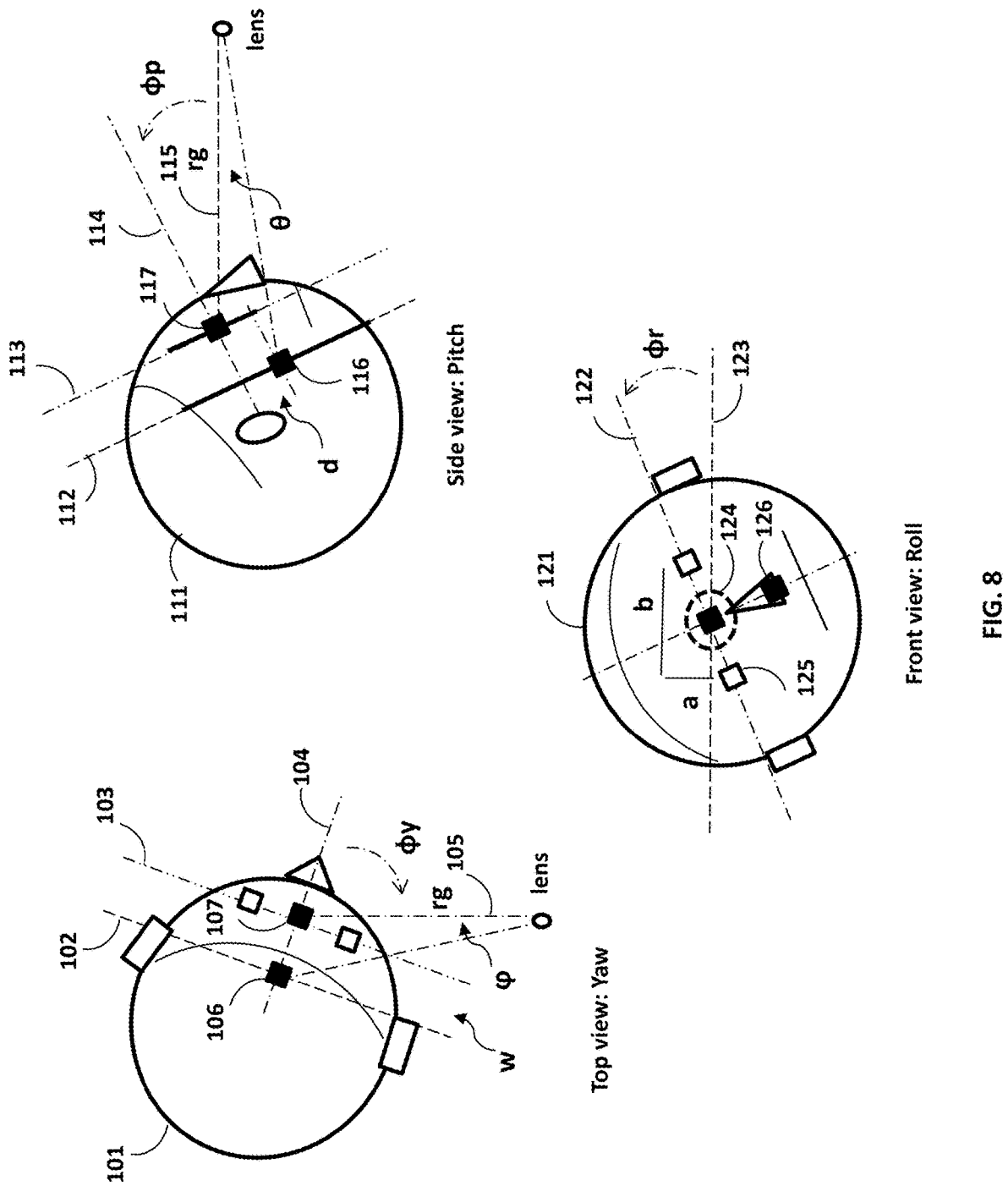
FIG. 8 is a Diagram showing face roll, pitch, and yaw as determined from mark offsets.

FIG. 8 shows the relation between the face and orbit plane mark offsets to the head pose angles of head roll, pitch, and yaw. The lateral offset is a negative value for the face plane anterior to the orbit plate and positive for a posterior offset. Here, for the yaw pose a head is shown in top view 101 with projection ray 105 of length rg from the camera lens to the orbit plane center mark 107 on the plane 103. Another ray at an angle φ to the viewing ray is projected to the face plane mark 106 on the plane 102 displaced a distance w behind the face plane. The head is shown turned an angle $\phi y$ from the projection ray 105 to the face forward direction 104. For the pitch pose, a head is shown in side view 111 with projection ray 115 of length rg from the camera lens to the orbit plane center mark 117 on the plane 113. Another ray at an angle $\theta$ to the viewing ray is projected to the face plane mark 116 on the plane 112 displaced a distance d below the face plane mark. The head is shown pitched upward an angle $\phi p$ from the projection ray 115 to the face forward direction 114. For the roll pose, a head is shown in a front view 121 with projection ray 124 normal to the orbit plane at the center orbit mark. The roll angle $\phi r$ is the angular offset of the line 122 connecting the orbit centers 125 from the camera horizontal reference 123, as determined by the ration of horizontal and vertical displacements of the orbit centers, a and b, $\phi r = \mathrm{atan}(a/b)$; equivalently, the roll angle is the vertical reference of the face plane mark 126 from the eye plane mark at the normal point 124.

Figure 9:
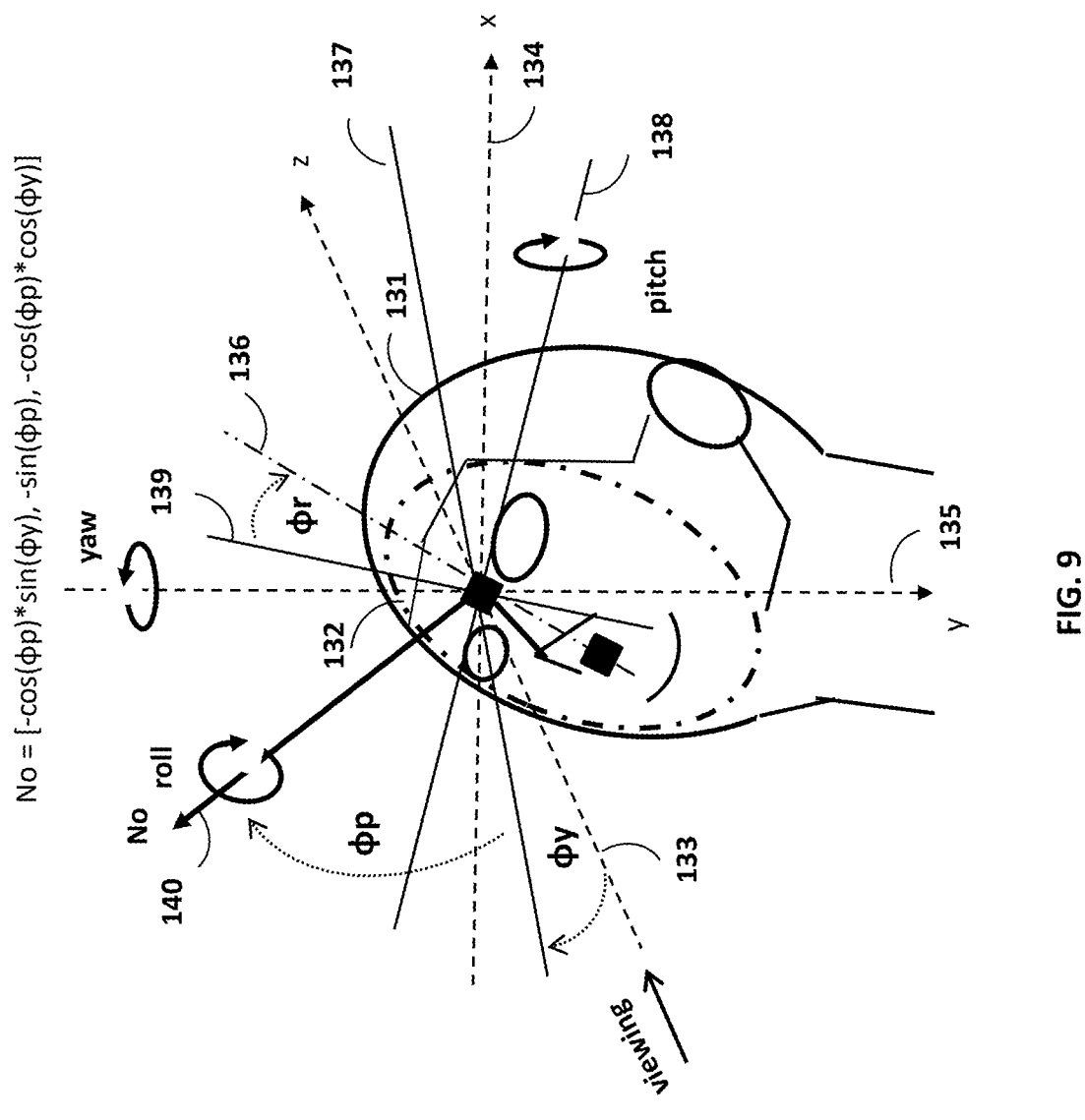
FIG. 9 is a Diagram showing face-pose orientation as a function of face roll, pitch, and yaw.

FIG. 9 shows head pose orientation in terms of head roll, pitch, and yaw relative to the viewing direction. Here, a head schematic 131, with face plane 132, is located in a coordinate system set by the viewed direction 133 as the z-axis, and the corresponding horizontal 134 and vertical 135 angular rotations of the camera spherical coordinate system as local x-axis and y-axis, respectively. The head is shown as turned an angle, $\phi y$, about the yaw axis to line 137, then inclined an angle, pp, about the perpendicular 138 for pitch, resulting in the face-pose orientation, 140, itself acting as a roll axis for $\phi r$ as the angular offset of the line 139 to 136 in the face plane. The normal vector, No, for the face orientation may be expressed in terms of the corresponding directional cosines as: $No = [\cos(\phi p) * \cos(\phi y), -\sin(\phi p), \cos(\phi p) * \sin(\phi y)]$.

Figure 10:
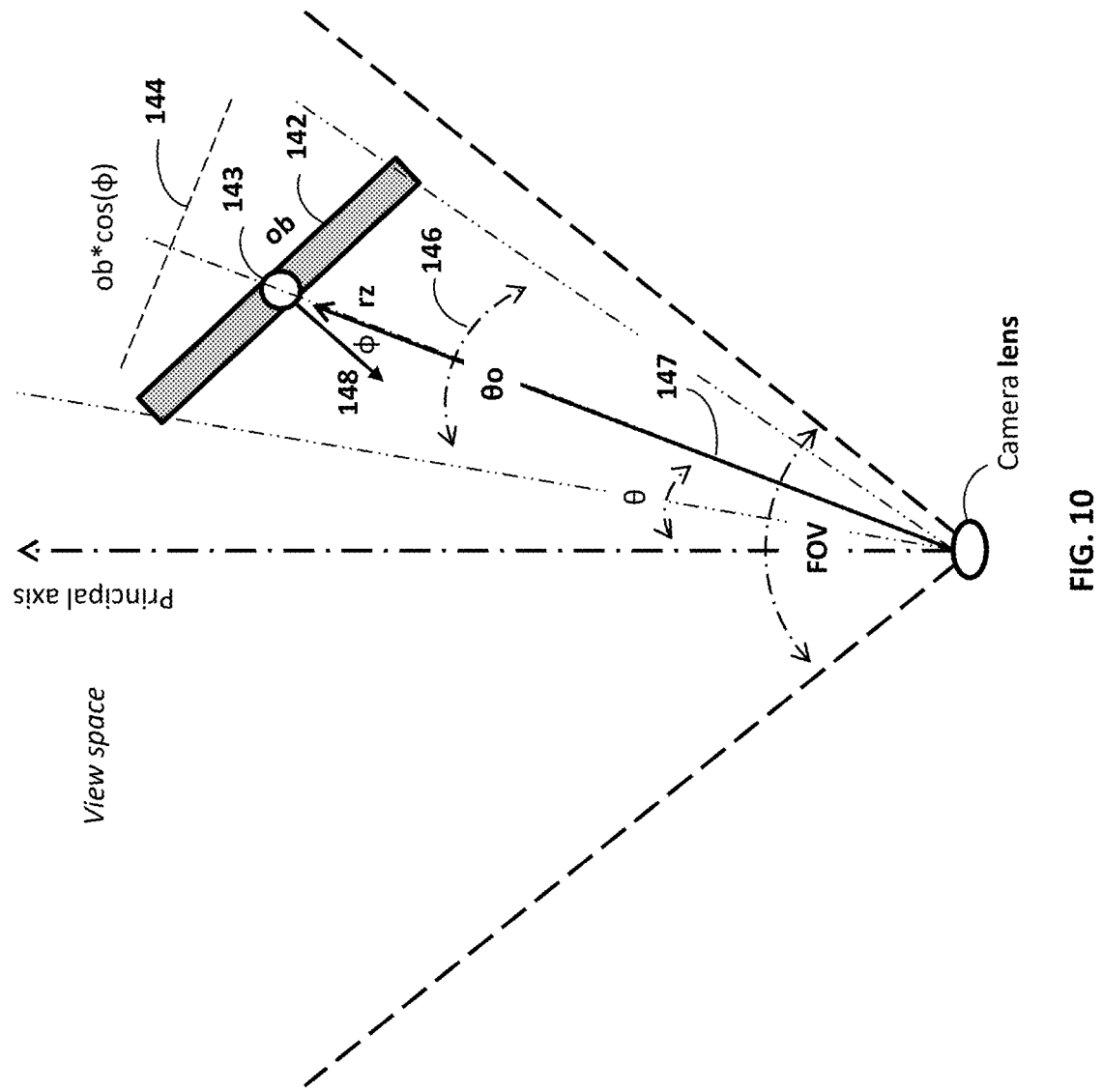
FIG. 10 is a Diagram showing the viewing depth of the facial orbit margin in the camera space.

FIG. 10 shows geometry for estimating the camera depth, rz, for the projection ray 147 to the center 143 of the eye-orbit 142 from the angular span 146, $\theta o$, of the orbit image 144, given the physical width, oz, of the orbit. The span is reduced and the orbit center image shifted to the side for views with the orbit tilted from the normal to the projection ray. Here, the apparent size of the orbit is given by: $ob * \cos(\phi)$, for an offset, $\phi$, of the orbit surface normal 148 from the projection ray, an offset to be determined as the facial tilt and pitch. Here, the depth is $rz = ob * \cos(\phi) * \cot(\theta o/2)/2$. An initial estimate of the range for an iterative process involving determination of the orbit normal offset, is: $rz = oz * \cot(\theta o/2)/2$, which for small angular span, may be approximated further by: $rz = oz/\theta o$. The orbit image span is determined in display raster pixels, $\theta r$, from the video image capture of the user's face (FIG. 7), and converted to angular offsets $\theta o = \theta r * Fv$, with $Fv = FOV/R$, a ratio of the camera field-of-view (FOV) and resolution (R) in pixels. The average physical width of the adult orbit margin is reported as 35.6+/−2.2 mm with no statistically difference between eyes; the margin height as 41.8+/−2.4 mm. The orbit size is strongly correlated with a person's physical height, but otherwise no significant statistical differences between gender, age groups, or ethnicities (Bekerman et. al., 2014; Furuta, 2001).

A n equivalent method for estimating camera depth is from the interocular distance (IOD) between the two medial canthi of each eye with the orbit plane center as the distance center. Here, the angular span 146 is now of the interocular distance, with the depth rz to the orbit plane center 143. The average IOD for men is reported as 64 mm while the average PD for women is about 62 mm. However, the IOD may vary with age, gender, and ethnicities due to anatomical variations in the nasal bridge size (Dodgson, 2004, Zaidi et al., 2017). In image processing, the angular span for the orbit may be determined with the OpenCV routines from the eye-box sides, and with the Dlib routines from the difference between the eyebrow and eye-lid center. Similarly, the angular span for the IOD is determined with the OpenCV routines from the difference between the eye-box centers, and with the Dlib routines from that between the eye-lid centers.

Face Yaw, Pitch and Roll

Figure 11:
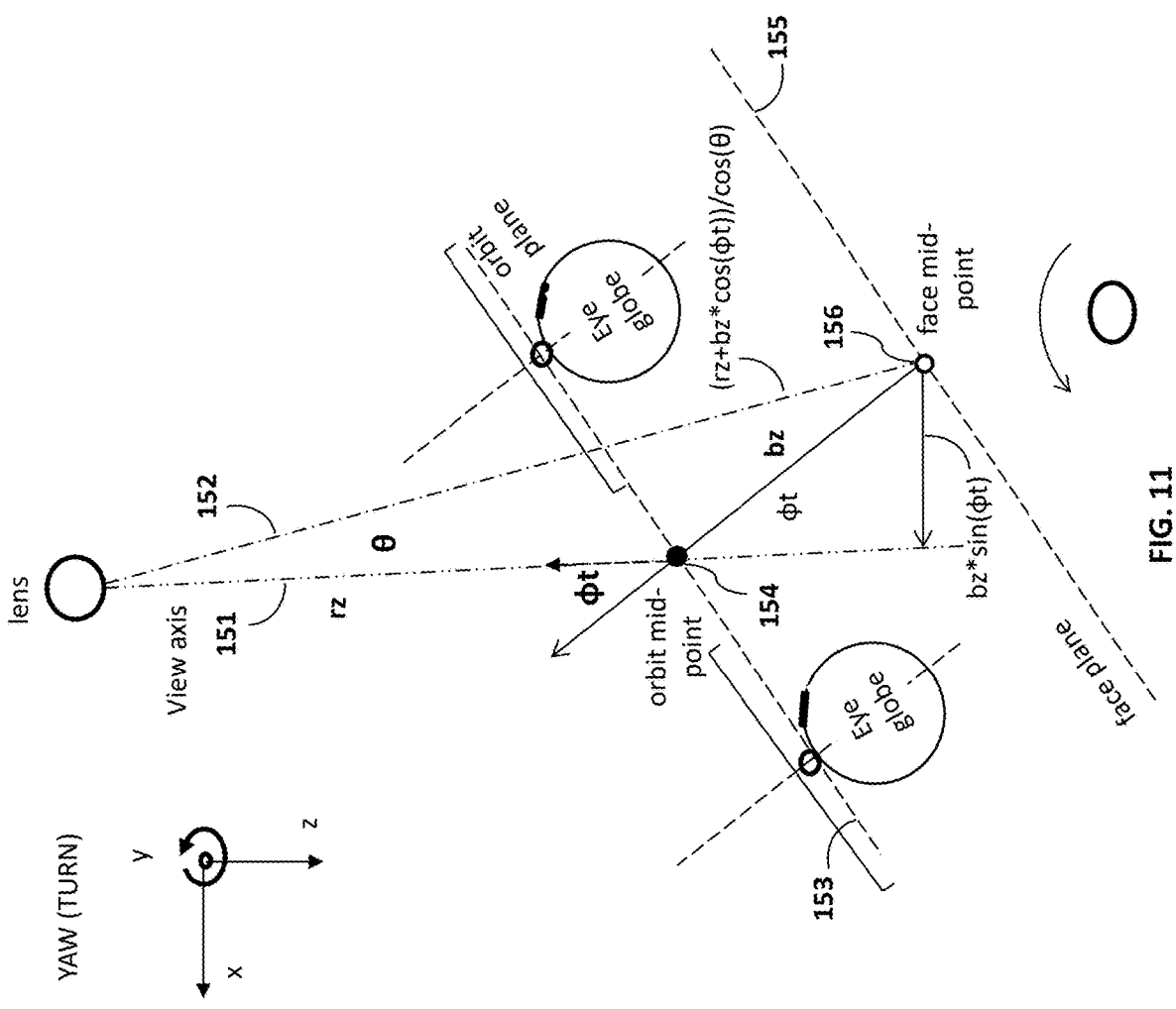
FIG. 11 is a Diagram of face yaw with mark offset.
Figure 12:
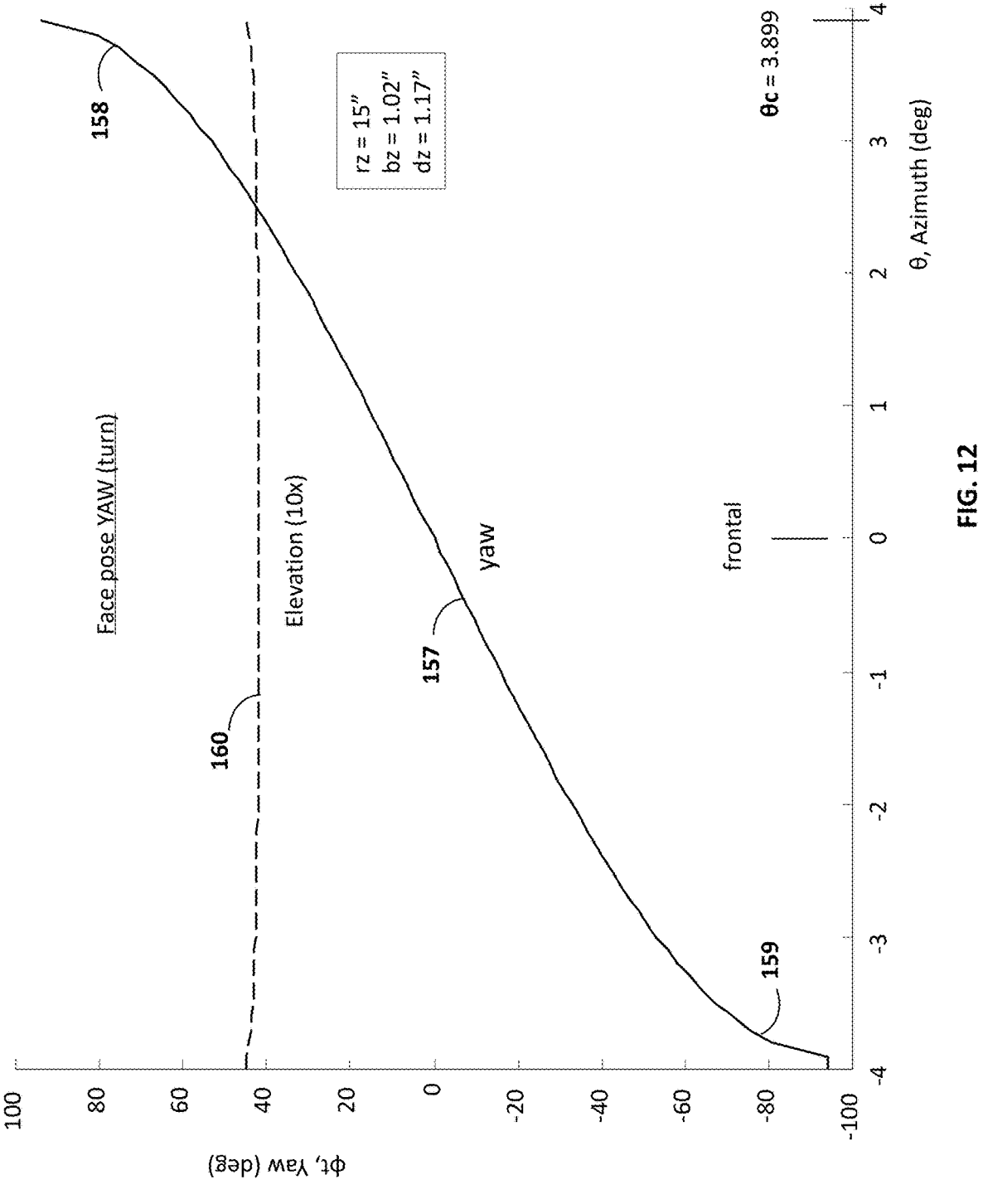
FIG. 12 is a Plot of face yaw by mark offset.

FIG. 11 shows geometry for computing the face yaw (turn) angle, $\phi t$, about the y-axis, as a function of the distance, rz, of the projection ray 151 to the center 154 of the orbit plane 153, the azimuth offset, $\theta$, of the ray 152 from the ray 151 where the ray is to the vertical projection 156 of the face plane 155 center 157, and the horizontal distance, bz, separating the orbit plane from the face plane (FIG. 6: 95), expressed by the relation: $(rz + bz * \cos(\phi t)) * \tan(\theta) = bz * \sin(\phi t)$, apparent from the figure. Expanding the above relation, the yaw angle is: $\phi t = \mathrm{sgn}(\theta) * (\mathrm{acos}(-bzz/(2*azz) + \mathrm{sqrt}((bzz/(2*azz))^2 - czz/azz)))$, where: $azz = (1 + \tan(\theta)^2) * bz^2$, $bzz = 2 * rz * bz * \tan(\theta)^2$, and $czz = -bz^2 + (rz * \tan(\theta))^2$. Associated with the azimuth, $\theta$, is elevation, $\phi$, of the ray 152 to the vertical projection 156 of the face plane center 157, which for the vertical separation of the face plane center located a distance dz (FIG. 6: 94) below the orbit plane center, is given by: $\phi = \mathrm{atan}(dz * \cos(\theta)/(rz + bz * \cos(\phi t)))$, a function of the azimuth and the yaw, as derived from $dz = ((rz + bz * \cos(\phi t))/\cos(\theta)) * \tan(\phi)$. For reference, FIG. 12 is a plot of the predicted yaw, $\phi t$, as a function of the azimuth offset angle $\theta$ for a specific case: rz=15 inches, bz=1.02 inches, and dz=1.17 inches. The plot for the yaw is closely linear over the central range 157, but clipped at the ends 158 and 159, in accordance with $\theta < \mathrm{abs}(\theta c)$, where: $\theta c = \mathrm{asin}(bz/rz)$, the yaw computation limited by the fixed separation distance between the planes. Plotted as well is the elevation 160 (10 times true scale) associated with the yaw; the average elevation over the azimuth range is 4.248 degrees; the maximum value is 4.470.

Figure 13:
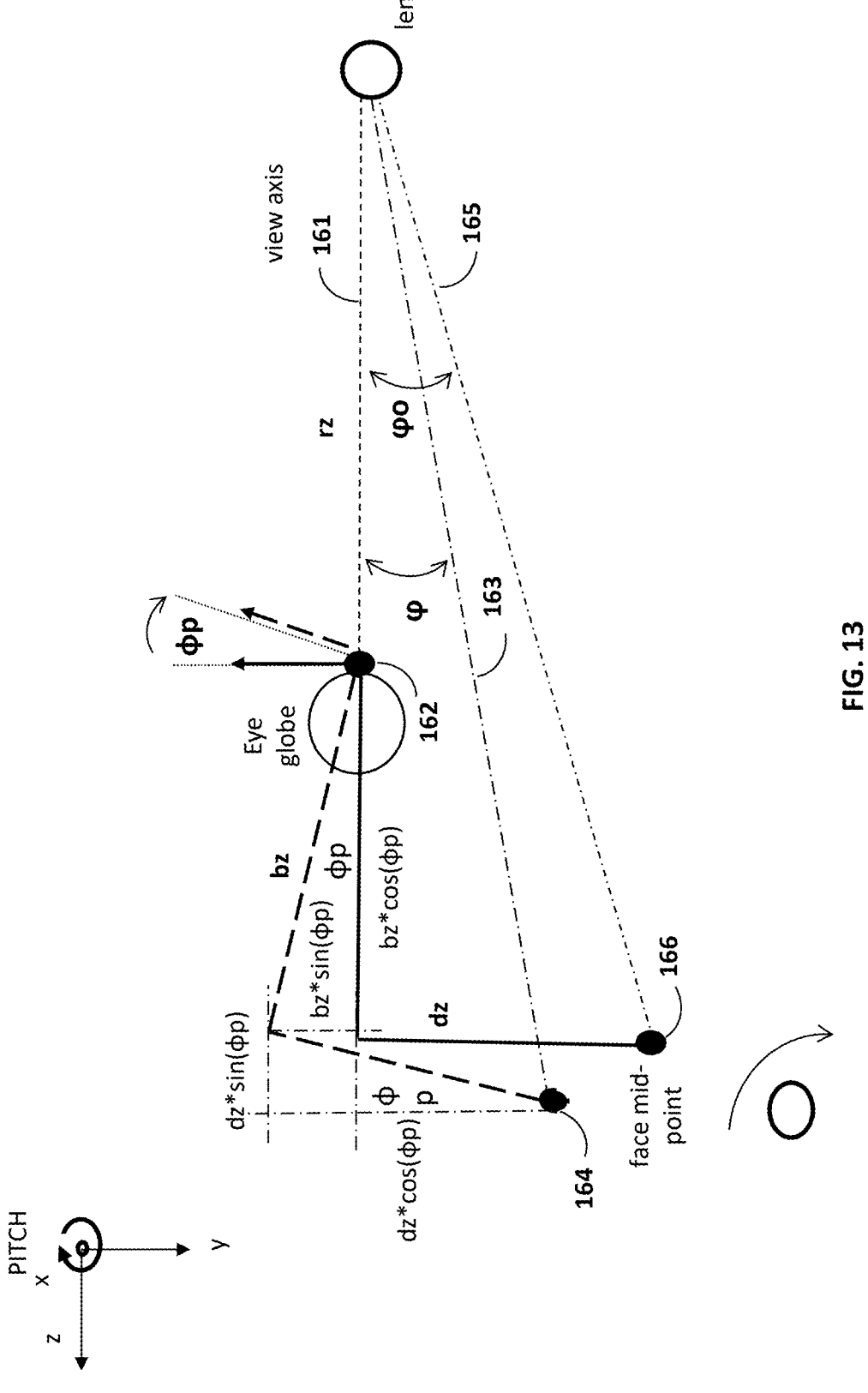
FIG. 13 is a Diagram of face pitch with mark offset.

FIG. 13 shows geometry for computing the face pitch angle, $\phi p$, about the x-axis, as a function of the distance, rz, of the projection ray 161 to the center 162 of the orbit plane, the elevation offset, $\phi$, of the ray 163 from the ray 161 where the ray is to the center 164 of the face plane, the horizontal distance, bz, separating the orbit plane from the face plane (FIG. 6: 95), and the vertical distance dz (FIG. 6: 94) separating the same, expressed by the relation: $(rz + bz * \cos(\phi p) + dz * \sin(\phi p)) * \tan(\phi) = dz * \cos(\phi p) - bz * \sin(\phi p)$, apparent from the figure. The pitch is zero for the elevation offset, $\phi o$, of the ray 165 to the center 166 of the face plane in the frontal view, given by: $\phi o = \mathrm{atan}(dz/(rz + bz))$. Considering further the figure, let $cz = \mathrm{sqrt}(bz^2 + dz^2)$, $eo = \mathrm{atan}(bz/dz)$, then with $ao = cz^2 * (1 + \tan(\phi)^2)$, $bo = -2. * rz * cz * \tan(\phi)^2$, $co = (rz * \tan(\phi))^2 - cz^2$, and then $cs = (-bo + \mathrm{sqrt}(bo^2 - 4.*ao*co))/(2.*ao)$, the face pitch angle as an arcsine of a quadratic solution is $\phi p = pi/2 - (eo + \mathrm{asin}(cs))$.

Figure 14:
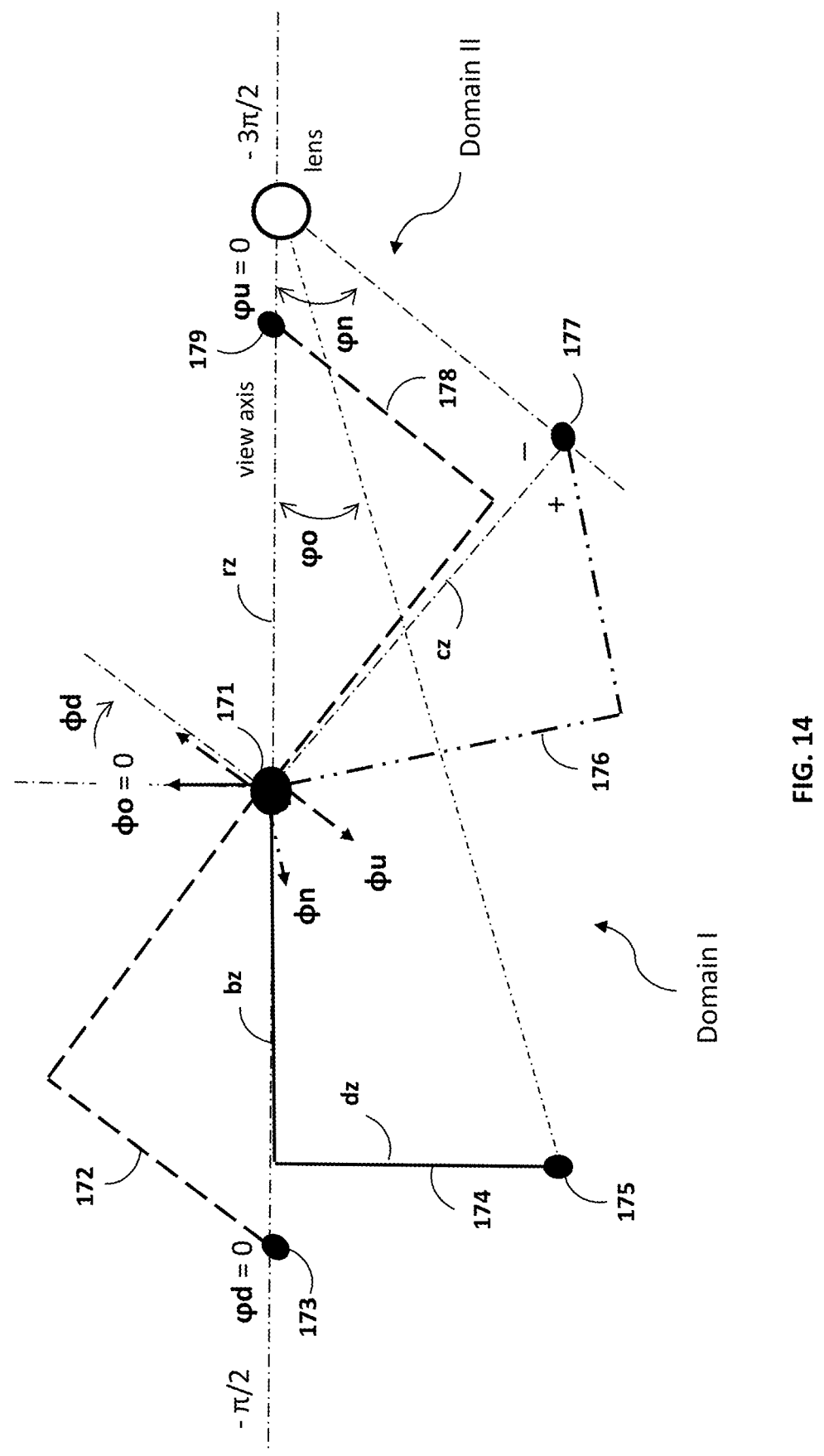
FIG. 14 is a Diagram showing face pitch cases.

FIG. 14 shows different pitch angle configurations such as that for face pitched full down 172, face pitched full up 178, an intermediate stage 176 at maximum elevation, and frontal face 174 as in FIG. 13. For face full down 172 the offset elevation is zero, $\phi d = 0$, since here the face plane center 173 is in line with the orbit plane center 171 by the view axis, and the corresponding pitch is $\phi d = \mathrm{atan}(dz/rz)$, where, as above, rz is the length of view axis to the orbit plane center and dz is the height of the orbit plane center above that of the face plane center. For face full up 178 the offset elevation is again zero, $\phi u = 0$, since again the face plane center 179 is in line with the orbit plane center 171 by the view axis, and the corresponding pitch is $\varphi u=\varphi d-\pi$. Maximum elevation occurs at the intermediate stage 176 with elevation $\phi n=a\sin$ (cz/rz) to the face plane center 177, where $cz=\sqrt{bz^2+dz^2}$), and bz is the depth of the face plane center behind the orbit plane center; the corresponding pitch is $\varphi n=-\pi/2-\phi n+$ ed. For the frontal face 174, the pitch is zero, $\varphi o=0$, and the elevation is $\phi o=atan(dz/(rz+bz))$. In rotating the head up from face full down position 172, to the face full up position 178, the elevation increases until the intermediate stage 176 is reached, where upon the elevation decrease with further rotation.

Figure 15:
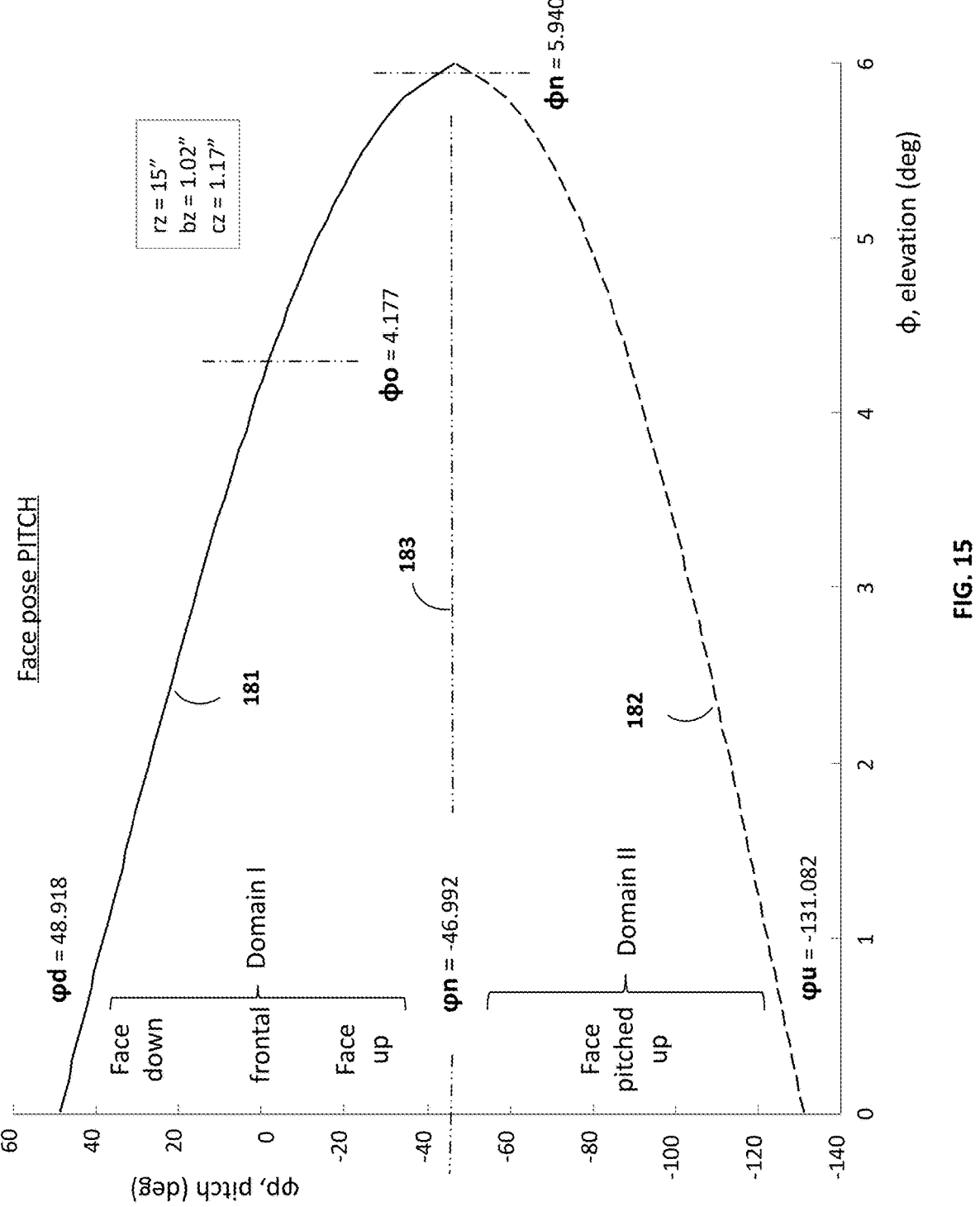
FIG. 15 is a Plot of face pitch by mark offset.

For reference, FIG. 15 is a plot of the pitch, $\varphi p$, by offset elevation, $\phi$, for a specific case: rz=15 inches, bz=1.02 inches, and dz=1.17 inches, over a face pitch range of $\varphi d=atan(dz/bz)$, for full face down at $\phi=0$, to $\varphi u=\varphi d-\pi$, for full face up, again at $\phi=0$. The elevation is limited to $\phi n=a\sin(\sqrt{dz^2+bz^2})/rz)$, at pitch value $\varphi n=-\pi/2-\phi n+$ $\varphi d$, by the fixed separation distance between the planes. The plot is separated 169 at this pitch value into two face pitch domains, Domain I 168 with pitch computed by $\varphi p=pi/2-$ asin(cs+ds) for face pitch centered about zero pitch with full frontal face elevation $\phi o$, and Domain II 167 with pitch computed by $\varphi p=pi/2-a\sin(cs-ds)$.

FIG. 16 shows geometry for computing the face roll angle, $\phi r$, about the z-axis (view axis), with the distance, rz, of the projection ray 191 to the center 192 of the orbit plane, the azimuth offset, $\theta$, of the ray 193 from the ray 191 where the ray is to the normal projection 194 of the face plane center 195 to the y-z plane, the horizontal distance, bz, separating the orbit plane from the face plane (FIG. 6: 95), the elevation offset, $\phi$, of the ray 196 from 193 to the face plane center 195, and the distance dz (FIG. 6: 94) separating the plane centers. The orbit centers 197 and 198 are rotated a lateral xm and vertical ym displacements about the orbit plane center 192. The face roll may be computed from these displacements as: $\varphi r=atan(ym/xm)$. The associated azimuth follows from the relation: $(rz+bz)*\tan(\theta)=dz*\sin(\varphi r)$, as apparent from the figure, with the azimuth given by: $\theta=-atan(dz*\sin(\varphi r)/(rz+bz))$; and the associated elevation follows from $dz*\cos(\varphi r)=((rz+bz)/\cos(\theta))*\tan(\phi)$, as apparent from the figure, with the elevation given by: $\phi=atan$ $((dz*\cos(\varphi r)*\cos(\theta))/(bz+rz))$. For reference, FIG. 17 is a plot of the predicted roll, $\varphi r$, as a function of the azimuth offset angle, $\theta$, for a specific case: rz=15 inches, bz=1.02 inches, and dz=1.17 inches. The plot for the roll angle is closely linear over the central range 201, but clipped at the ends 202 and 203, in accordance with $\theta<abs(\theta c)$, where: $\theta c=a\sin(dz/(rz+bz))$, the roll computation limited by the fixed separation distance between the planes. Plotted as well is the elevation 204 (10 times true scale) associated with the roll; the average elevation over the azimuth range is 2.740; the maximum value is 4.177.

Method Implementation

FIG. 18 flowcharts a method for determining the face-pose orientation relative to the orbit plane center viewing axis by the equations described above, with an iterative process to improve the depth estimation. Considering now the orbit-view space, the image offsets of azimuth, $\Theta r$, and elevation, $\Phi r$, of the face plane center from that of the orbit plane are determined 211 in display raster pixels from the video image capture of the user's face (FIG. 7), and converted to angular offsets by $\Theta o=\Theta r*Fv$ and $\Phi o=\Phi r*Fv$, with Fv=FOV/R, a ratio of the camera field-of-view (FOV) and resolution (R) in pixels. An initial estimate of the depth, rz, of the orbit plane from the camera lens is determined 212 from the angular span, Go, of the orbit margin with knowledge of the physical size, ob, (FIG. 10), rz=ob/$\theta o$, where the angular span follows from the span in raster pixels between the orbit center and say, the eyebrow. Equivalently, the depth may be estimated by the average of that computed for the orbit margin of each eye separately. This may be derived from the span between the orbit centers and the interocular distance, as well.

The face roll angle, er, is computed 213 from the lateral and vertical offsets, xm and ym, between the orbit centers (FIG. 16), where the offsets may be in raster pixels, $\varphi r=atan$ (ym/xm). The displacements in azimuth, $\theta r$, and elevation, $\phi r$, associated with the roll as effects are computed 214 by $\theta r=-atan(dz*\sin(\varphi r)/(rz+bz))$, and $\phi r=atan((dz*\cos(Tr)*\cos$ $(\theta r))/(bz+rz))$, where the horizontal distance, bz, is that physically separating the orbit plane from the face plane (FIG. 6: 95), and the vertical distance, dz, that separating the plane centers (FIG. 6: 94), in the face physical structure.

The face yaw (turn) angle is computed from the azimuth offset, $\theta t$, set with the azimuth, $\Theta o$, adjusted 214 by correcting for the roll effect, $\theta t=\Theta o+\theta r$. The face yaw (turn) angle, $\varphi t$, is computed 215 from the resulting offset in azimuth (FIG. 11), by $\varphi t=sgn(\theta t)*(acos(-bzz/(2*azz)+\sqrt{}$ $((bzz/(2*azz))^2-czz/azz)))$, where: $azz=(1+\tan(\theta t)^2)$ $*bz^2$, $bzz=2*rz*bz*\tan(\theta t)^2$, and $czz=-bz^2+(rz*\tan(\theta t))$ $^2$. Associated with the yaw, is an elevation effect, $\phi t$, given by $\phi t=atan(dz*\cos(\theta t)/(rz+bz*\cos(\varphi t)))$.

The face pitch angle is computed from the elevation offset, $\phi p$, set with the elevation, $\Phi o$, adjusted 216 by removing the yaw and roll effect contributions, $\phi p=\Phi o+(\phi 0-$ $\phi t)+(\phi 0-\phi r)$, with $\phi 0=atan(dz/(rz+bz))$ for zero pitch. The face pitch angle, $\varphi p$, is computed 217 as an arcsine of a quadratic solution from the resulting offset in elevation (FIG. 13), by: $\varphi p=pi/2-(eo+a\sin(cs))$, with $cz=\sqrt{bz^2+dz^2}$), $eo=atan(bz/dz)$, $ao=cz^2*(1+\tan(\phi)^2)$, $bo=-$ $2.*rz*cz*\tan(\phi)^2$, $co=(rz*\tan(\phi))^2-cz^2$, and then $cs=(-$ $bo+\sqrt{bo^2-4.*ao*co}))/(2.*ao)$.

The depth is updated 219 using the yaw and pitch angles by an iterative process described below, and tested for improvement 220, and with such, the process continues to repeat the computations of the pose angles; otherwise, the process is suspended and the face orientation, No, is computed 221 from the resulting face yaw, $\varphi y$, and pitch, $\varphi p$ (FIG. 9), by $No=[\cos(\varphi p)*\cos(\varphi y), -\sin(\varphi p), \cos(\varphi p)*\sin$ $(\varphi y)]$.

Using the above results, a fixed-point iteration process may be used to improve the depth estimation for computational refinement. In viewing, the orbit margin is tilted away from the viewing axis by an angle set by the yaw and pitch, such that the apparent size of the orbit is given by: $obs=ob*\cos(\varphi t)*\cos(\varphi p)$, where oz is the physical width of the orbit margin. The corresponding depth is $rz=obs*\cot(\theta o/$ $2)/2$, where the span angle, $\theta o$, is determined (FIG. 10) from the physical offsets of the facial eye marks. Let the initial estimate of the depth be $rzo=ob*\cot(\theta o/2)/2$, set rz=rzo, and compute the face yaw and pitch as above. A more refined estimate of the depth is then $rzz=rzo*\cos(\varphi t)*\cos(\varphi p)$. As above, the yaw and pitch angles may be computed again using the updated estimate of the depth, with rz=rz+drz/fcy, with drz=rzz−rz, and where fcy is an incrementing control factor. This iterative process may be repeated until the depth sequence converges with drz<tol., resulting in refined estimates of the roll, yaw, and pitch angles. A failure to converge within a reasonable sequence terminates the process as unstable with the initial depth estimate as solution.

In the orbital view space, the mean center of the eye orbital margins is located at Po=[0, 0, rz]. The locations of the eye-orbit centers in the orbital view space are the displacements from the mean center of the orbital margins (mid-center), where the eye-orbit margin centers are estimated by the eye-box centers for the OpenCV routines and the eye-lid centers for the D lib routines. The displacements in camera pixel values are converted to angular values with knowledge of the camera field of view, and to physical dimensions using the viewing depth distance to the orbital margin mid-center. The depth displacement of the eye-orbit margin centers from the orbital margin plane may be determined by: $\delta z = -\text{sign}(\delta x)^*oz^*\cos(\varphi p)^*\sin(\varphi y)$, where $\varphi y$ and $\varphi p$ are the yaw angle and pitch angle, respectively. The eye-orbit margin centers are located in the orbital view space at $Pe=[\delta x, \delta y, rz+\delta z]$, where $\delta x$ is the x-axis displacement of the eye-orbit margin center from the orbit margin mid-center, and $\delta y$ is the y-axis displacement.

FIG. 19 shows geometry for locating the face marks from the orbit-view space to the camera physical space. Here, shown is a coordinate system for the camera view space centered on the camera lens, with the horizontal x-axis directed to the left and the vertical y-axis directed downwards as for the image plane; following the right-hand rule, the z-axis is directed outward away from the camera along the principal viewing axis. The z-axis is normal to the projection image at the surface center point; the camera subtends a horizontal field of view, hfov, and a vertical field of view, vfov, centered about the principal axis. In this camera view space, the image points in the projection plane (Xi, Yi) cartesian coordinate system, locate viewing directions. With centering of the image plane at (wv/2, hv/2), the corresponding angular offsets from the principal axis for the projection ray to an image point (xi,yi) within the face box, are azimuth: $\alpha=(xi+xf-wv/2)^*hfov/wv$, and elevation: $\beta=(-yi-yf+hv/2)^*vfov/hv$, where the point (xf, yf) is the face box upper-left corner, and wv is the image plane width and hv the height. The azimuth is measured clockwise about the y-axis and the elevation clockwise about the x-axis.

The face-pose orientation may be converted from the orbit-view space to the camera physical space as follows. The face-pose orientation is adjusted for the angular offsets of the orbit plane center view-ray from the principal axis by applying appropriate transformation matrixes for the azimuth and elevation angular rotations with: $(axc,ayc,azc)=Px(\beta)^*Py(\alpha)^*(ax,ay,az)^t$, where $Py(\alpha)=[\cos(\alpha),0,\sin(\alpha); 0,1,0; -\sin(\alpha),0,\cos(\alpha)]$, and $Px(\beta)=[1,0,0;0,\cos(\beta),-\sin(\beta); 0,\sin(\beta),\cos(\beta)]$. Here, the directional cosines of the orientation before transformation are [ax,ay,az], and after transformation [axc,ayc,azc]. The orbit plane center is relocated from the orbit-view space position to the camera space position by the transformation $(xc,yc,zc)=Px(\beta)^*Py(\alpha)^*(0,0,rz)^t$; equivalently, $xc=rz^*\cos(\beta)^*\sin(\alpha)$, $yc=rz^*\sin(\beta)$, and $zc=rz^*\cos(\beta)^*\cos(\alpha)$, where rz is the length of the view axis to the orbit-plane center.

The face-pose orientation may now be converted from the camera space to that in a physical workspace; here, in this application, let the workspace be that for a standard computer display with an attached web-based video camera located at the display top-midpoint. The workspace coordinate system is centered on the camera with location Po=[0, 0,0], and the display normal, No=(0,0,1). The principal axis of the camera is tilted downward an angle, $\Theta c$, to the screen surface, counterclockwise about the display x-axis, with directional cosines (0,sin($\Theta c$),cos($\Theta c$)). The face-pose orientation is adjusted from the camera space to that in the workspace by applying an appropriate transformation for the angular offset of the camera, with the corresponding directional cosines: $(axs,ays,azs)=Rx(\Theta c)^*(axc,ayc,azc)$ t, where $Rx(\Theta c)=[1,0,0; 0,\cos(\Theta c),-\sin(\Theta c); 0,\sin(\Theta c),\cos(\Theta c)]$, and the orbit plane center $(xs, ys, zs)=Rx(\Theta c)^*(xc, yc, zc)^t$. Here, the orbit plane origin is Ps=[xs,ys,zs] with normal Ns=[axs,ays,azs] in the physical workspace. The projection of the face-pose normal to an intersection point on the workspace surface, Pd=[xd,yd], may be computed with the dot-products, Qi=No*Ns, and Qe=No*(Po−Ps); the intersection point is: Pd=Ps+rs*Ns, with rs=Qe/Qi.

Method Demonstration

A demonstration of the described method in determining the face-pose orientation was conducted with a single participant who viewed the monitor of a HP TS 520PC desktop computer, so configured as a workspace. The computer contains a standard built-in, high-definition video camera centrally located just above the monitor frame as a webcam for viewing the user. The H P high definition 1M P Webcam is presumed to have a resolution of 720p with images of 1280 by 720 pixels, and a HFOV of about 60-degrees; the principal axis of the camera is tilted downward about 20-degrees to the monitor screen surface. Low intensity lighting was provided in the form of vanity lights placed externally about the monitor so as to uniformly illuminate the facial features. Calibration markers were placed along the top of the monitor at 10-degree intervals over a +/−30-degree calibration range for a viewer who directly faces the front of the monitor from a 17-inch viewing distance. The calibration range was determined to be the limit for deriving bounding figures for face-pose with this configuration. The participant was asked to sequentially align his facial orientation as closely as possible toward the calibration markers in 5-degree increments while a computer program recorded the pertinent facial features viewed by the camera. These features are the image coordinates of the face box and eye orbital boxes derived from the OpenCV image processing, and those of the face box and eyebrow and eyelid indexes from the Dlib routine processing, as described in FIGS. 5*a* and 5*b*, above. These feature-recorded values are input to a computer program for computing the face-pose orientation angles, the orbit center location, and the orientation directional cosines, by the method as described above.

As confirmation, a further study using the described method to determine the face-pose orientation was conducted with a single manikin foam head model (7-inch length, 4.75-inch width, 11.5-inch height) placed at a 9-inch viewing distance in front of the monitor of the HP TS 520PC desktop computer. The head was placed at the center of a two-dimensional polar angular graduated coordinate system with a reference direction for the polar angle directed normal to the screen. The manikin head was sequentially indexed in 5-degree increments over a full calibration range while a computer program recorded the pertinent facial features viewed by the camera. These features are the image coordinates of the face box and eyebrow and eyelid indexes from the Dlib routine processing with input to a computer program for computing the face-pose orientation angles.

The FIGS. 20 through 24 show the results of the demonstration with a participant. FIG. 20 is a plot for the participant of the offset of the face bounding box center from the orbit center in the eye orbit space as determined by the camera ray to the eye orbit center, using the OpenCV image processing routines. The figure shows the yaw, pitch, and roll as a function of the participant viewing test angle set by the horizontal offset from the screen normal. The plots show a reasonable correspondence of the yaw with the test angle except at the extreme angles where the face and margin boxes become disconnected; the pitch and roll are fairly constant with very little roll.

FIG. 21 is a similar plot of the face bounding box center offset from the orbit center in the orbit space for the participant using Dlib image processing routines. The figure shows the yaw, pitch, and roll as a function of the participant viewing angle (i.e., the horizontal offset from the screen normal). The plots show a close correspondence of the yaw with the test angle over a wider range; the pitch and roll are fairly constant with very little roll. FIG. 22 is a plot of the azimuth and elevation angles of the face-pose orientation to the computer monitor, for the orbit center. FIG. 23 is a plot of the mean orbit center depth, lateral, and vertical positions in the work space, and FIG. 24 is a plot of the projection points of the face mean orbit center onto the work space surface as computed from the orientation angles and the orbit center location in the work space. The results are consistent with observations as expressed by the participant.

The FIGS. 25 through 41 show the results of the study with the manikin using the DLIB image processing routines. FIGS. 25 through 28 show the results for the manikin with the offsets of the face-bounding box and orbit box centers, while FIGS. 29 through 41 show results for the manikin with the offsets of the central-face triangular bounding box and orbit box centers. For the latter, figures are shown for the results in the orbit and camera spaces as well as the work space. The physical parameters of orbit margin size and the bounding figures separations are the same for both the participant and manikin with the face-bounding box and orbit center (orb=0.700, dz=1.17, bz=0.38); while the physical parameters are different with the central face-triangular bounding box and orbit center for the manikin (orb=0.700, dz=0.54, bz=−0.25). FIG. 25 is a plot for the manikin of the offset of the face bounding box center from the orbit center in the eye orbit space as determined by the camera ray to the eye orbit center, using the Dlib image processing routines. The figure shows the yaw, pitch, and roll as a function of the participant viewing test angle set by the horizontal offset from the screen normal. The plots show a reasonable correspondence of the yaw with the test angle; the pitch and roll are fairly constant with very little roll. FIG. 26 is a plot of the azimuth and elevation angles of the face-pose orientation to the computer monitor, for the orbit center. FIG. 27 is a plot of the mean orbit center depth, lateral, and vertical positions in the work space, and FIG. 28 is a plot of the projection points of the face mean orbit center onto the work space surface as computed from the orientation angles and the orbit center location in the work space.

FIG. 29 is a plot for the manikin of the offset of the central-face triangular bounding box center from the orbit center in the eye orbit space as determined by the camera ray to the eye orbit center, using the Dlib image processing routines. The figure shows the yaw, pitch, and roll as a function of the participant viewing test angle set by the horizontal offset from the screen normal. The plots show a reasonable correspondence of the yaw with the test angle; the pitch and roll are fairly constant with very little roll. FIG. 30 is a plot of the position of the orbit centers in the orbit space. The plot shows the x-axis (lateral), y-axis (vertical), and z-axis (depth) locations of the orbit mid-center and the left and right orbit centers, as a function of the test angle. The plot shows that the left and right orbit margin centers tend to reverse depth about that of the orbit margin mid-center with test angle; the left and right centers are consistently displaced about the orbit margin mid-center laterally, and the vertical locations of the orbit centers are the same. FIG. 31 is a plot of the directional cosines for the face-pose x-axis, y-axis, and z-axis offsets in orbit space.

The FIGS. 32-35 show the results for the camera space as determined by rotating the orbit space into the camera space. FIG. 32 is a plot of the azimuth and elevation rotation angles mapping the orbit space to camera space. FIG. 33 is a plot of the face-pose offset from the principal axis in the camera space. FIG. 34 is a plot of the position of the orbit centers in the camera space. The plot for the roll offset in FIG. 33 is computed from the lateral and vertical locations in FIG. 34 of the left and right orbit centers. FIG. 35 is a plot of the directional cosines for the face-pose offset in camera space.

FIGS. 36-41 show the results for the workspace as determined by rotating the camera space into the workspace by the angle of the camera principal axis to the work surface. FIG. 36 is a plot of the face-pose offset from the surface normal in the workspace. FIG. 37 is a plot of the position of the orbit centers in the workspace. FIG. 38 is a plot of the directional cosines for the face-pose offset in the workspace. FIG. 39 is a plot of the azimuth and elevation angles of the face-pose orientation to the computer monitor, for the orbit center. FIG. 40 is a plot of the position of the mean orbit center in the camera space. FIG. 41 is a plot of projection points of the face mean orbit center onto the computer monitor screen as computed from the orientation angles and the orbit center location in the work space. The plot shows that the projection points tend to cluster in the upper portion of the display and longitudinally from left to right at intervals corresponding to the study process.

Demonstration Summary

In summary, the method utilized here for the demonstration study of determining the pose of a human face in a visual image, consists as one embodiment of first computing the depth of the face-pose location from the center of an imaging reference system, and then computing the face-pose orientation as the Euler angles of yaw, pitch, and roll as offsets from the reference system axes, where the computations are from images of face-marks and the reference system is for the imaging device as delineated by an image plane and principal viewing axis. In particular, the depth is computed from the separation in the image of the eye-orbit features and the physical size of the eye-orbit margin, the face-pose roll is computed from the lateral and vertical displacements in the image of the eye orbital centers, the face-pose yaw is computed from the lateral displacement of the geometrical centers of image bounding frames for the face-mark images, and the face-pose pitch is computed from the vertical displacement of the geometrical centers of the image bounding frames, where separate frames bound images of the face-marks in the face and eye-orbit facial planes. The angle computations are functions of the face-pose depth in location, where in addition, the pitch and yaw computations are functions of the separation of the face and eye-orbit facial planes set by the underlying facial physical structure. A fixed-point iteration process is used to refine the depth with the computed angles, and in turn, the angles from the depth computation, with the process repeated for convergence of the depth within a set tolerance, where upon the angles of yaw, pitch, and roll are further computed for determination of the face-pose orientation with the location.

The geometrical centers of the image bounding frames for the face-marks of the face and eye-orbit facial planes are computed from the image coordinates of the face-marks constituted as facial plane features, where the facial planes are separately imaged as a face image and an orbit image in the image plane. The orbit facial plane features are those of the superior orbital region and the orbital cavity margins of the separate eyes. The features for a full-face are those of the anterior face-shape periphery, while the features for a central face are those of the outer canthus of the eyes and the nares of the nose. The facial plane separation is set by the locations of the face and orbit facial planes, where the facial planes are anatomically located by the facial skeleton structure.

The results for the participant and manikin study presented above are in close agreement as a demonstration of the applicability of the method. The study results show a reasonable accuracy in computing viewing location and the Euler offset angles of roll, yaw, and pitch in lateral viewing for both the full-face and central face approach, particularly so with the Dlib image processing routines. The demonstration was conducted with a single participant who viewed the monitor of a HP TS 520PC desktop computer configured as a workspace, and repeated with a manikin indexed about lateral viewing directions. The computer contains a standard built-in, high-definition video camera centrally located just above the monitor frame as a webcam for viewing the user. A computer program recorded the pertinent facial features viewed by the camera; these features are the image coordinates of the face box and eye orbital boxes derived from the OpenCV image processing, and those of the face shape periphery and eyebrow and eyelid indexes from the Dlib routine processing. These feature-recorded values are input to a computer program computing the face-pose orientation angles, the orbit center location, and the orientation directional cosines, by the method as described above. The viewing location and directions in the camera space are further computed, and in turn, the same in the viewing workspace. A reasonable application of the face-pose computations is the estimation of the workplace surfaces that the viewer is facing forward toward.

Application to Morphable Models of Faces

The method has application to morphable models of faces for corrections of illumination and facial texture offsets when such preclude derivation of facial landmarks from the original image. In this process, the facial image is fitted with a morphable face mask from a data base of prototypical head scans, where the mask is an optimized combination of the prototype faces using shape and texture matching algorithms (Blanz & Vetter, 1999). The face may be sub-divided into independent sub-regions that can be morphed independently, such as regions for the eyes, nose, mouth and surrounding region. The full mask, as a fine surface derail mesh, contains landmark features for the face including the eyes features, nose, mouth, and shape as derived from the prototype fit, all at a uniform illumination level without shading or shadows that may be in the original image. In this way, the face-pose for the original image may now be determined by application of the disclosed method to the resulting face mask.

In review, the results for the participant and manikin study presented above are in close agreement as a demonstration of the applicability of the invention. The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, and modules are described above in associated with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

What is claimed is:

1. A method for determining a face pose in an image
a) isolating a face in the image, determining a facial image bounding frame for a spatial plane containing facial features imaged in the isolated face image, and determining a geometric center of the facial bounding frame;
b) detecting eye orbits of the face, determining an eye image bounding frame for a spatial plane containing eye orbit features imaged in an eye orbital image, determining a geometric center of the eye bounding frame, determining physical size of orbit margins of the eye orbits, and setting eye orbital center points for each eye orbit;
c) compute a camera depth of the isolated face location using a separation distance between the detected eye orbits and the orbit margins;
d) computing Euler angles of yaw, pitch, and roll offsets from image plane reference axes wherein:
roll is computed from lateral and vertical displacements of the eye orbital center points;
yaw is computed from the lateral difference between the geometric center of the eye bounding frame and the facial bounding frame, and from the camera depth;
pitch is computed from a vertical difference between the geometric center of the eye bounding frame and the facial bounding frame and from the camera depth; and
e) determining the face pose of the image based on the camera depth, and the computed Euler angles of yaw, pitch and roll.

2. The method of claim 1, wherein spatial planes for an eye orbit image and a face image are determined from anatomically located facial planar surfaces for the eye orbit and for the face, wherein the facial planar surfaces are delineated by a set of physical features of the physical structure of the face, and the facial planar surfaces are physically separated.

3. The method of claim 2, wherein:
a set of physical features of a facial planar surface for an eye orbit image are those of a superior orbital region and the orbital cavities of the eyes;
a set of physical features of a facial planar surface for a full face image are those of the anterior facial shape periphery, superior forehead, and inferior face;
a set of physical features of a facial plane surface for a central face image are those of an outer canthus of the eyes and a nares of the nose.

4. The method of claim 3, wherein frame coordinates are computed for image bounding frames containing image coordinates of delineating sets of physical features of the face physical structure for the facial planar surfaces, wherein:
geometric centers are computed for the image bounding frames from the frame coordinates.

5. The method of claim 4, wherein the yaw is computed from the lateral difference between the geometric center of the image bounding frame for the eye orbit image of the facial planar surface for the eye orbit, and the geometric center of the image bounding frame for the face image of the facial planar surface for the face, wherein:

the computations of yaw are functions of the camera depth and of the physical separation between the facial planar surface for the face and the facial planar surface for the eye orbit.

6. The method of claim 4, wherein the pitch is computed from a vertical difference between the geometric center of the image bounding frame for the eye orbit image of the facial planar surface for the eye orbit, and the geometric center of the image bounding frame for the face image of the facial planar surface for the face, wherein:

the computation of pitch is a function of the camera depth and of the physical separation between a facial planar surface for the face and the facial planar surface for the eye orbit.

7. The method of claim 1, wherein a fixed-point iteration process is used to refine the computation of the camera depth from the computed Euler yaw, pitch, and roll angles, wherein the process is repeated for convergence of the depth to within a set tolerance.

8. An apparatus to determine a face pose in an image comprising:

a processor; and a memory, including instructions stored thereon, which when executed by the processor cause the apparatus to:

a) isolate a face in the image, determine a facial image bounding frame for a spatial plane containing facial features imaged in the isolated face image, and determining a geometric center of the facial bounding frame;

b) detect eye orbits of the face, determine an eye image bounding frame for a spatial plane containing eye orbit features imaged in an eye orbital image, determine a geometric center of the eye bounding frame, determine physical size of orbit margins of the eye orbits, and setting eye orbital center points for each eye orbit;

c) compute a camera depth of the isolated face location using a separation distance between the detected eye orbits and the orbit margins;

d) computing Euler angles of yaw, pitch, and roll offsets from image plane reference axes wherein:

roll is computed from lateral and vertical displacements of the eye orbital center points;

yaw is computed from the lateral difference between the geometric center of the eye bounding frame and the facial bounding frame, and from the camera depth;

pitch is computed from a vertical difference between the geometric center of the eye bounding frame and the facial bounding frame, and from the camera depth; and e) determining the face pose of the image based on the camera depth, and the computed Euler angles of yaw, pitch and roll.

9. The apparatus of claim 8, wherein spatial planes for an eye orbit image and a face image are determined from anatomically located facial planar surfaces for the eye orbit and for the face, wherein the facial planar surfaces are delineated by a set of physical features of the physical structure of the face, and the facial planar surfaces are physically separated.

10. The apparatus of claim 9, wherein:

a set of physical features of a facial planar surface for an eye orbit image are those of a superior orbital region and the orbital cavities of the eyes;

a set of physical features of a facial planar surface for a full face image are those of the anterior facial shape periphery, superior forehead, and inferior face;

a set of physical features of a facial plane surface for a central-face image are those of an outer canthus of the eyes and a nares of the nose.

11. The apparatus of claim 10, wherein frame coordinates are computed for image bounding frames containing image coordinates of delineating sets of physical features of the face physical structure for the facial planar surfaces, wherein:

geometric centers are computed for the image bounding frames from the frame coordinates.

12. The apparatus of claim 11, wherein the yaw is computed from the lateral difference between the geometric center of the image bounding frame for the eye orbit image of the facial planar surface for the eye orbit, and the geometric center of the image bounding frame for the face image of the facial planar surface for the face, wherein:

the computations of yaw are functions of the camera depth and of the physical separation between the facial planar surface for the face and the facial planar surface for the eye orbit.

13. The apparatus of claim 11, wherein the pitch is computed from a vertical difference between the geometric center of the image bounding frame for the eye orbit image of the facial planar surface for the eye-orbit, and the geometric center of the image bounding frame for the face image of the facial planar surface for the face, wherein:

the computation of pitch is a function of the camera depth and of the physical separation between the facial planar surface for the face and the facial planar surface for the eye orbit.

14. The apparatus of claim 8, wherein a fixed-point iteration process is used to refine the computation of the camera depth from the computed Euler yaw, pitch, and roll angles, wherein the process is repeated for convergence of the depth to within a set tolerance.

15. A non-transitory computer-readable storage medium comprising instructions which, when executed by a computer, cause the computer to carry out determining a face pose in an image, by:

a) isolating a face in the image, determining a facial image bounding frame for a spatial plane containing facial features imaged in the isolated face image, and determining a geometric center of the facial bounding frame;

b) detecting eye orbits of the face, determining an eye image bounding frame for a spatial plane containing eye orbit features imaged in an eye orbital image, determining a geometric center of the eye bounding frame, determining physical size of orbit margins of the eye orbits, and setting eye orbital center points for each eye orbit;

c) compute a camera depth of the isolated face location using a separation distance between the detected eye orbits and the orbit margins;

d) computing Euler angles of yaw, pitch, and roll offsets from image plane reference axes wherein:

roll is computed from lateral and vertical displacements of the eye orbital center points;

yaw is computed from the lateral difference between the geometric center of the eye bounding frame and the facial bounding frame, and from the camera depth;

pitch is computed from a vertical difference between the geometric center of the eye bounding frame and the facial bounding frame, and from the camera depth; and e) determining the face pose of the image based on the camera depth, and the computed Euler angles of yaw, pitch and roll.

16. The non-transitory computer-readable storage medium of claim 15, wherein spatial planes for an eye orbit image and a face image are determined from anatomically located facial planar surfaces for the eye orbit and for the face, wherein the facial planar surfaces are delineated by a set of physical features of the physical structure of the face, and the facial planar surfaces are physically separated.

17. The non-transitory computer-readable storage medium of claim 16, wherein:

a set of physical features of a facial planar surface for an eye orbit image are those of a superior orbital region and the orbital cavities of the eyes;

a set of physical features of a facial planar surface for a full face image are those of the anterior facial shape periphery, superior forehead, and inferior face;

a set of physical features of a facial plane surface for a central-face image are those of an outer canthus of the eyes and a nares of the nose.

18. The non-transitory computer-readable storage medium of claim 17, wherein frame coordinates are computed for image bounding frames containing image coordinates of delineating sets of physical features of the face physical structure for the facial planar surfaces, wherein:

geometric centers are computed for the image bounding frames from the frame coordinates.

19. The non-transitory computer-readable storage medium of claim 18, wherein the yaw is computed from the lateral difference between the geometric center of the image bounding frame for the eye orbit image of the facial planar surface for the eye orbit, and the geometric center of the image bounding frame for the face image of the facial planar surface for the face, wherein:

the computations of yaw are functions of the camera depth and of the physical separation between the facial planar surface for the face and the facial planar surface for the eye orbit.

20. The non-transitory computer-readable storage medium of claim 18, wherein the pitch is computed from a vertical difference between the geometric center of the image bounding frame for the eye orbit image of the facial planar surface for the eye orbit, and the geometric center of the image bounding frame for the face image of the facial planar surface for the face, wherein:

the computation of the pitch is a function of the camera depth and of the physical separation between the facial planar surface for the face and the facial planar surface for the eye orbit.

\* \* \* \* \*